(12) United States Patent
Wang

(10) Patent No.: US 12,325,817 B2
(45) Date of Patent: Jun. 10, 2025

(54) LIQUID-CRYSTAL MEDIUM

(71) Applicant: MERCK PATENT GMBH, Darmstadt (DE)

(72) Inventor: Jing Wang, Shanghai (CN)

(73) Assignee: MERCK PATENT GMBH, Darmstadt (DE)

( * ) Notice: Subject to any disclaimer, the term of this patent is extended or adjusted under 35 U.S.C. 154(b) by 11 days.

(21) Appl. No.: 18/133,199

(22) Filed: Apr. 11, 2023

(65) Prior Publication Data
US 2023/0323209 A1 Oct. 12, 2023

Related U.S. Application Data

(63) Continuation of application No. PCT/CN2022/086049, filed on Apr. 11, 2022.

(51) Int. Cl.
| | | |
|---|---|---|
| *G02F 1/1333* | (2006.01) | |
| *C09K 19/06* | (2006.01) | |
| *C09K 19/12* | (2006.01) | |
| *C09K 19/20* | (2006.01) | |
| *C09K 19/30* | (2006.01) | |
| *C09K 19/34* | (2006.01) | |
| *C09K 19/54* | (2006.01) | |

(52) U.S. Cl.
CPC .......... *C09K 19/544* (2013.01); *C09K 19/062* (2013.01); *C09K 19/12* (2013.01); *C09K 19/2007* (2013.01); *C09K 19/3003* (2013.01); *C09K 19/3028* (2013.01); *C09K 19/3048* (2013.01); *C09K 19/3066* (2013.01); *C09K 19/3068* (2013.01); *C09K 19/3098* (2013.01); *C09K 19/3402* (2013.01); *C09K 19/3405* (2013.01); *C09K 19/3444* (2013.01); *C09K 19/3491* (2013.01); *C09K 19/542* (2013.01); *C09K 2019/122* (2013.01); *C09K 2019/123* (2013.01); *C09K 2019/124* (2013.01); *C09K 2019/2042* (2013.01); *C09K 2019/205* (2013.01); *C09K 2019/3004* (2013.01); *C09K 2019/3006* (2013.01); *C09K 2019/3009* (2013.01); *C09K 2019/301* (2013.01); *C09K 2019/3016* (2013.01); *C09K 2019/3021* (2013.01); *C09K 2019/3025* (2013.01); *C09K 2019/305* (2013.01); *C09K 2019/3056* (2013.01); *C09K 2019/3071* (2013.01); *C09K 2019/3075* (2013.01); *C09K 2019/3078* (2013.01); *C09K 2019/3408* (2013.01); *C09K 2019/3422* (2013.01); *C09K 2019/548* (2013.01)

(58) Field of Classification Search
CPC .... C09K 19/544; C09K 19/062; C09K 19/12; C09K 19/2007; C09K 19/3003; C09K 19/3028; C09K 19/3048; C09K 19/3066; C09K 19/3068; C09K 19/3098; C09K 19/3402; C09K 19/3405; C09K 19/3444; C09K 19/3491; C09K 19/542; C09K 19/42; C09K 19/3483; C09K 2019/122–124; C09K 2019/2042; C09K 2019/205; C09K 2019/3004; C09K 2019/3006; C09K 2019/3009; C09K 2019/301; C09K 2019/3016; C09K 2019/3021; C09K 2019/3025; C09K 2019/305; C09K 2019/3056; C09K 2019/3071; C09K 2019/3075; C09K 2019/3078; C09K 2019/3408; C09K 2019/3422; C09K 2019/548; C09K 2019/0466; C09K 2019/303; C09K 2019/3036; C09K 2019/3027; G02F 1/1333

See application file for complete search history.

(56) References Cited

U.S. PATENT DOCUMENTS

| | | | |
|---|---|---|---|
| 10,907,100 | B2 | 2/2021 | Engel et al. |
| 10,913,897 | B2 | 2/2021 | Engel et al. |
| 11,008,515 | B2 | 5/2021 | Hirschmann et al. |
| 2021/0179942 | A1 | 6/2021 | Deing et al. |
| 2022/0119711 | A1* | 4/2022 | Laut .................. C09K 19/54 |
| 2022/0127532 | A1 | 4/2022 | Haensel et al. |
| 2023/0024370 | A1 | 1/2023 | Laut et al. |
| 2023/0323209 | A1* | 10/2023 | Wang ................. C09K 19/542 |

FOREIGN PATENT DOCUMENTS

| | | | |
|---|---|---|---|
| CN | 106010580 B | 8/2018 | |
| EP | 3354709 A1 | 8/2018 | |
| EP | 3354710 A1 | 8/2018 | |
| EP | 3489329 A1 | 5/2019 | |
| EP | 3839008 A1 | 6/2021 | |
| EP | 3933009 A1 | 1/2022 | |
| WO | 2020165394 A1 | 8/2020 | |
| WO | WO-2023036746 A1 * | 3/2023 | ............ C09K 19/04 |

OTHER PUBLICATIONS

Search report in corresponding EP 23166893.0 dated Aug. 2, 2023 (pp. 1-6).

* cited by examiner

*Primary Examiner* — Geraldina Visconti

(74) *Attorney, Agent, or Firm* — Millen, White, Zelano & Branigan, P.C.; Brion P. Heaney

(57) ABSTRACT

The present invention relates to liquid-crystal (LC) media as defined in claim 1, having negative dielectric anisotropy and to the use thereof for optical, electro-optical and electronic purposes, in particular in LC displays.

17 Claims, No Drawings

LIQUID-CRYSTAL MEDIUM

The present invention relates to liquid-crystal (LC) media having negative dielectric anisotropy and to the use thereof for optical, electro-optical and electronic purposes, in particular in LC displays.

One of the liquid-crystal display (LCD) modes used at present is the TN ("twisted nematic") mode. However, TN LCDs have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative dielectric anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been reported (see, inter alia, S. H. Jung et al., Jpn. J. Appl. Phys., Volume 43, No. 3, 2004, 1028), which contain two electrodes on the same substrate, one of which structured in a comb-shaped manner and the other is unstructured. A strong, so-called "fringe field" is thereby generated, i.e., a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

FFS displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays but comprise a layer of an LC medium with negative dielectric anisotropy instead of an LC medium with positive dielectric anisotropy. The LC medium with negative dielectric anisotropy shows a more favorable director orientation that has less tilt and more twist orientation compared to the LC medium with positive dielectric anisotropy, as a result of which these displays have a higher transmission. The displays further comprise an alignment layer, preferably of polyimide provided on at least one of the substrates that is in contact with the LC medium and induces planar alignment of the LC molecules of the LC medium. These displays are also known as "Ultra Brightness FFS (UB-FFS)" mode displays. These displays require an LC medium with high reliability.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In so-called PVA ("patterned VA") displays, protrusions are rendered completely superfluous in that both electrodes are structured by means of slits on the opposite sides, which results in increased contrast and improved transparency to light but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

A further development are displays of the so-called PS ("polymer sustained") or PSA ("polymer sustained alignment") type, for which the term "polymer stabilised" is also occasionally used. In these, a small amount (for example 0.3% by weight, typically <1% by weight) of one or more polymerisable, compound(s), preferably polymerisable monomeric compound(s), is added to the LC medium and, after filling the LC medium into the display, is polymerised or crosslinked in situ, usually by UV photopolymerisation, optionally while a voltage is applied to the electrodes of the display. The polymerisation is carried out at a temperature where the LC medium exhibits a liquid crystal phase, usually at room temperature. The addition of polymerisable mesogenic or liquid-crystalline compounds, also known as reactive mesogens or "RMs", to the LC mixture has proven particularly suitable.

In the meantime, the PS(A) principle is being used in various conventional LC display modes. Thus, for example, PS-VA, PS-OCB, PS-IPS, PS-FFS, PS-UB-FFS and PS-TN displays are known. The polymerisation of the RMs preferably takes place with an applied voltage in the case of PS-VA and PS-OCB displays, and with or without, preferably without, an applied voltage in the case of PS-IPS displays. As can be demonstrated in test cells, the PS(A) method results in a pretilt in the cell. In the case of PS-VA displays, the pretilt has a positive effect on response times. For PS-VA displays, a standard MVA or PVA pixel and electrode layout can be used. In addition, however, it is also possible, for example, to manage with only one structured electrode side and no protrusions, which significantly simplifies production and at the same time results in very good contrast and in very good transparency to light.

PS-VA displays are described, for example, in EP 1 170 626 A2, U.S. Pat. Nos. 6,861,107, 7,169,449, US 2004/0191428 A1, US 2006/0066793 A1 and US 2006/0103804 A1. PS-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

Below the layer formed by the phase-separated and polymerised RMs which induce the above mentioned pretilt angle, the PSA display typically contains an alignment layer on one or both of the substrates forming the display cell, that provides the initial alignment of the LC molecules before the polymer stabilisation step. The alignment layer is usually applied on the electrodes (where such electrodes are present) such that it is in contact with the LC medium and induces initial alignment of the LC molecules. The alignment layer may comprise or consist of, for example, a polyimide, which may also be rubbed, or may be prepared by a photoalignment method.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

In particular for monitor and especially TV applications, optimisation of the response times, but also of the contrast and luminance (thus also transmission) of the LC display continues to be demanded. The PSA method can provide significant advantages here. In particular in the case of PS-VA, PS-IPS and PS-FFS displays, a shortening of the response times, which correlate with a measurable pretilt in test cells, can be achieved without significant adverse effects on other parameters. Another problem observed in prior art is that the use of conventional LC media in LC displays, including but not limited to displays of the PSA type, often leads to the occurrence of mura in the display, especially when the LC medium is filled in the display cell manufactured using the one drop filling (ODF) method. This phenomenon is also known as "ODF mura". It is therefore desirable to provide LC media which lead to reduced ODF mura.

Another problem observed in prior art is that LC media for use in PSA displays, including but not limited to displays of the PSA type, do often exhibit high viscosities and, as a consequence, high switching times. In order to reduce the viscosity and switching time of the LC medium, it has been suggested in prior art to add LC compounds with an alkenyl group. However, it was observed that LC media containing alkenyl compounds often show a decrease of the reliability and stability, and a decrease of the VHR especially after exposure to UV radiation. Especially for use in PSA displays this is a considerable disadvantage because the photopolymerisation of the RMs in the PSA display is usually carried out by exposure to UV radiation, which may cause a VHR drop in the LC medium.

Especially in view of mobile devices there is great demand for displays with high transmission, which enable the use of less intensive backlight, which, therefore, leads to longer battery lifetime, hence, more sustainable products. Alternatively, displays with higher brightness can be achieved having improved contrast especially under ambient light.

In addition there is a great demand for PSA displays, and LC media and polymerisable compounds for use in such PSA displays, which enable a high specific resistance at the same time as a large working-temperature range, short response times, even at low temperatures, and a low threshold voltage, a low pretilt angle, a multiplicity of grey shades, high contrast and a broad viewing angle, have high reliability and high values for the VHR after UV exposure, and, in case of the polymerisable compounds, have low melting points and a high solubility in the LC host mixtures. In PSA displays for mobile applications, it is especially desired to have available LC media that show low threshold voltage and high birefringence.

There is thus still a great demand for VA, FFS or PSA displays, and LC media optionally comprising polymerisable compounds for use in VA, FFS or PSA displays, which do not show the drawbacks as described above, or only do so to a small extent, and have improved properties.

In general, there is a significant need for liquid crystalline media with suitable properties for practical applications, in particular for VA or FFS displays, such as a wide nematic phase range, appropriate optical anisotropy $\Delta n$, according to the display mode used, a high $\Delta\varepsilon$, low viscosities and high LTS. In particular where high elastic constants and high clearing temperatures are required, insufficient stability of the nematic phase at low temperatures (low-temperature stability, LTS) can be observed.

The invention is based on the object of providing novel suitable LC media, which do not have the disadvantages indicated above or do so to a reduced extent.

Surprisingly, it has now been found that liquid crystalline media with a suitably high $\Delta\varepsilon$, a suitable phase range and $\Delta n$ and high LTS can be realized which do not exhibit the drawbacks of the materials of the prior art or at least do exhibit them to a significantly lesser degree by using liquid crystalline media comprising one or more compounds of formula I defined below.

The invention relates to a liquid crystal medium comprising a) one or more compounds of the formula I:

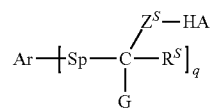

in which

Ar denotes a methylene group or an aromatic hydrocarbon group having 6 to 40 C atoms or a heteroaromatic hydrocarbon group having 4 to 40 C atoms; preferably an aromatic hydrocarbon group having 6 to 40 C atoms;

Sp denotes a spacer group or a single bond;
$R^S$ denotes H, alkyl having 1 to 12 C atoms or alkenyl having 2 to 12 C atoms;
$Z^S$ denotes —O—, —C(O)O—, —(CH$_2$)$_z$—, or —(CH$_2$)$_z$O—, or a single bond;
HA denotes

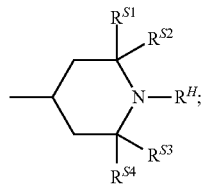

$R^H$ denotes H, O$^■$, CH$_3$, OH or OR$^S$;
$R^{S1}$, $R^{S2}$, $R^{S3}$ and $R^{S4}$, identically or differently, denote alkyl having 1 to 6 C atoms, preferably having 1 to 3 C atoms, very preferably CH$_3$;
G denotes H or $R^S$ or a group $Z^S$-HA;
z is an integer from 1 to 6; and
q is 2, 3 or 4, preferably 3 or 4;
b) one or more compounds selected from the group of compounds of the formulae IIA, IIB, and IIC; and
c) one or more compounds of the formula IID:

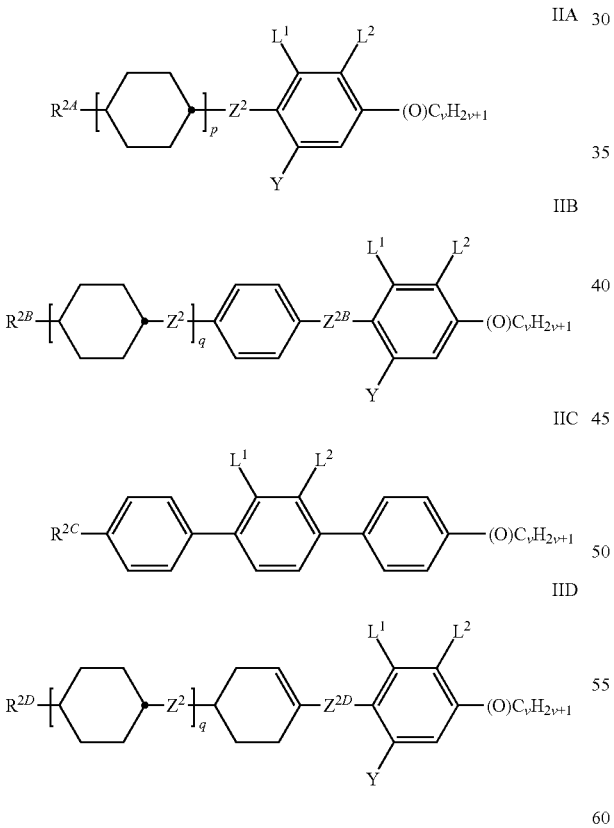

in which
$R^{2A}$, $R^{2B}$, $R^{2C}$ and $R^{2D}$ each independently of one another, denote H, an alkyl or alkenyl radical having up to 15 C atoms which is unsubstituted, monosubstituted by CN or CF$_3$ or at least monosubstituted by halogen, where one or more CH$_2$ groups in these radicals may each be replaced by —O—, —S—,

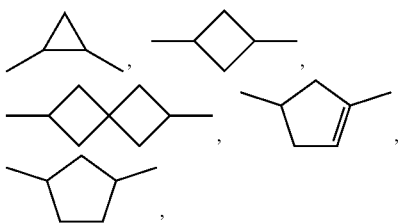

—C≡C—, —CF$_2$O—, —OCF$_2$—, —OC—O—, or —O—CO— in such a way that O atoms are not linked directly to one another;
$L^1$ and $L^2$ each, independently of one another, denote F, Cl, CF$_3$ or CHF$_2$;
Y denotes H, F, Cl, CF$_3$, CHF$_2$, or CH$_3$;
$Z^2$, $Z^{2B}$ and $Z^{2D}$ each, independently of one another, denote a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —CF═CF—, or —CH═CHCH$_2$O—;
(O) denotes O or a single bond;
p denotes 0, 1 or 2;
q denotes 0 or 1; and
v denotes 1, 2, 3, 4, 5, or 6;
wherein the medium comprises at least one compound of the formula IID-10 or CL

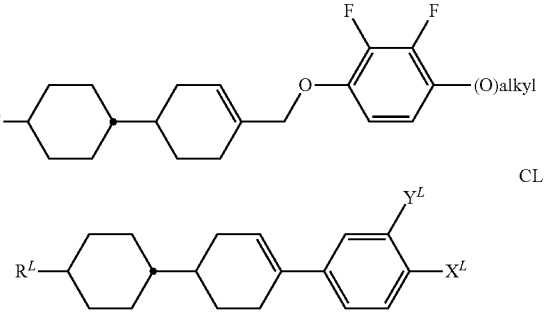

in which
$R^{2D}$ and (O) have the meanings defined above,
alkyl is a straight chain alkyl group having 1 to 6 C atoms,
$R^L$ denotes H, a straight chain or branched alkyl or alkoxy radical having up to 15 C atoms, or a straight chain or branched alkenyl radical having up to 15 C atoms, where one or more CH$_2$ groups in these alkyl, alkoxy, and alkenyl radicals may each be replaced, independently of one another, by

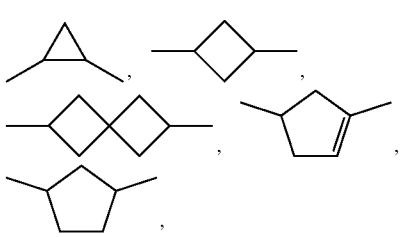

—C≡C—, —CF$_2$O—, —OCF$_2$—, —CH═CH—, —O—, —CO—O— or —O—CO— in such a way that

O atoms are not linked directly to one another, and in which, in addition, one or more H atoms may each be replaced by halogen, $X^L$ denotes F, Cl, CN, $CHF_2$, $CF_3$, $OCF_3$, or, identically or differently, has one of the meanings of $R^L$, $Y^L$ denotes H, F, Cl or $CH_3$.

The invention furthermore relates to a process for preparing an LC medium as described above and below, comprising the steps of mixing one or more compounds of the formula I with one or more compounds of the formulae IIA, IIB and/or IIC, one or more compounds of the formula IID, and, if the one or more compounds of the formula IID do not include at least one compound of formula IID-10, one or more compounds of formula CL, and optionally with one or more chiral dopants, and optionally with one or more polymerisable compounds and optionally with further LC compounds and/or additives.

The invention furthermore relates to the use of the LC media according to the invention for electro-optical purposes, preferably in displays, very preferably in displays of the VA, IPS or FFS type, in particular of the UB-FFS type.

The invention furthermore relates to the use of the LC media according to the invention in PSA displays, in particular to the use in PSA displays containing an LC medium, for the production of a tilt angle in the LC medium by in-situ polymerisation of polymerisable reactive mesogens (RM) in the PSA display, preferably in an electric or magnetic field.

The invention furthermore relates to an LC display comprising an LC medium according to the invention, in particular a VA, IPS, FFS or UB-FFS or PSA display, particularly preferably an FFS, UB-FFS, VA or a PS-VA display.

The invention furthermore relates to the use of LC media according to the invention in polymer stabilised SA-VA displays, and to a polymer stabilised SA-VA display comprising the LC medium according to the invention.

The invention furthermore relates to a process for manufacturing an LC display as described above and below, comprising the steps of filling or otherwise providing an LC medium, which optionally comprises one or more polymerisable compounds as described above and below, between the substrates of the display, and optionally polymerising the polymerisable compounds.

The LC media according to the invention show the following advantageous properties, in particular when used in UB-FFS displays:
excellent low-temperature stability (LTS)
improved contrast ratio of the display,
high transmission of the display,
a high clearing temperature,
a high voltage-holding-ratio,
low rotational viscosity
fast switching,
sufficient stability against heat and/or UV in particular when used outdoors.

In formula I, Ar denotes methylene or Ar denotes an aromatic hydrocarbon group having 6 to 40 C atoms or a heteroaromatic hydrocarbon group having 4 to 40 C atoms, comprising one, two, three or four aromatic and/or heteroaromatic rings including condensed rings that may be linked directly or via an alkylene linking group having 1 to 12 C atoms, in which one or more H atoms are optionally replaced with alkyl or alkoxy having 1 to 6 C atoms or alkenyl having 2 to 6 C atoms, or with CN, $CF_3$ or halogen, and in which one or more $CH_2$ groups may each, independently of one another, be replaced by —O—, —S—, —NH—, —N($C_1$-$C_4$-alkyl)-, —CO—, —CO—O—, —O—CO—, —O—CO—O—, —CH=CH— or —C≡C— in such a way that O or S atoms are not linked directly to one another.

Preferred aryl groups are benzene, naphthalene, anthracene, biphenyl, m-terphenyl, p-terphenyl, and (phenylalkyl) benzene in which alkyl is straight chain alkyl having 1 to 12 C atoms.

The compounds of formula I are described in EP3354710 A1 and EP3354709 A1.

In a preferred embodiment, the medium according to the invention comprises a compound of the formula I in which the parameter q is 3 and G denotes a group $Z^S$-HA.

In another preferred embodiment, the medium according to the invention comprises a compounds of the formula I in which the parameter q is 4 and G denotes H or $R^S$.

The compounds of formula I are preferably selected from the compounds of the formulae I-1, I-2 and I-3:

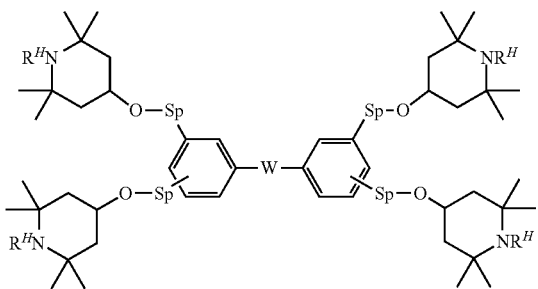

I-1

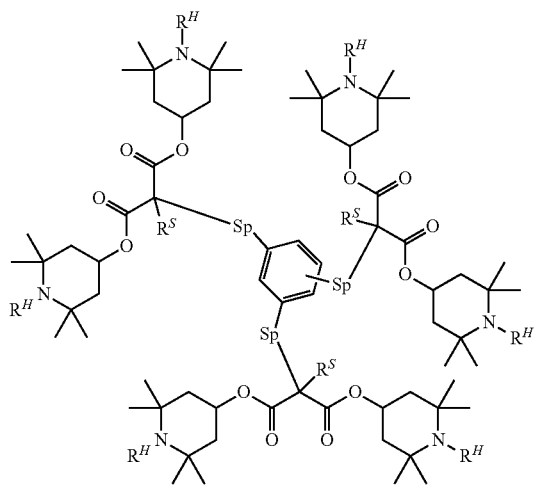

I-2

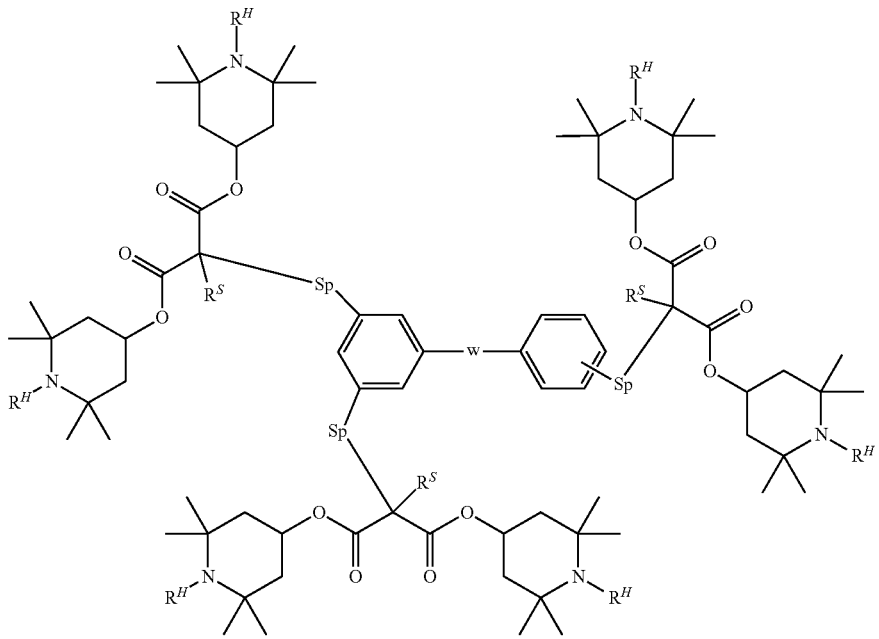

I-3 in which $R^H$ has the meanings given above and preferably denotes H or O●, Sp on each occurrence, identically or differently, denotes a spacer group, and W denotes linear or branched, optionally unsaturated alkylene having 1 to 12 C atoms, in which one or more non-adjacent —CH$_2$— groups may each be replaced with —O—.

Preferred compounds of formula I-1 are selected from the compounds of the formula I-1-1:

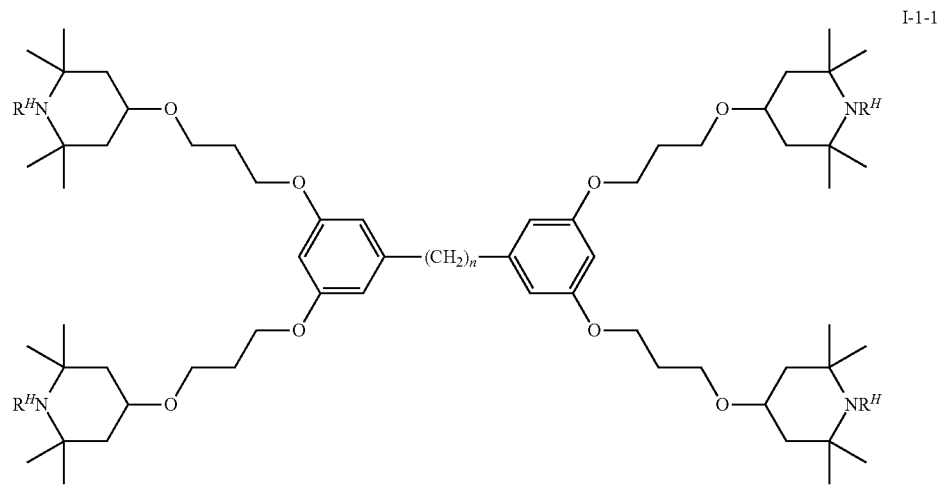

I-1-1 in which $R^H$ has the meanings given above and preferably denotes H or O■, and n is an integer from 0 to 12, preferably 5, 6, 7, 8 or 9, very preferably 7.

Preferred compounds of formula I-2 are selected from the compounds of the formula I-2-1:

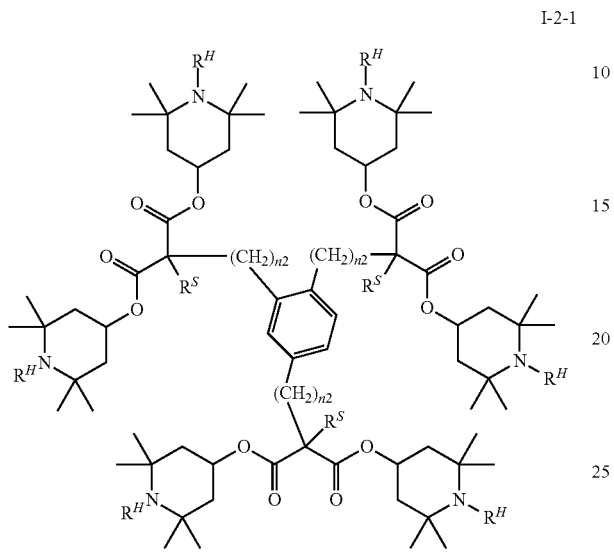

I-2-1 in which $R^H$ has the meanings given above and preferably denotes H or O■, and n2, on each occurrence identically or differently, preferably identically, is an integer from 1 to 12, preferably 2, 3, 4, 5, or 6, very preferably 3, and $R^S$ on each occurrence identically or differently, preferably identically, denotes alkyl having 1 to 6 C atoms, preferably n-butyl.

Preferred compounds of formula I-3 are selected from the compounds of the formula I-3-1:

in which $R^H$ has the meanings given above and preferably denotes H or O■, and n is an integer from 0 to 12, preferably 5, 6, 7, 8 or 9, very preferably 7.

In a preferred embodiment Ar denotes methylene and the compounds of the formula I are preferably selected from the compounds of the formula I-4:

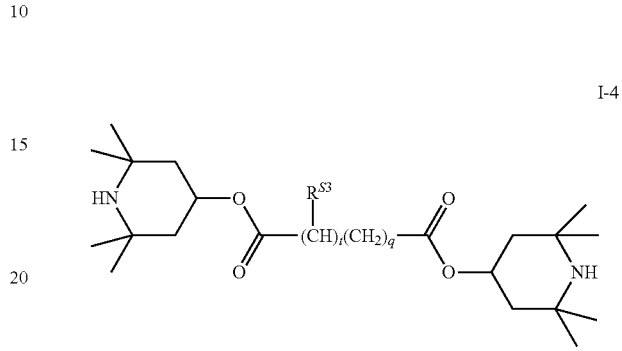

I-4 in which $R^{S3}$ denotes H or alkyl having 1 to 6 C atoms, preferably H or ethyl;

t is 0 or 1, and q is 0, 1, 2, 3, 4, 5, 6, 7, 8, or 9.

For example, the sum t+q can be, e.g., 5, 6, 7, 8, 9, or 10.

Particularly preferably, the compounds of formula I-4 are selected from the compounds of the formulae I-4-1 and I-4-2, preferably I-4-2.

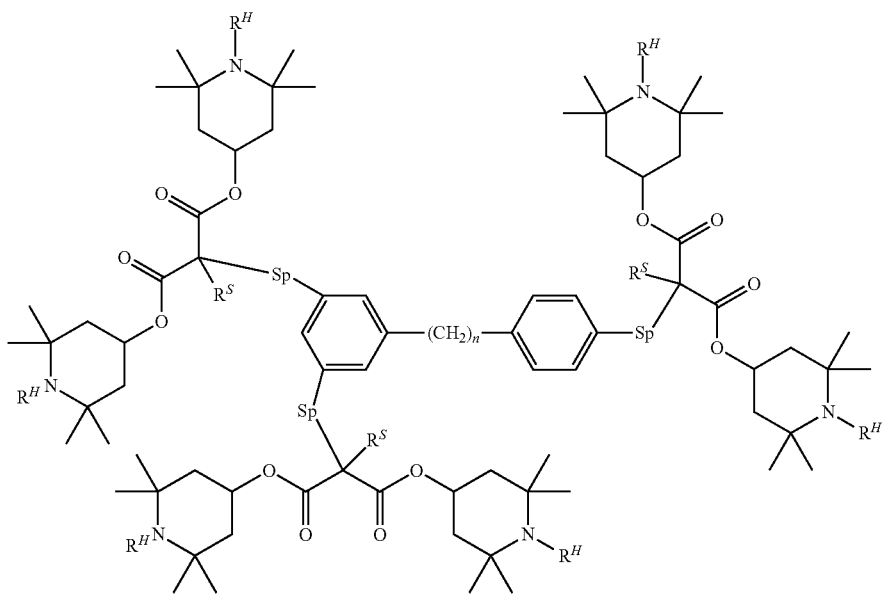

I-3-1

I-4-1
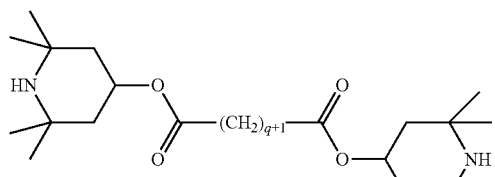
I-4-2
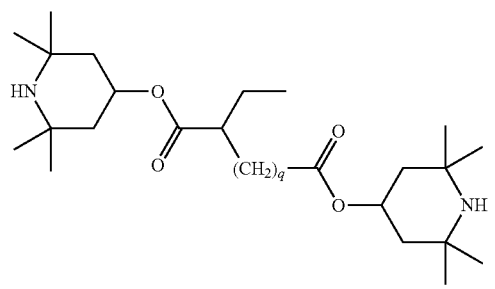
n which q is 0, 1, 2, 3, 4, 5, 6, 7, 8, or 9, preferably 6, 7 or 8, particularly preferably 7.
These compounds are distinguished by a very good solubility in liquid-crystalline media.
A very preferred compound of the formula I-4-2 is the compound of the formula I-4-2a
I-4-2a
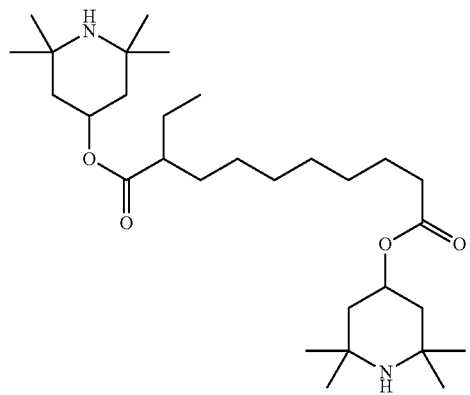
Preferred compounds of the formulae IIA, IIB, IIC and IID are indicated below:
IIA-1
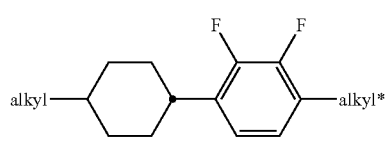
IIA-2
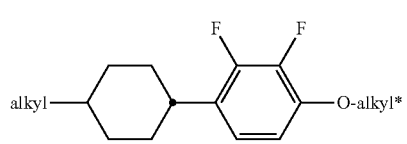
IIA-3
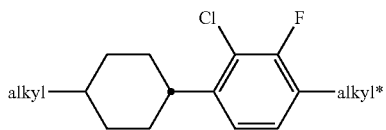
IIA-4
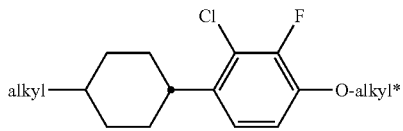
IIA-5
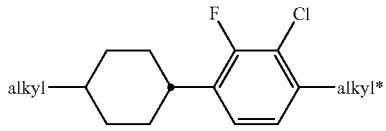
IIA-6
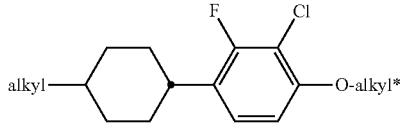
IIA-7
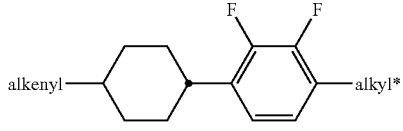
IIA-8
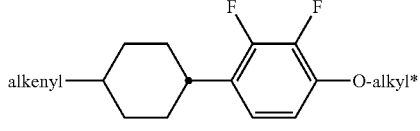
IIA-9
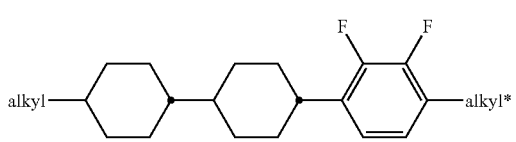
IIA-10
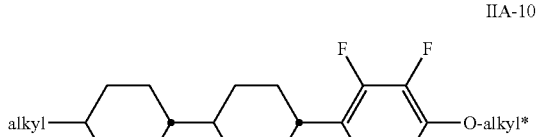
IIA-11
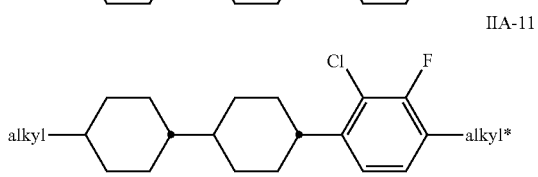
IIA-12
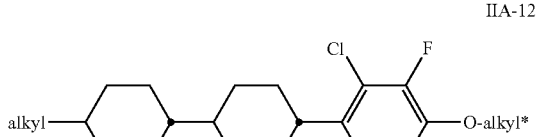
IIA-13
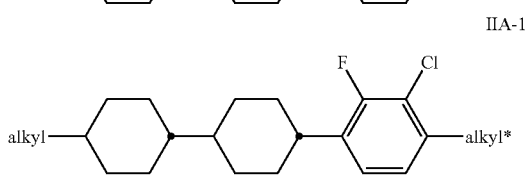

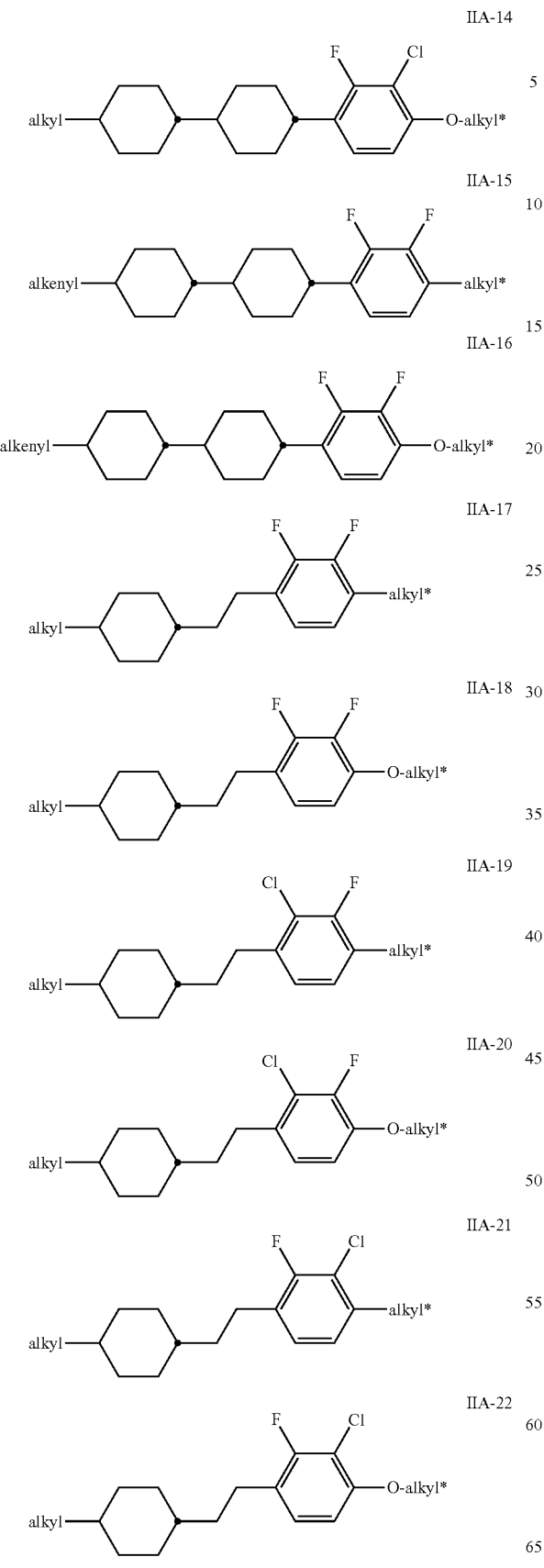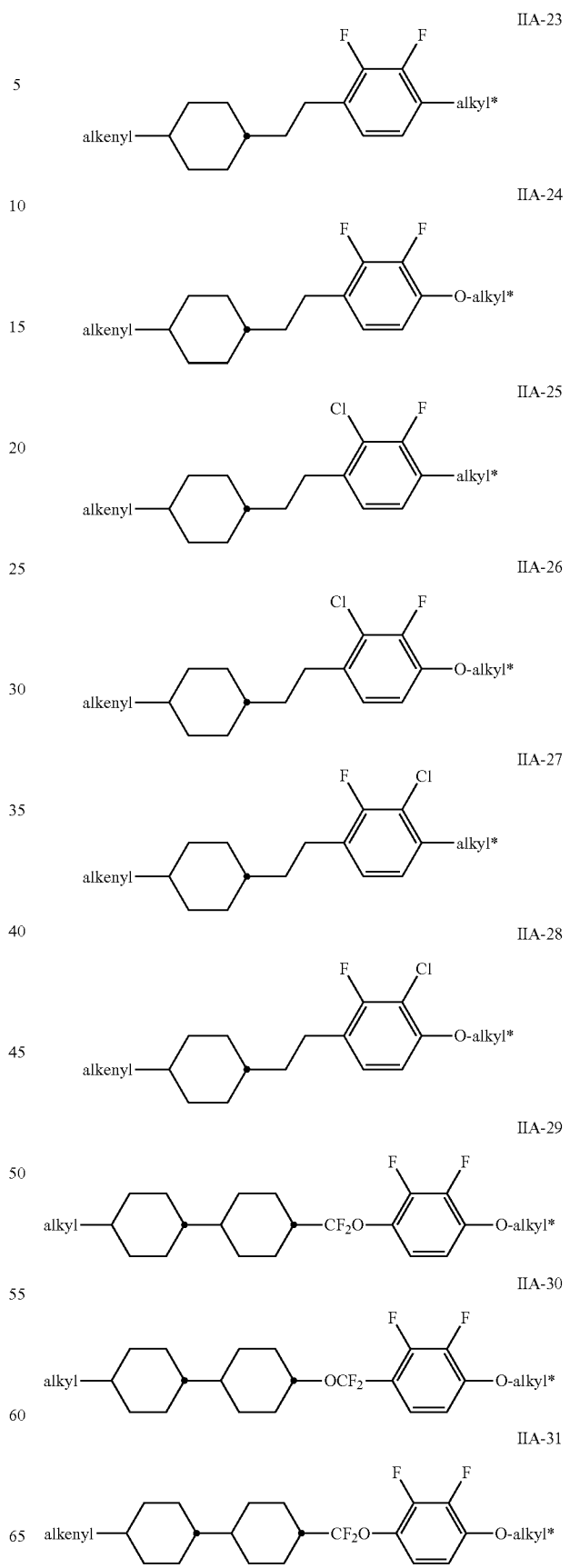

-continued
IIA-32
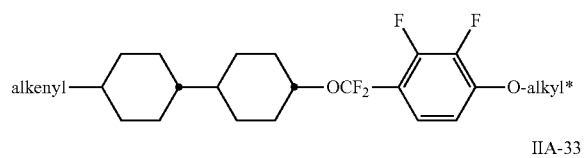
IIA-33
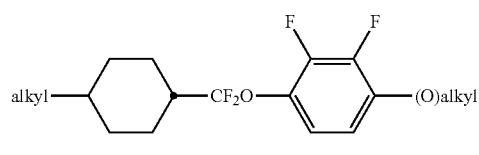
IIA-34
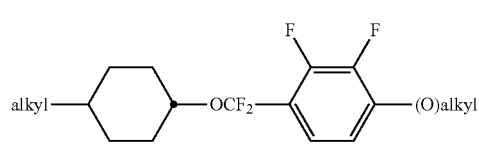
IIA-35
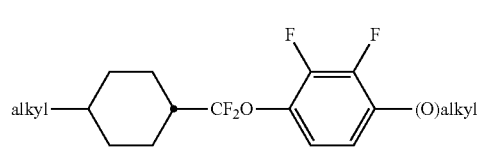
IIA-36
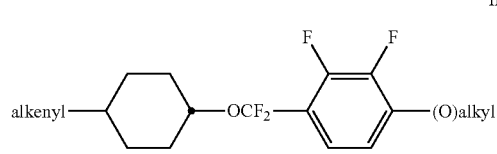
IIA-37
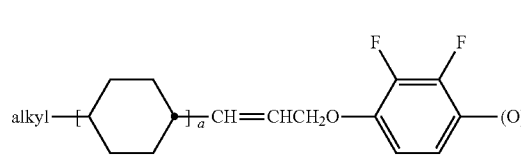
IIA-38
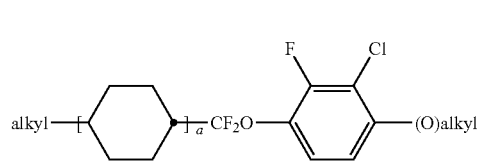
IIA-39
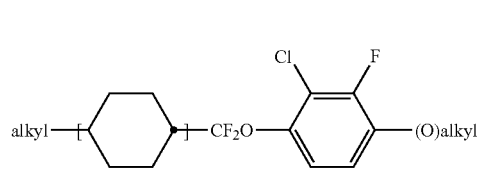
IIA-40
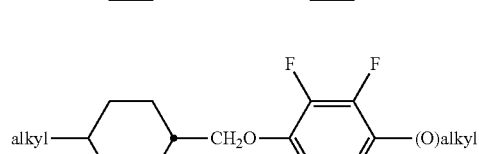
IIA-41
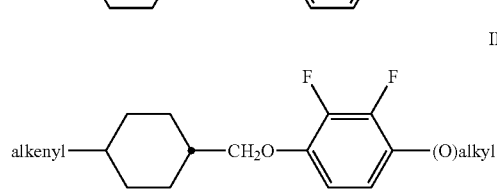
-continued
IIA-42
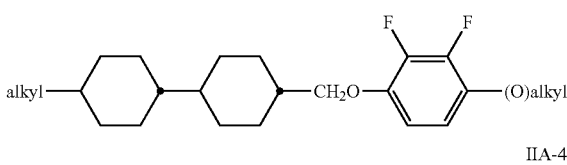
IIA-43
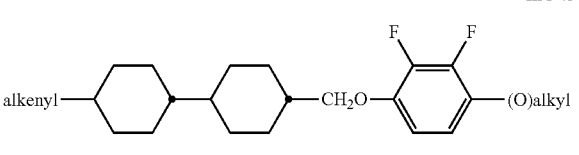
IIA-44
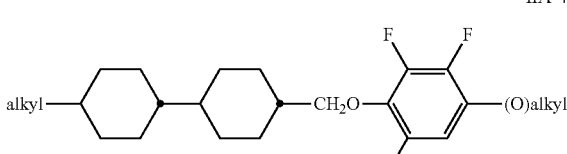
IIA-45
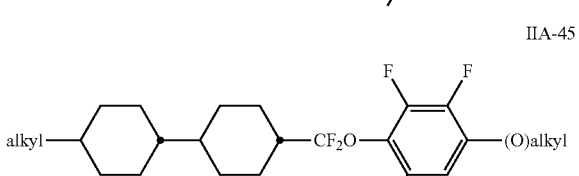
IIB-1
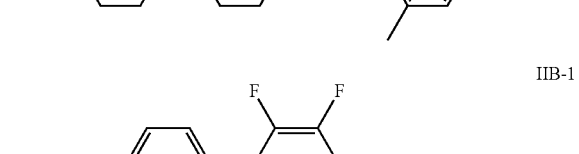
IIB-2
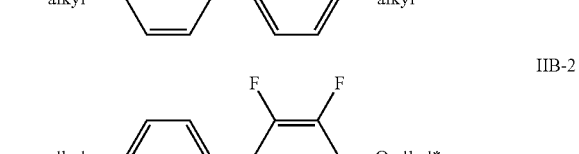
IIB-3
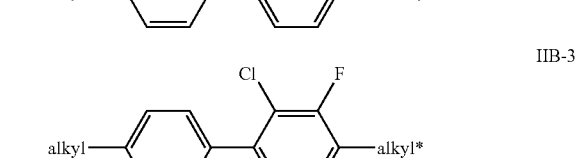
IIB-4
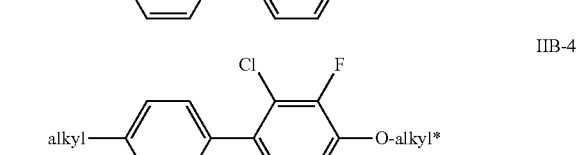
IIB-5
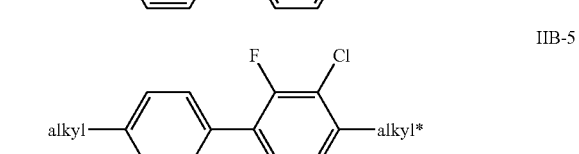
IIB-6
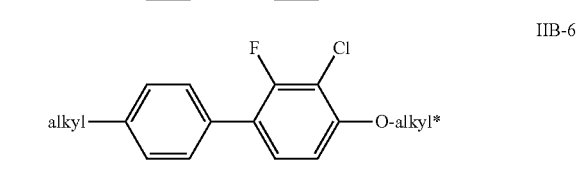

IIB-7
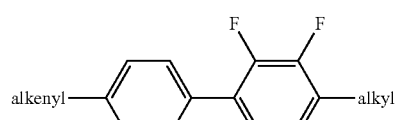
IIB-8
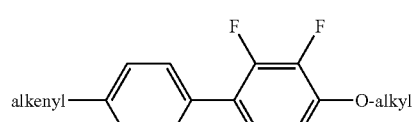
IIB-9
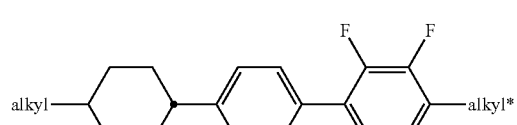
IIB-10
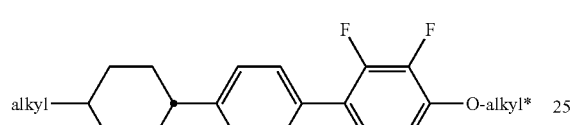
IIB-11
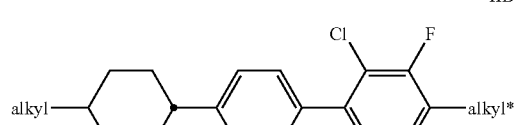
IIB-12
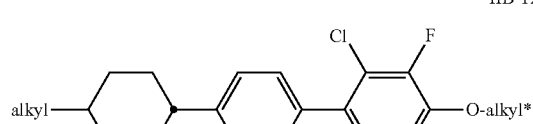
IIB-13
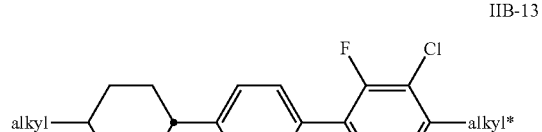
IIB-14
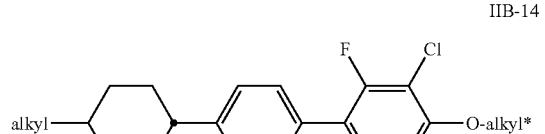
IIB-15
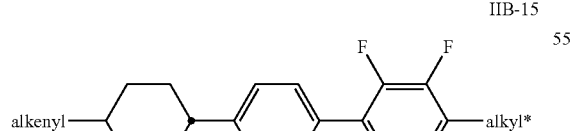
IIB-16
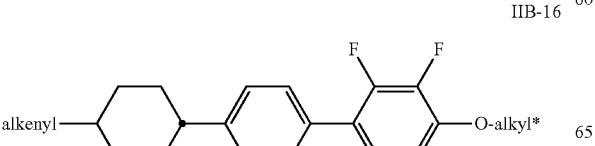
IIB-17
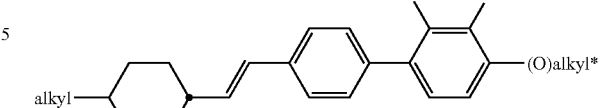
IIB-18
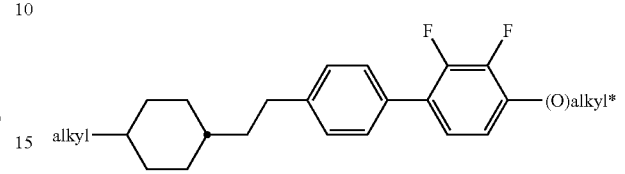
IIB-19
IIB-20
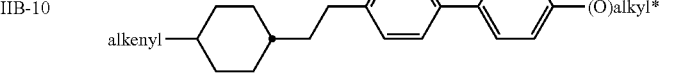
IIB-21
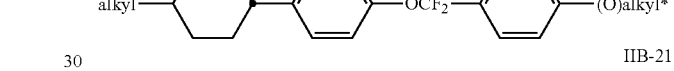
IIB-22
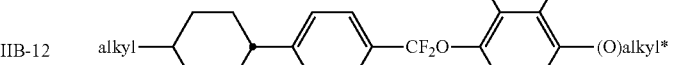
IIB-23
IIB-24
IIC-1
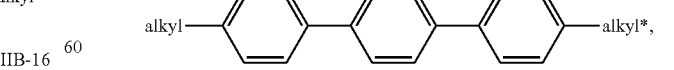
IID-1
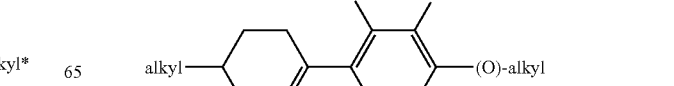

IID-2
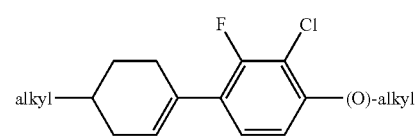

IID-3
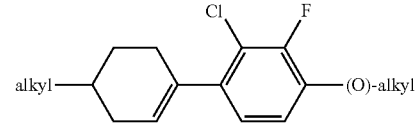

IID-4
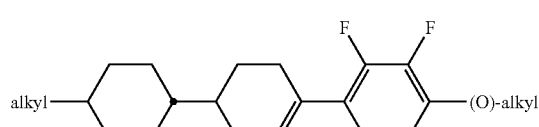

IID-5
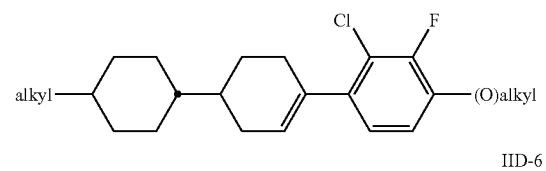

IID-6
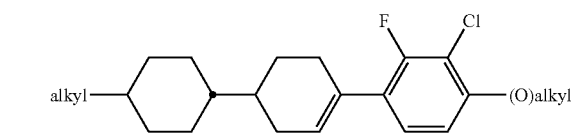

IID-7
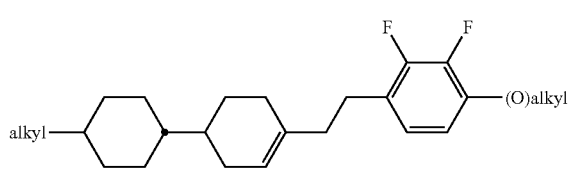

IID-8
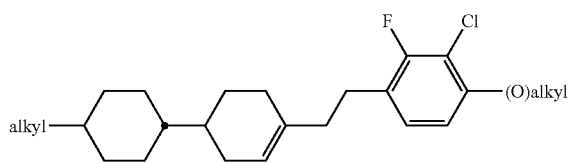

IID-9
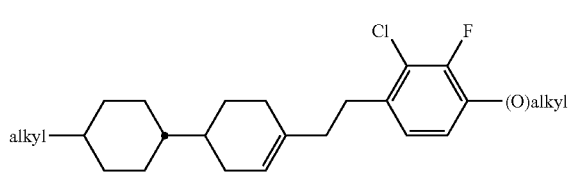

IID-10
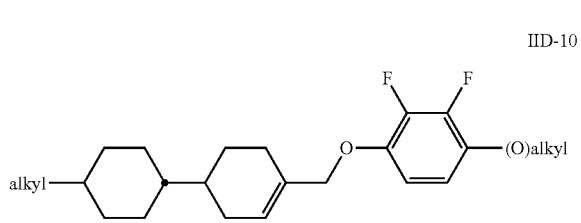

IID-11
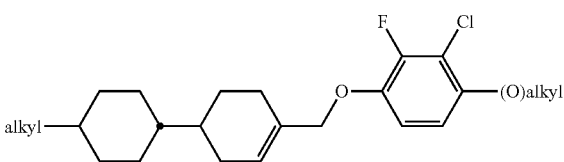

IID-12
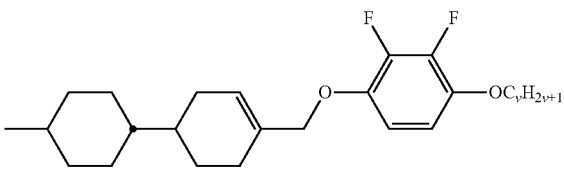

IID-13
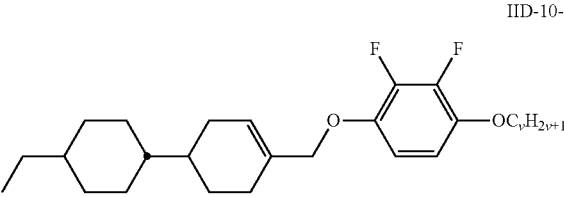

in which the parameter a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very preferred compounds of the formula IID are selected from the following sub-formulae:

IID-10-1
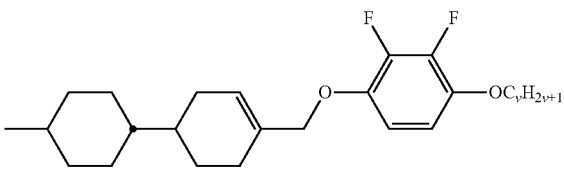

IID-10-2
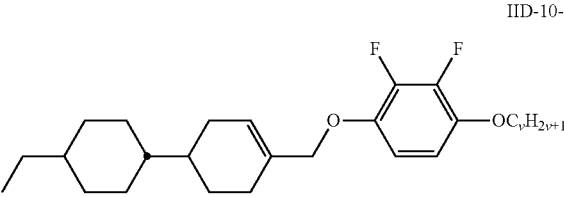

IID-10-3
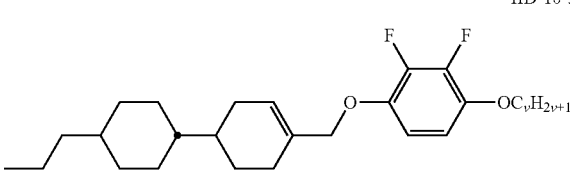

IID-10-4
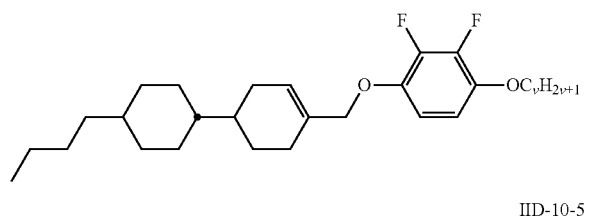
IID-10-5
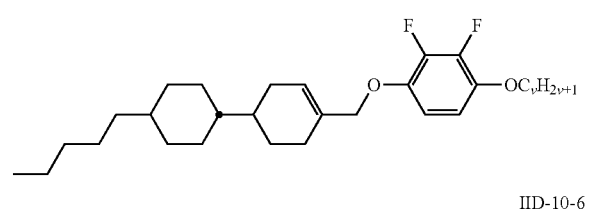
IID-10-6
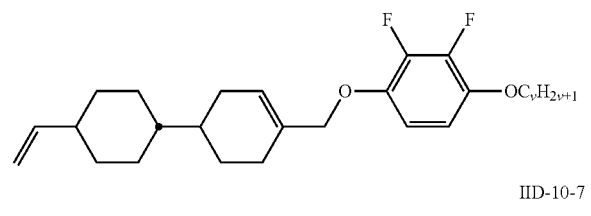
IID-10-7
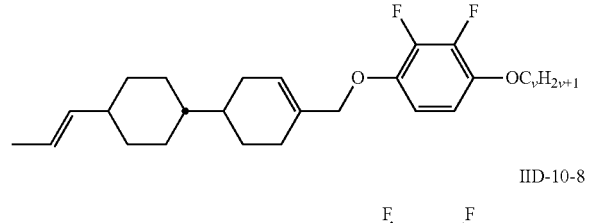
IID-10-8
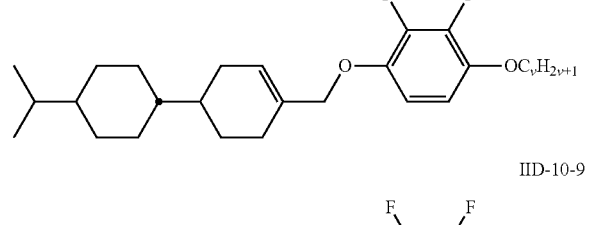
IID-10-9
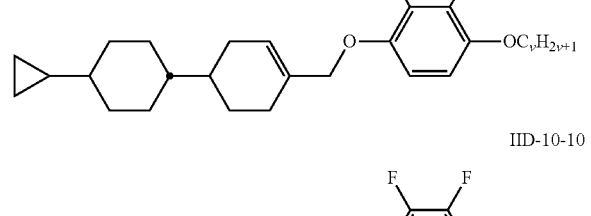
IID-10-10
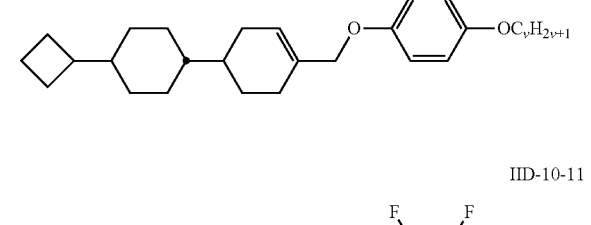
IID-10-11
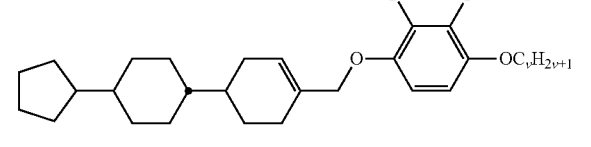
IID-10-12
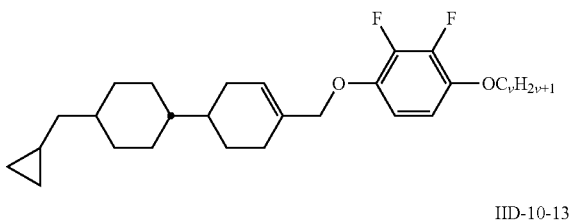
IID-10-13
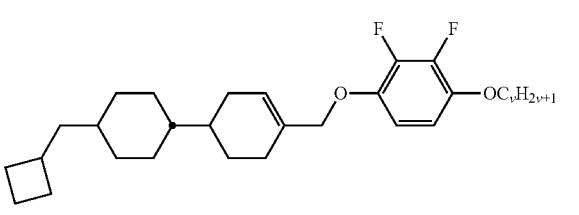
IID-10-14
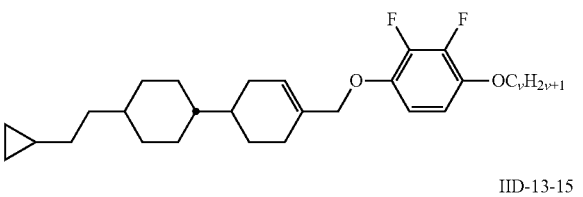
IID-13-15
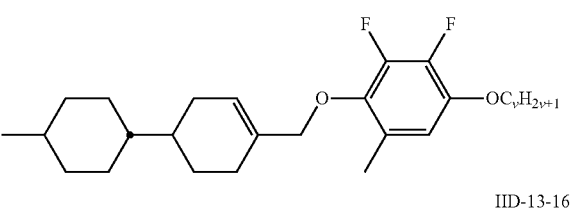
IID-13-16
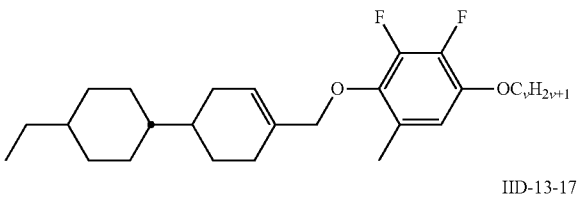
IID-13-17
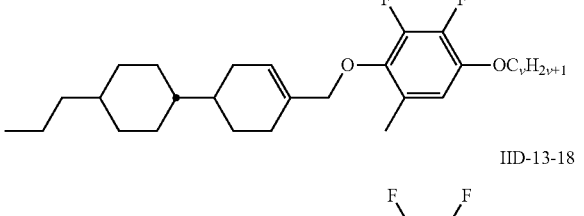
IID-13-18
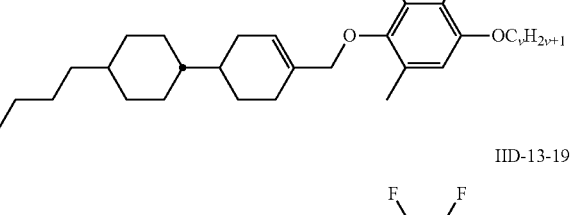
IID-13-19
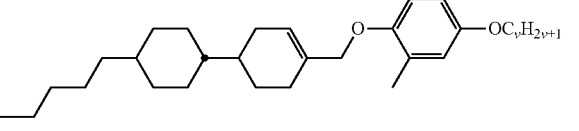

IID-13-20
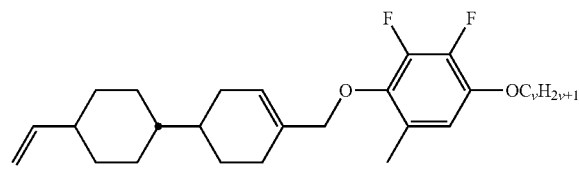

IID-13-21
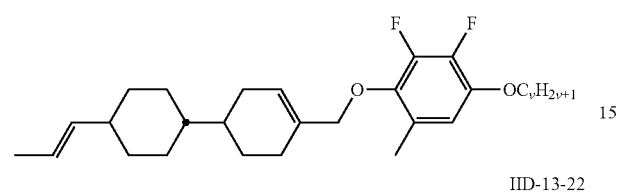

IID-13-22
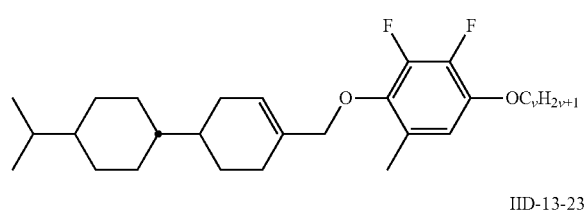

IID-13-23
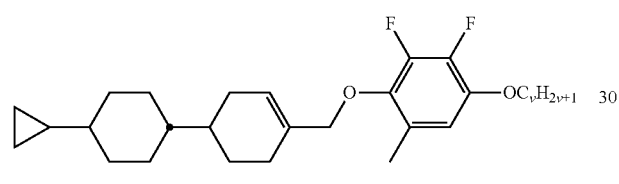

IID-13-24
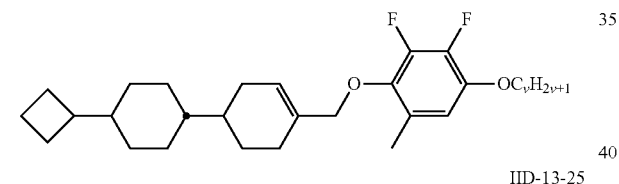

IID-13-25
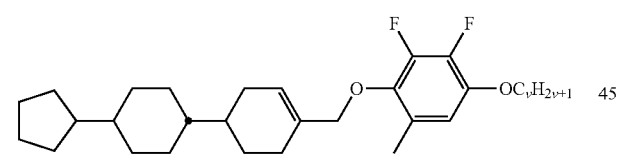

IID-13-26
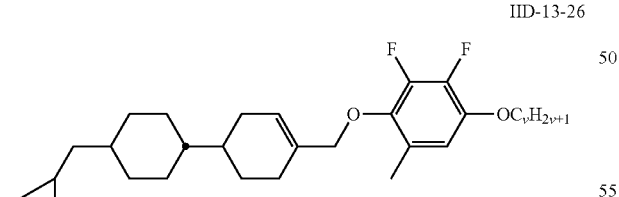

IID-13-27
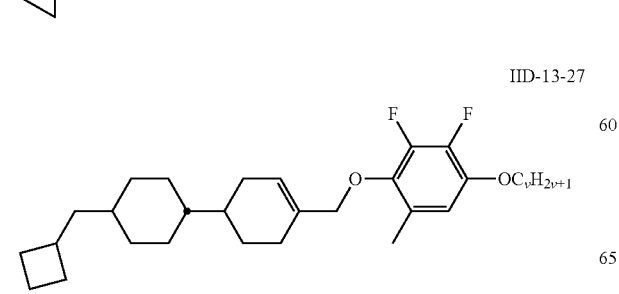

IID-13-28
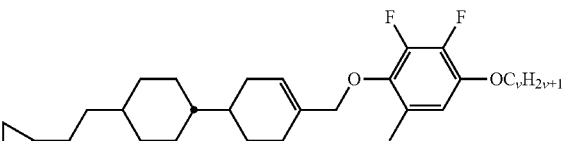

IID-10-29
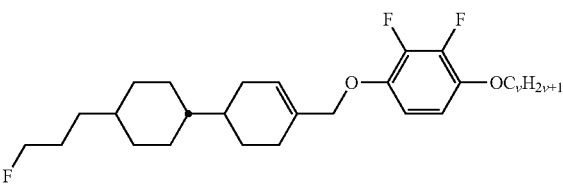

IID-10-30
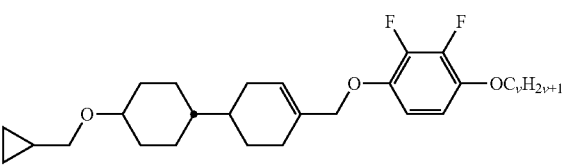

In a preferred embodiment, the medium comprises one or more compounds of formula IID-10a IID-10a
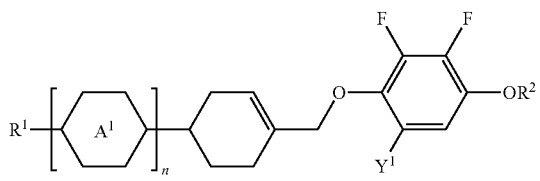

in which $R^1$ has one of the meanings given for $R^{2D}$ in formula IID, $A^1$ is 1,4-cyclohexylene, n is 0 or 1, and $Y^1$ is H, F, Cl, $CF_3$, $CHF_2$, or $CH_3$, and $R^2$ denotes

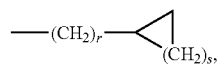

in which r is 0, 1, 2, 3, 4, 5 or 6 and s is 1, 2 or 3.

Preferred compounds of formula IID-10a are the compounds IID-10a-1 to IID-10a-14.

IID-10a-1
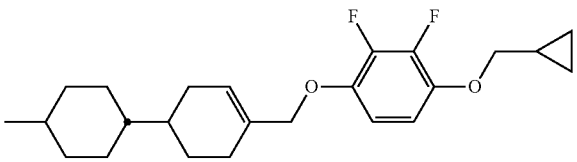

IID-10a-2
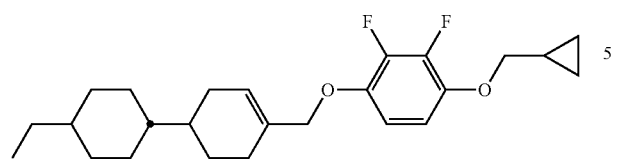

IID-10a-3
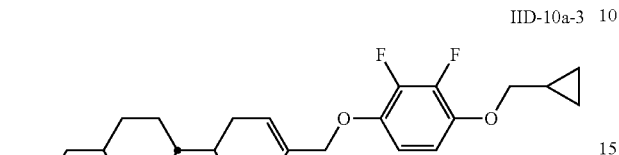

IID-10a-4
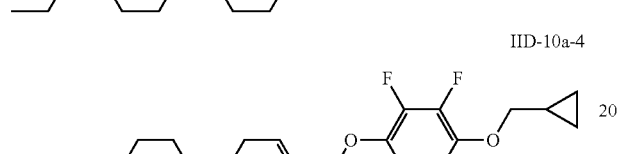

IID-10a-5
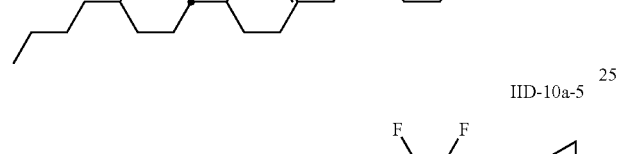

IID-10a-6
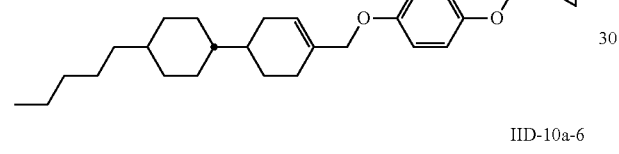

IID-10a-7
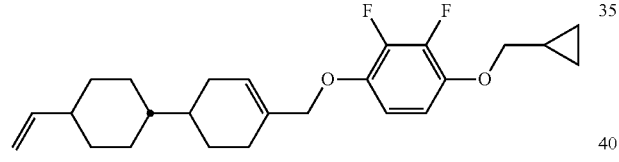

IID-10a-8
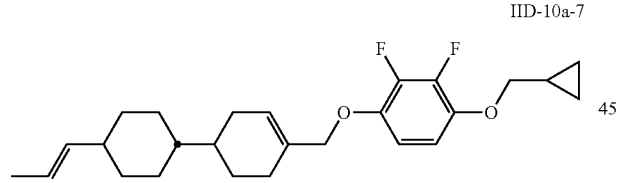

IID-10a-9
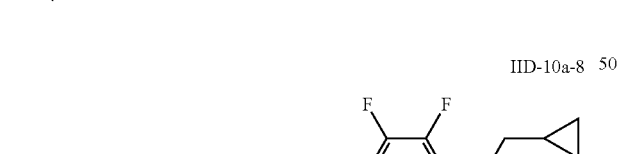

IID-10a-10
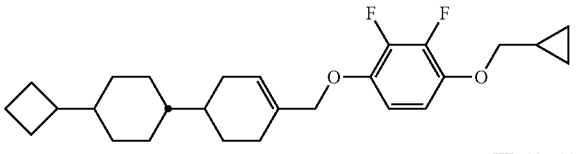

IID-10a-11
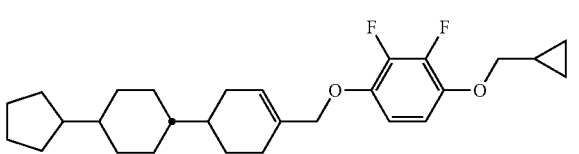

IID-10a-12
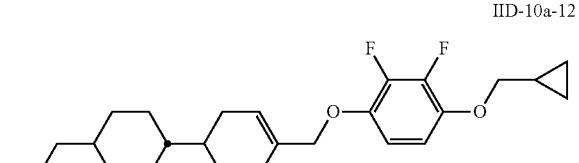

IID-10a-13

IID-10a-14
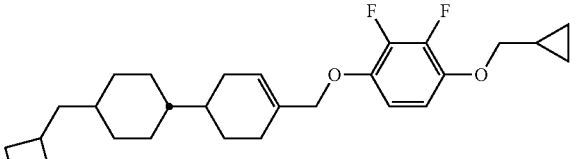

Particularly preferred mixtures according to the invention comprise one or more compounds of the formulae IIA-2, IIA-8, IIA-10, IIA-16, IIA-18, IIA-40, IIA-41, IIA-42, IIA-43, IIB-2, IIB-10, IIB-16, IIC-1, IID-4, and IID-10.

Preferred media according to the invention comprise at least one compound of the formula IIC-1, IIC-1
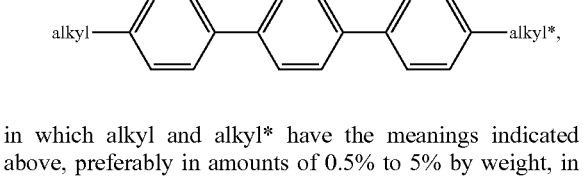

in which alkyl and alkyl* have the meanings indicated above, preferably in amounts of 0.5% to 5% by weight, in particular 1% to 3% by weight.

In particular, the medium comprises one or more compounds of the formula IIA-2 selected from the following sub-formulae:

IIA-2-1
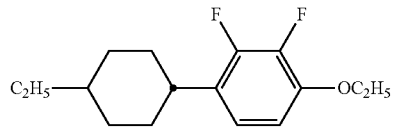

IIA-2-2
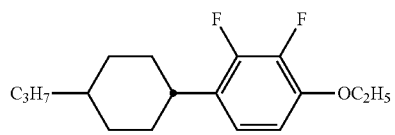

IIA-2-3
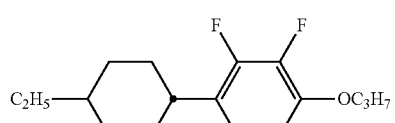

IIA-2-4
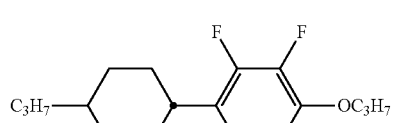

IIA-2-5
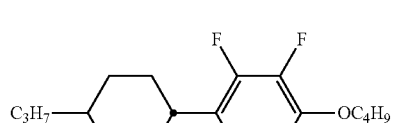

Alternatively, preferably in addition to the one or more compounds of the formulae IIA-2-1 to IIA-2-5, the medium comprises one or more compounds of the formulae IIA-2a-1 to IIA-2a-5:

IIA-2a-1
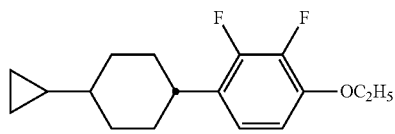

IIA-2a-2
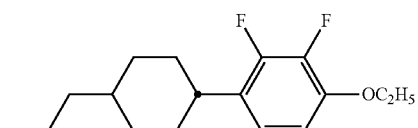

IIA-2a-3
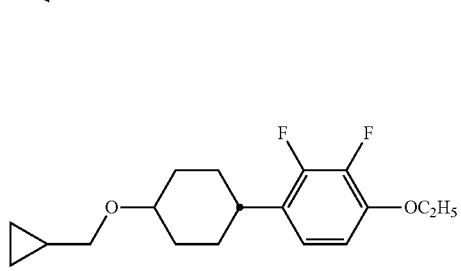

IIA-2a-4
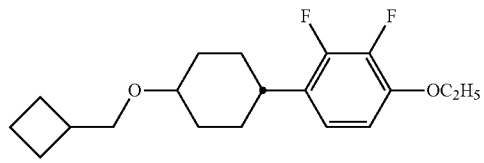

IIA-2a-5
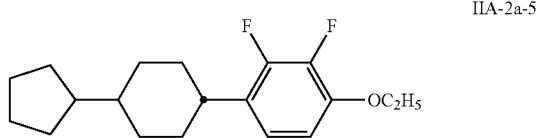

In particular, the medium comprises one or more compounds of the formula IIA-10 selected from the following sub-formulae:

IIA-10-1
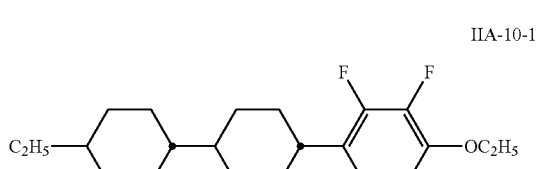

IIA-10-2
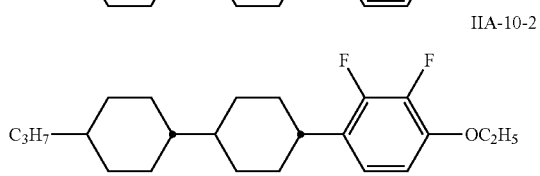

IIA-10-3

IIA-10-4
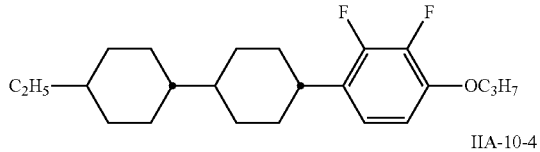

IIA-10-5
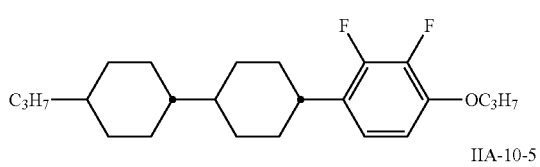

Alternatively, preferably in addition to the compounds of the formulae IIA-10-1 to IIA-10-5, the medium comprises one or more compounds of the formulae IIA-10a-1 to IIA-10a-5:

IIA-10a-1
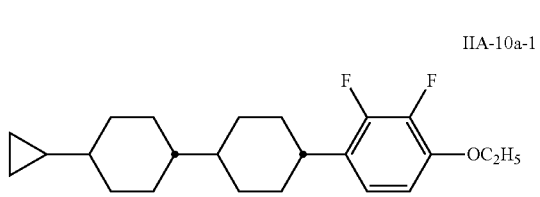

IIA-10a-2
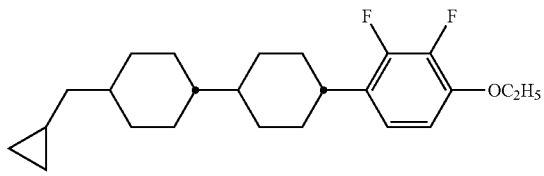

IIA-10a-3
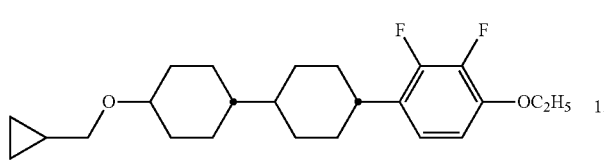

IIA-10a-4
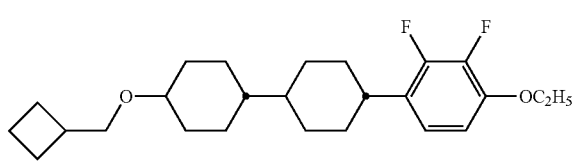

IIA-10a-5
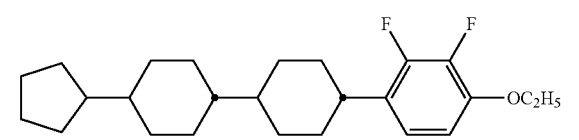

In particular, the medium comprises one or more compounds of the formula IIB-10 selected from the following sub-formulae:

IIB-10-1
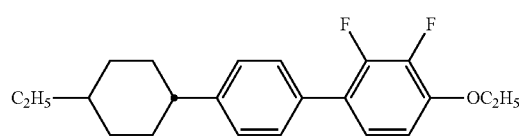

IIB-10-2
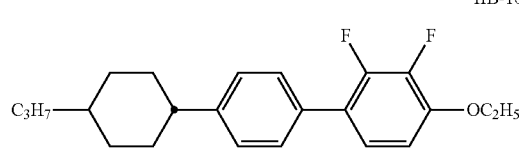

IIB-10-3
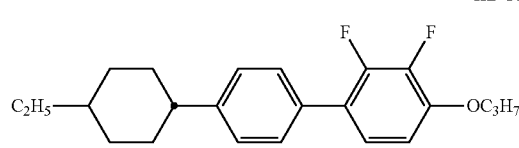

IIB-10-4
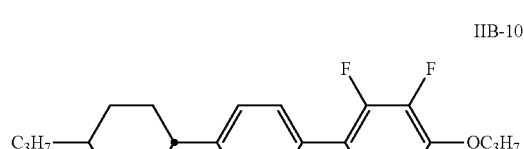

IIB-10-5
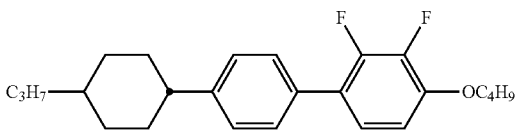

Alternatively, preferably in addition to the compounds of the formulae IIB-10-1 to IIB-10-5, the medium comprises one or more compounds of the formulae IIB-10a-1 to IIB-10a-5:

IIB-10a-1
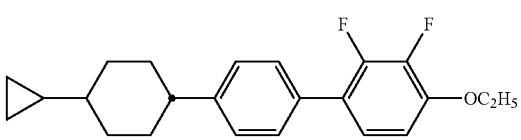

IIB-10a-2
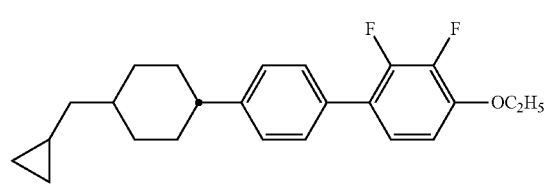

IIB-10a-3
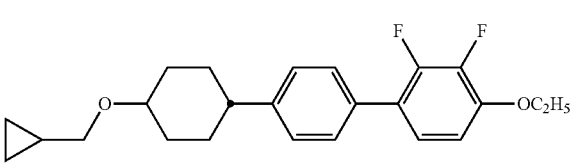

IIB-10a-4
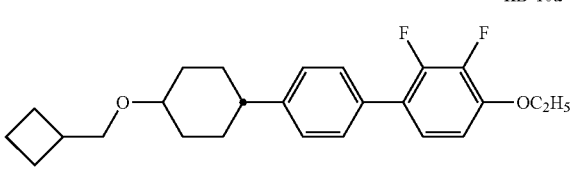

IIB-10a-5
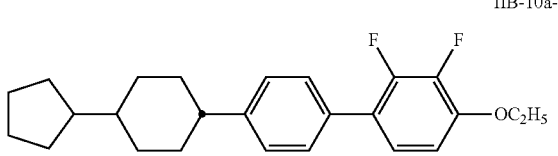

The compounds of formula CL are preferably selected form the group of compounds of the formulae CL-1, CL-2 and CL-3:

CL-1
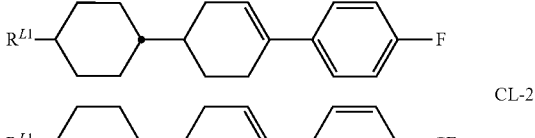

CL-2
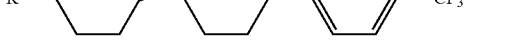

CL-3

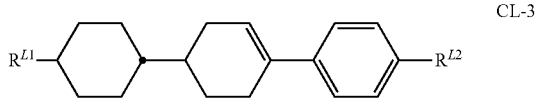

in which

R$^{L1}$ and R$^{L2}$, identically or differently, have the meanings given above for formula I and, preferably denote alkyl or alkenyl having 1 to 7 C atoms or 2 to 7 C atoms, respectively, in which a CH$_2$ group may each be replaced by cyclopropane-1,2-diyl.

Very preferred compounds of the formula I are selected from the compounds of the formulae CL-3-1 to CL-3-12:

CL-3-1

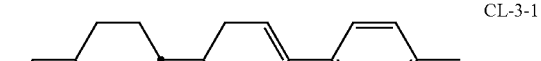

CL-3-2

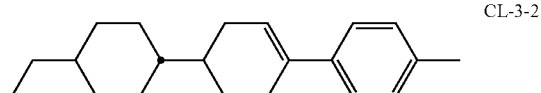

CL-3-3

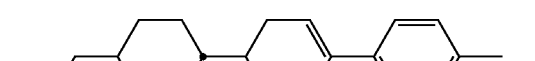

CL-3-4

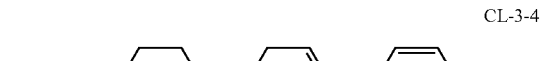

CL-3-5

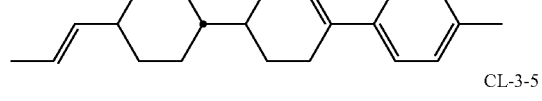

CL-3-6

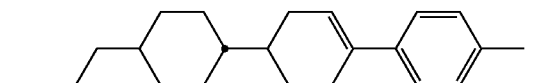

CL-3-7

CL-3-8

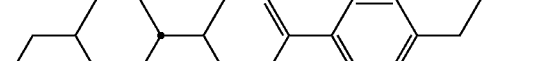

CL-3-9

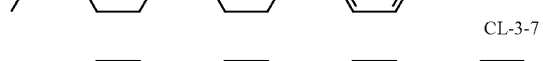

CL-3-10

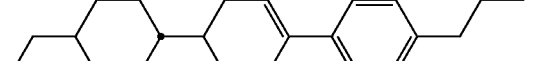

CL-3-11

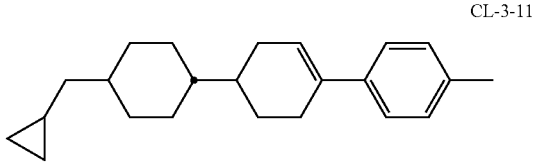

CL-3-12

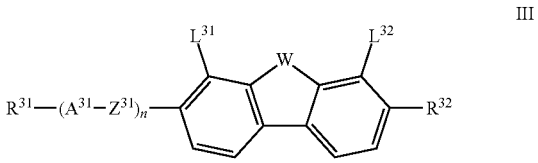

In a preferred embodiment, the medium according to the invention comprises the compound CL-3-1.

The medium according to the invention preferably comprises one or more compounds of formula III

III

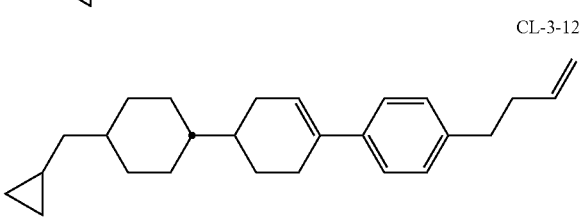

in which

R$^{31}$ and R$^{32}$ each, independently of one another, denote H, an alkyl or alkoxy radical having 1 to 15 C atoms, where one or more CH$_2$ groups in these radicals may each be replaced, independently of one another, by

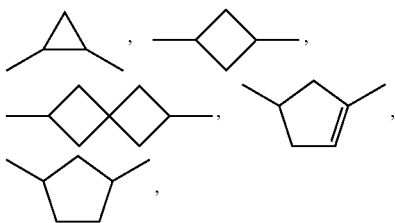

—C≡C—, —CF$_2$O—, —OCF$_2$—, —CH=CH—, by —O—, —CO—O— or —O—CO— in such a way that O atoms are not linked directly to one another, and in which one or more H atoms may each be replaced by halogen, A$^{31}$ on each occurrence, independently of one another, denotes a) 1,4-cyclohexenylene or 1,4-cyclohexylene radical, in which one or two non-adjacent CH$_2$ groups may each be replaced by —O— or —S—, b) a 1,4-phenylene radical, in which one or two CH groups may each be replaced by N, or c) a radical from the group spiro[3.3]heptane-2,6-diyl, 1,4-bicyclo[2.2.2]-octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) may be mono- or polysubstituted by halogen atoms, n denotes 0, 1 or 2, preferably 0 or 1, $Z^{31}$ on each occurrence independently of one another denotes —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, and $L^{31}$ and $L^{32}$ each, independently of one another, denote F, Cl, CF$_3$ or CHF$_2$, preferably H or F, most preferably F, and W denotes O or S.

The compounds of formula III are preferably selected from the compounds of the formula III-1 and/or III-2

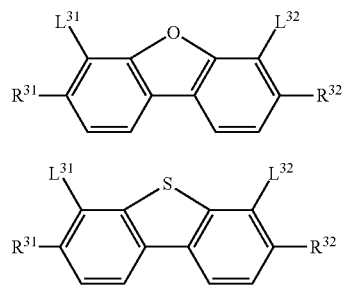

III-1

III-2 in which the occurring groups have the same meanings as given under formula III above and preferably $R^{31}$ and $R^{32}$ each, independently of one another, an alkyl, alkenyl or alkoxy radical having up to 15 C atoms, more preferably one or both of them denote an alkoxy radical, and $L^{31}$ and $L^{32}$ each preferably denote F.

Preferably, the compounds of the formula III-1 are selected from the group of compounds of the formulae III-1-1 to III-1-11, preferably of formula III-1-6,

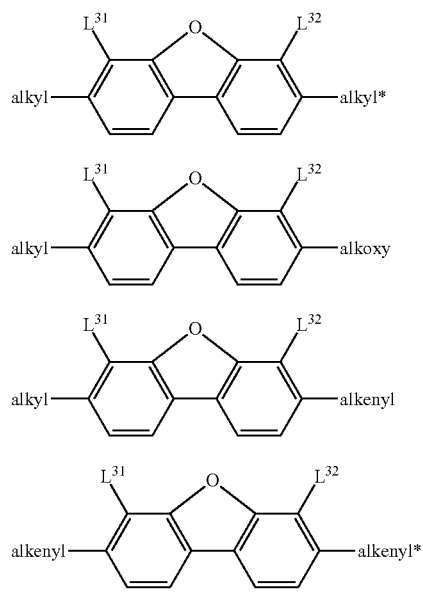

III-1-1

III-1-2

III-1-3

III-1-4

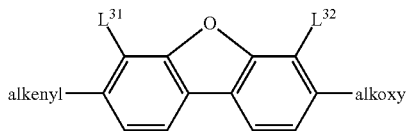

III-1-5

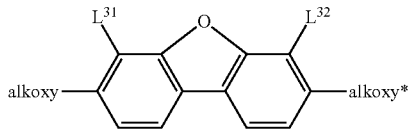

III-1-6

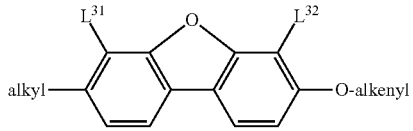

III-1-7

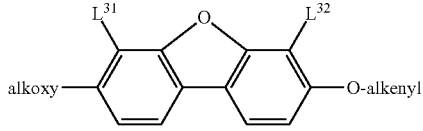

III-1-8

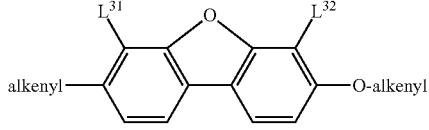

III-1-9

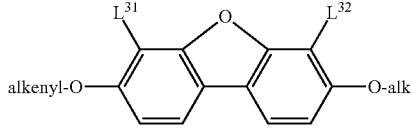

III-1-10 in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{31}$ and $L^{32}$ each, independently of one another, denote F or Cl, preferably both F.

Preferably, the compounds of the formula III-2 are selected from the group of compounds of the formulae III-2-1 to III-2-10, preferably of formula III-2-6,

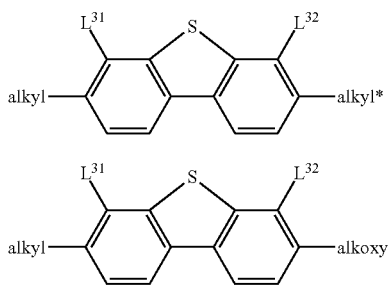

III-2-1

III-2-2

-continued

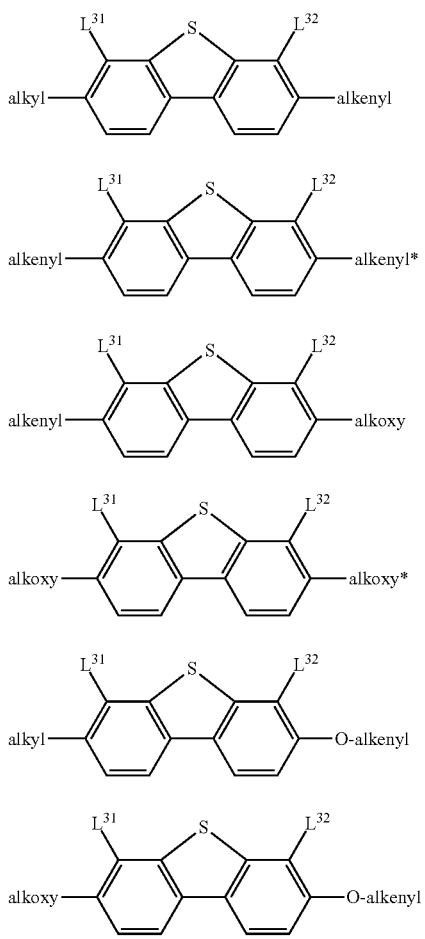

III-2-3

III-2-4

III-2-5

III-2-6

III-2-7

III-2-8

III-2-9

III-2-10 in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{31}$ and $L^{32}$ each, independently of one another, denote F or Cl, preferably both F.

Optionally the medium comprises one or more compounds of the formula IIIA-1 and/or IIIA-2

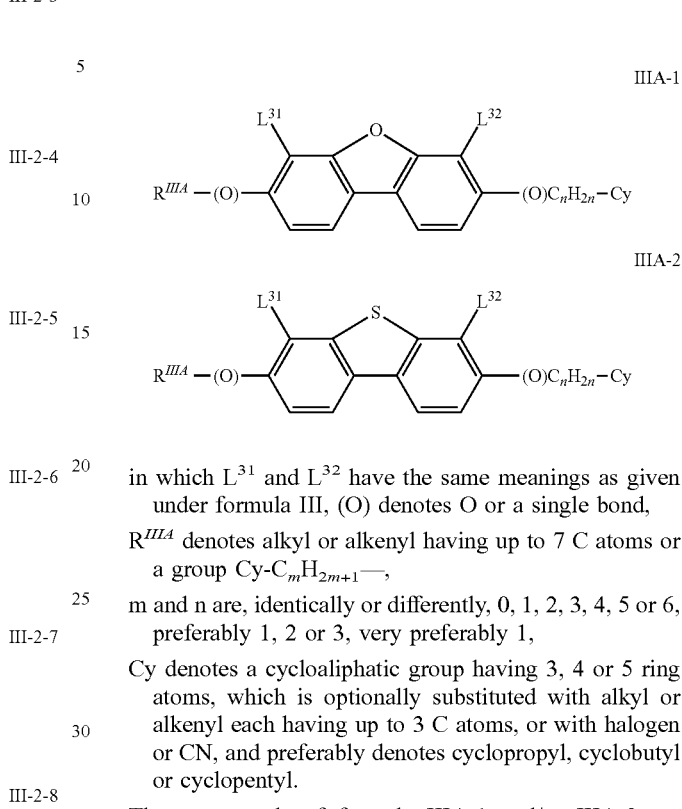

in which $L^{31}$ and $L^{32}$ have the same meanings as given under formula III, (O) denotes O or a single bond, $R^{IIIA}$ denotes alkyl or alkenyl having up to 7 C atoms or a group $Cy\text{-}C_mH_{2m+1}\text{—}$, m and n are, identically or differently, 0, 1, 2, 3, 4, 5 or 6, preferably 1, 2 or 3, very preferably 1, Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula IIIA-1 and/or IIIA-2 are contained in the medium either alternatively or in addition to the compounds of formula III, preferably additionally.

Very preferred compounds of the formulae IIIA-1 and IIIA-2 are the following:

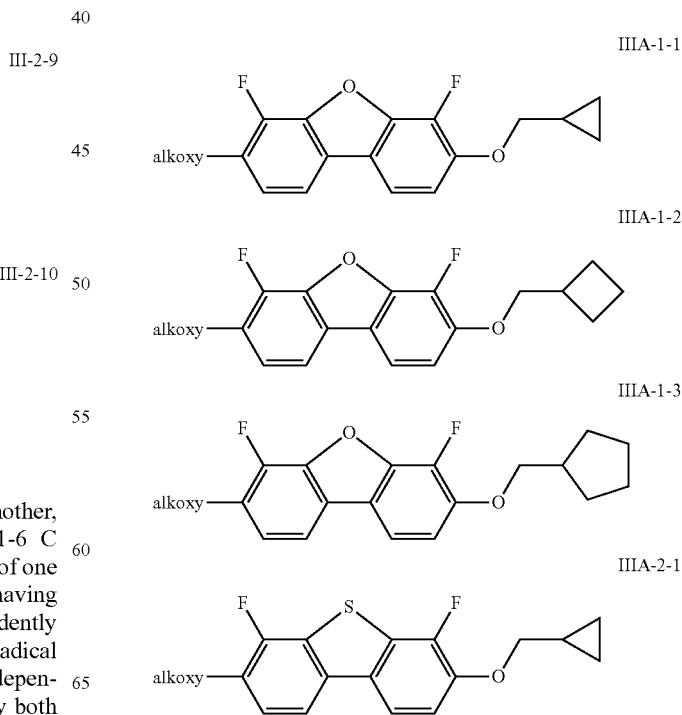

IIIA-2-2

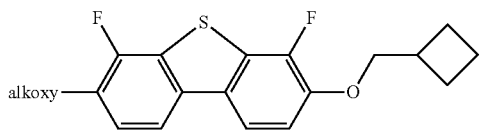

IIIA-2-3

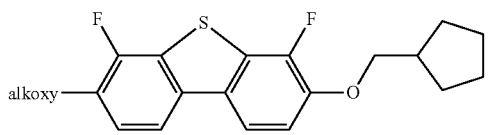

in which alkoxy denotes a straight-chain alkoxy radical having 1-6 C atoms or alternatively —(CH$_2$)$_n$F in which n is 2,3,4, or 5, preferably C$_2$H$_4$F.

In a preferred embodiment of the present invention, the medium comprises one or more compounds of formula III-3

III-3

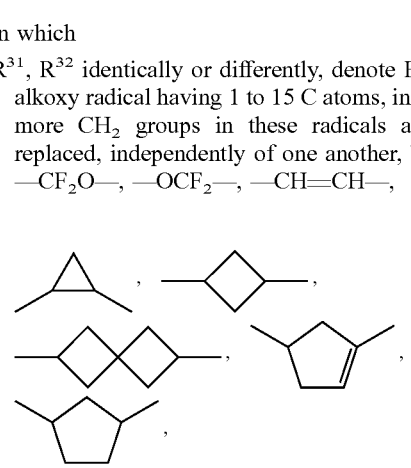

in which

R$^{31}$, R$^{32}$ identically or differently, denote H, an alkyl or alkoxy radical having 1 to 15 C atoms, in which one or more CH$_2$ groups in these radicals are optionally replaced, independently of one another, by —C≡C—, —CF$_2$O—, —OCF$_2$—, —CH═CH—, —O—, —CO—O— or —O—CO— in such a way that O atoms are not linked directly to one another, and in which, in addition, one or more H atoms may each be replaced by halogen.

The compounds of formula III-3 are preferably selected from the group of compounds of the formulae III-3-1 to III-3-10:

III-3-1

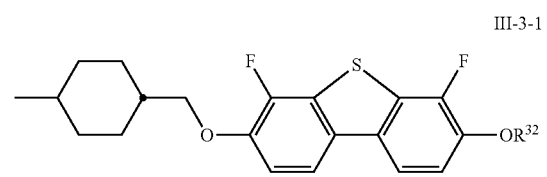

III-3-2

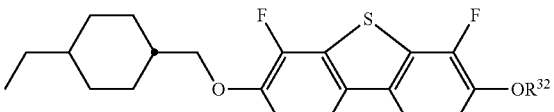

III-3-3

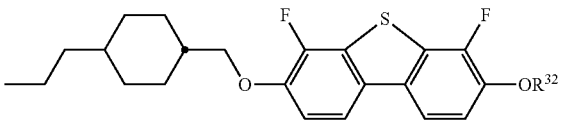

III-3-4

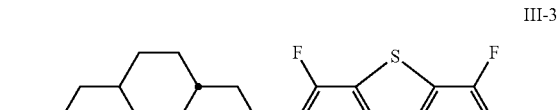

III-3-5

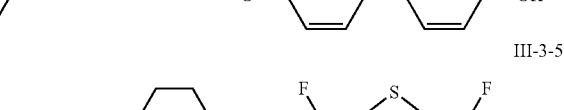

III-3-6

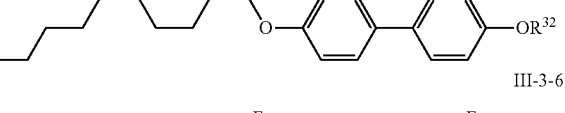

III-3-7

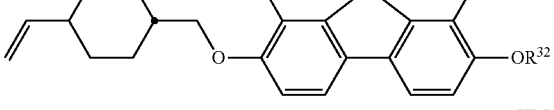

III-3-8

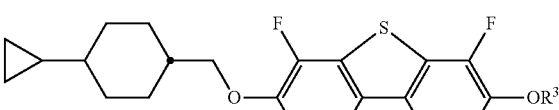

III-3-9

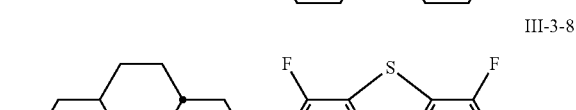

III-3-10

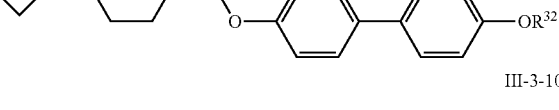

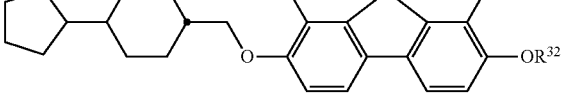

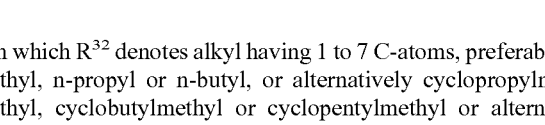

in which R$^{32}$ denotes alkyl having 1 to 7 C-atoms, preferably ethyl, n-propyl or n-butyl, or alternatively cyclopropylmethyl, cyclobutylmethyl or cyclopentylmethyl or alternatively —(CH$_2$)$_n$F in which n is 2,3,4, or 5, preferably C$_2$H$_4$F.

In a preferred embodiment of the present invention, the medium comprises one or more compounds of the formulae III-4 to III-6, preferably of formula III-5,

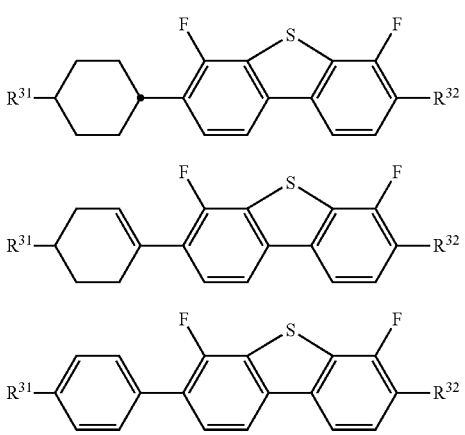

in which the parameters have the meanings given above, $R^{31}$ preferably denotes straight-chain alkyl and $R^{32}$ preferably denotes alkoxy, each having 1 to 7 C atoms.

In a preferred embodiment the medium comprises one or more compounds of the formula I selected from the group of compounds of formulae III-7 to III-9, preferably of formula III-8,

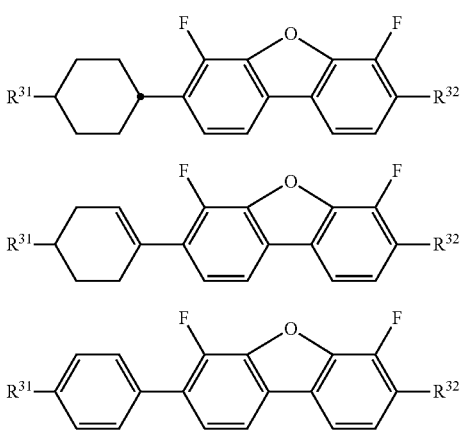

in which the parameters have the meanings given above, $R^{31}$ preferably denotes straight-chain alkyl and $R^{32}$ preferably denotes alkoxy each having 1 to 7 C atoms.

In a preferred embodiment, the medium comprises one or more compounds of the formula IV,

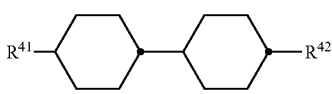

in which
$R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and
$R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

The compounds of the formula IV are preferably selected from the group of the compounds of the formulae IV-1 to IV-4,

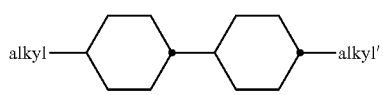

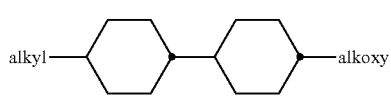

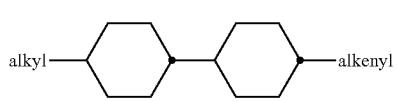

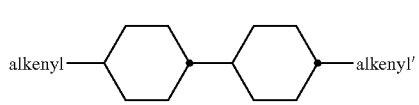

in which
alkyl and alkyl', independently of one another, denote alkyl having 1 to 7 C atoms, preferably having 2 to 5 C atoms,
alkenyl denotes an alkenyl radical having 2 to 5 C atoms, preferably having 2 to 4 C atoms, particularly preferably 2 C atoms,
alkenyl' denotes an alkenyl radical having 2 to 5 C atoms, preferably having 2 to 4 C atoms, particularly preferably having 2 to 3 C atoms, and
alkoxy denotes alkoxy having 1 to 5 C atoms, preferably having 2 to 4 C atoms.

The compounds of the formula IV-1 are preferably selected from the group of the compounds of the formulae IV-1-1 to IV-1-5

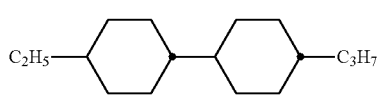

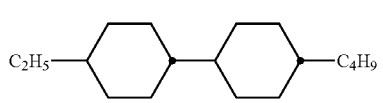

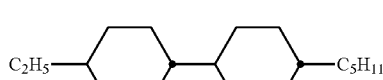

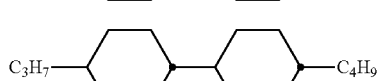

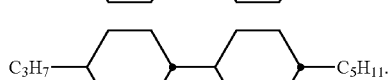

The compounds of the formula IV-2 are preferably selected from the compounds of the formulae IV-2-1 and IV-2-2

IV-2-1

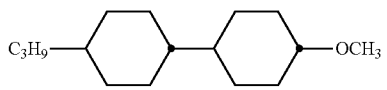

IV-2-2

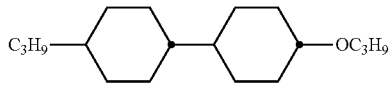

The compounds of the formula IV-3 are preferably selected from the group of the compounds of the formulae IV-3-1 to IV-3-6

IV-3-1

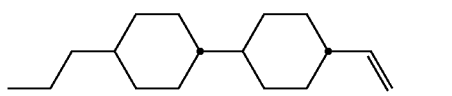

IV-3-2

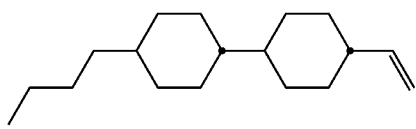

IV-3-3

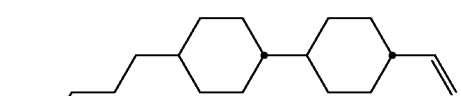

IV-3-4

IV-3-5

IV-3-6

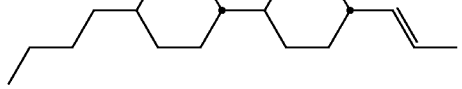

Very preferably, the medium according to the invention comprises a compound of formula IV-4, in particular selected from the compounds of the formulae IV-4-1 and IV-4-2

IV-4-1

IV-4-2

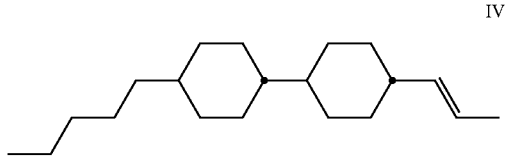

In an embodiment, the medium according to the invention comprises one or more compounds of formula I selected from the compounds of the formulae I-1 to I-4 in combination with one or more compounds selected from the group of compounds of the formulae IA-1 to IA-9:

IA-1

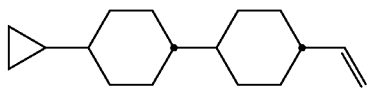

IA-2

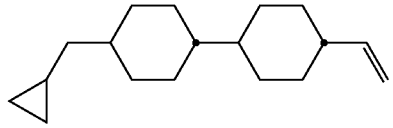

IA-3

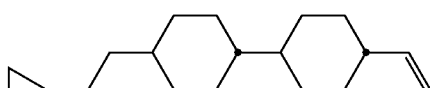

IA-4

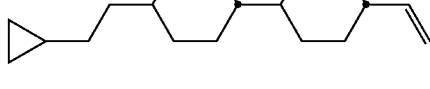

IA-5

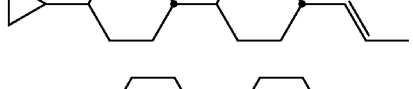

IA-6

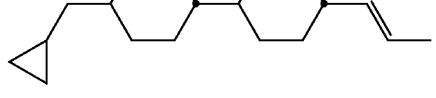

IA-7

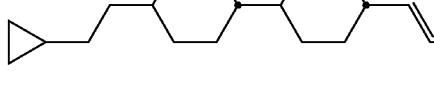

IA-8

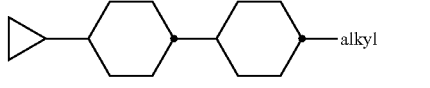

IA-9

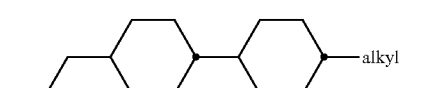

in which alkyl denotes methyl, ethyl, n-propyl, isopropyl, n-butyl, isobutyl, or n-pentyl.

The liquid-crystalline medium preferably additionally comprises one or more compounds of the formula IVa, IVa

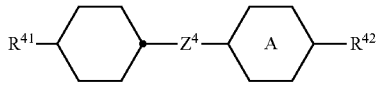

in which $R^{41}$ and $R^{42}$ each, independently of one another, denote a straight-chain alkyl, alkoxy, alkenyl, alkoxyalkyl or alkoxy radical having up to 12 C atoms, and

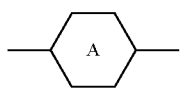

denotes

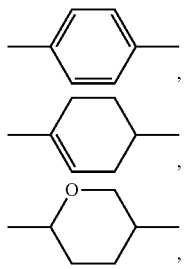

$Z^4$ denotes a single bond, —CH$_2$CH$_2$—, —CH═CH—, —CF$_2$O—, —OCF$_2$—, —CH$_2$O—, —OCH$_2$—, —COO—, —OCO—, —C$_2$F$_4$—, —C$_4$H$_8$—, —CF═CF—.

Preferred compounds of the formula IVa are indicated below:

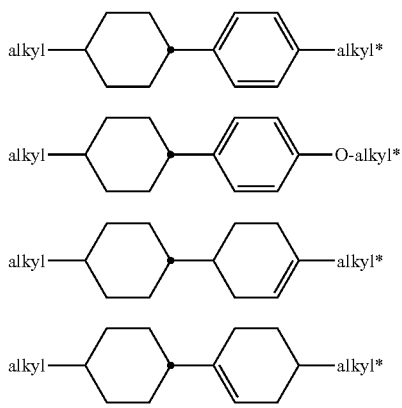

in which
alkyl and alkyl* each, independently of one another, denote a straight-chain alkyl radical having 1 to 6 C atoms.

The medium according to the invention preferably comprises at least one compound of the formula IVa-1 and/or formula IVa-2.

The proportion of compounds of the formula IVa in the mixture as a whole is preferably less than 5% by weight, very preferably less than 2% by weight.

Preferably, the medium comprises one or more compounds of formula IVb-1 to IVb-3

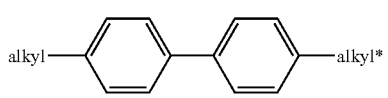

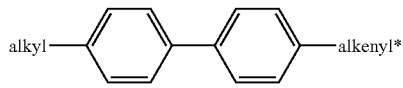

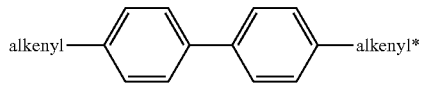

in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.

The proportion of the biphenyls of the formulae IVb-1 to IVb-3 in the mixture as a whole is preferably less than 3% by weight, in particular less than 2% by weight.

Of the compounds of the formulae IVb-1 to IVb-3, the compounds of the formula IVb-2 are particularly preferred.

Particularly preferred biphenyls are

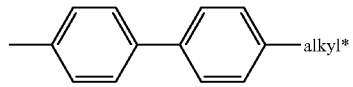

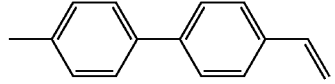

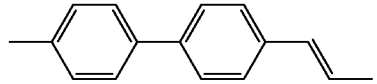

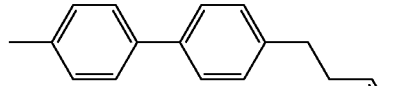

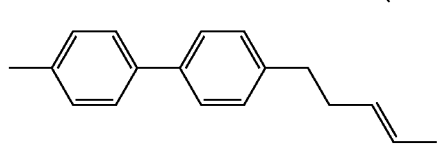

in which alkyl* denotes an alkyl radical having 1 to 6 C atoms and preferably denotes n-propyl. The medium according to the invention particularly preferably comprises one or more compounds of the formulae IVb-1-1 and/or IVb-2-4.

In a preferred embodiment, the medium according to the invention comprises one or more compounds of formula V

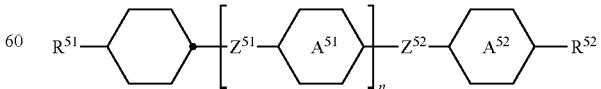

in which
$R^{51}$, $R^{52}$ denote alkyl having 1 to 7 C atoms, alkoxy having 1 to 7 C atoms, or alkoxyalkyl, alkenyl or alkenyloxy having 2 to 7 C atoms,

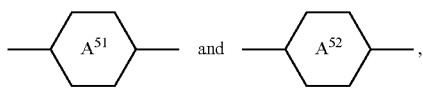

identically or differently, denote

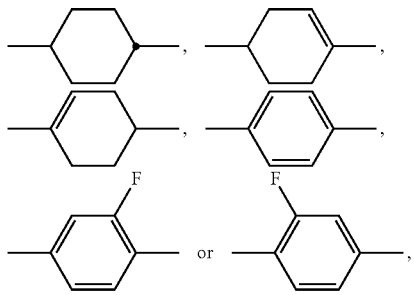

$Z^{51}$, $Z^{52}$ each, independently of one another, denote —CH$_2$—CH$_2$—, —CH$_2$—O—, —CH=CH—, —C≡C—, —COO— or a single bond, and n is 1 or 2, where the compounds of the formula CL are excluded.

The compounds of formula V are preferably selected from the compounds of the formulae V-1 to V-16:

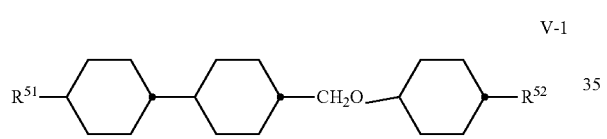

V-1

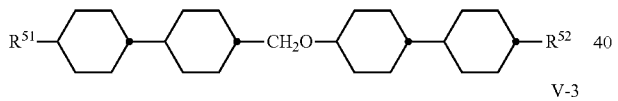

V-2

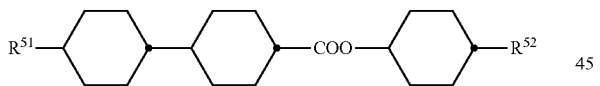

V-3

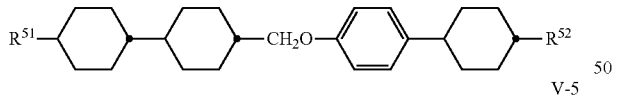

V-4

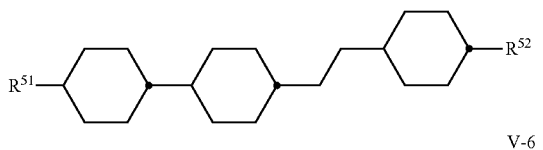

V-5

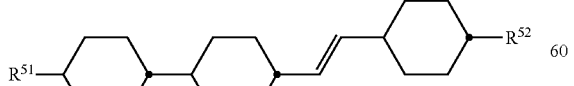

V-6

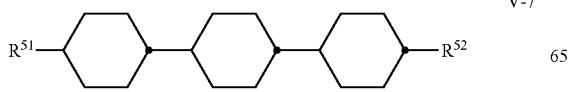

V-7

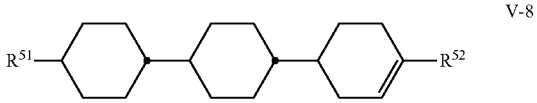

V-8

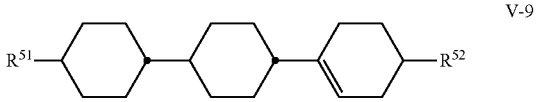

V-9

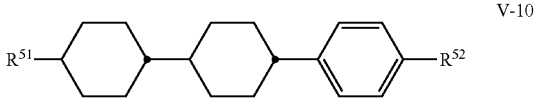

V-10

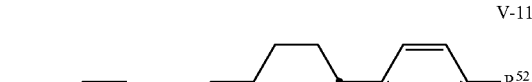

V-11

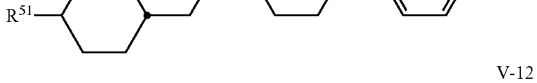

V-12

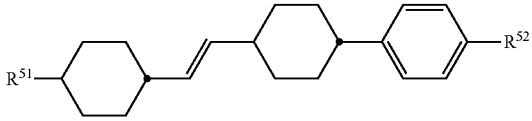

V-13

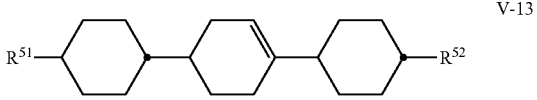

V-14

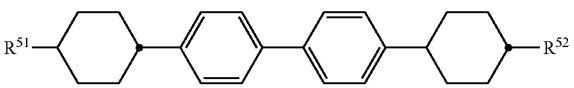

V-15

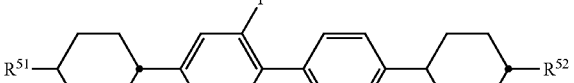

V-16 in which $R^{51}$ and $R^{52}$ have the meanings indicated for Formula V above.

$R^{51}$ and $R^{52}$ preferably each, independently of one another, denote straight-chain alkyl having 1 to 7 C atoms or alkenyl having 2 to 7 C atoms.

Preferred media comprise one or more compounds of the formulae V-1, V-3, V-4, V-6, V-7, V-10, V-11, V-12, V-14, V-15, and/or V-16, very preferably V-3.

In a preferred embodiment of the present invention the medium additionally comprises one or more compounds of the formulae VI-1 to VI-21,

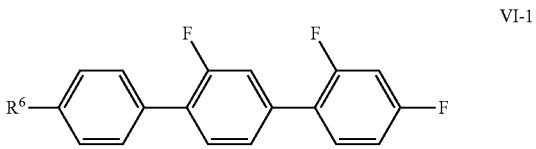

VI-1

VI-2
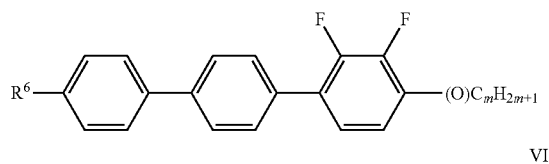
VI-3
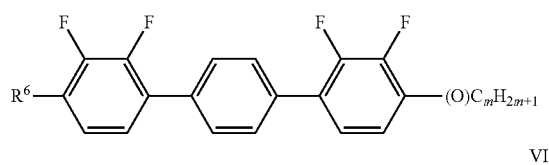
VI-4
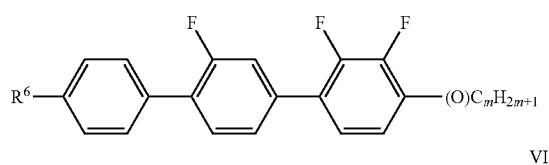
VI-5
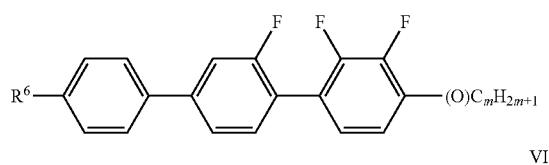
VI-6
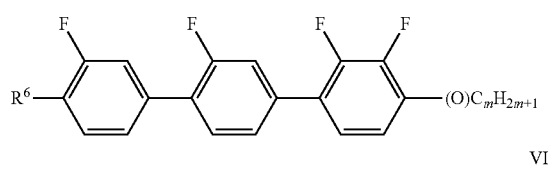
VI-7
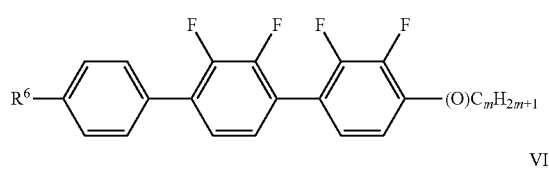
VI-8
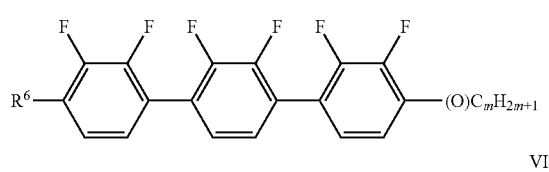
VI-9
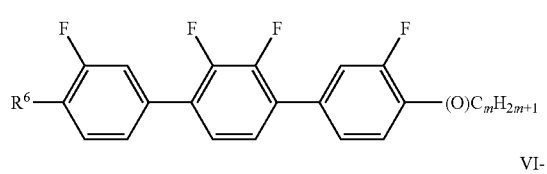
VI-10
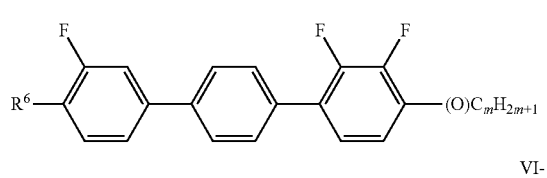
VI-11
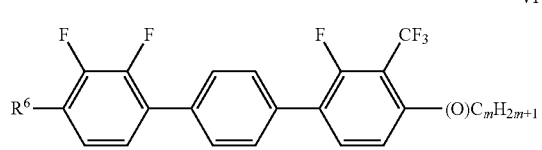
VI-12
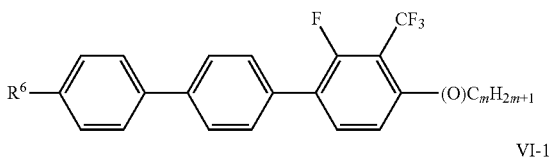
VI-13
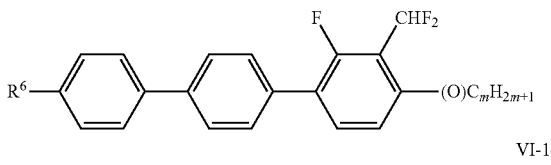
VI-14
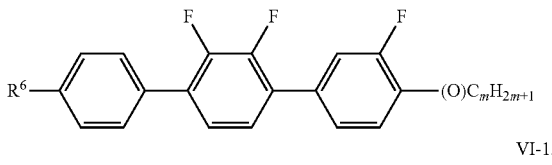
VI-15
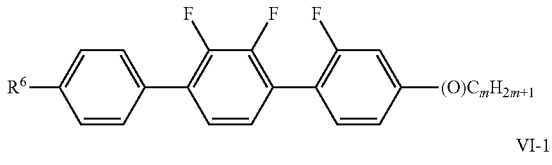
VI-16
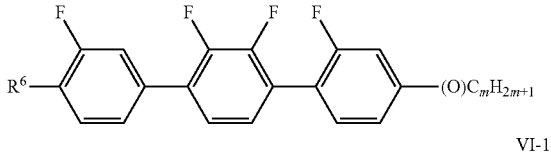
VI-17
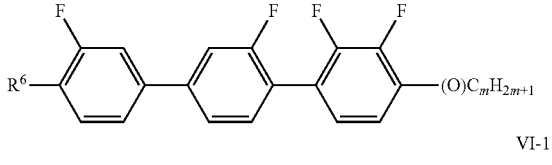
VI-18
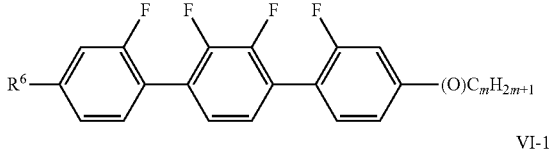
VI-19
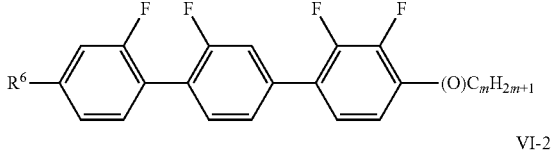
VI-20
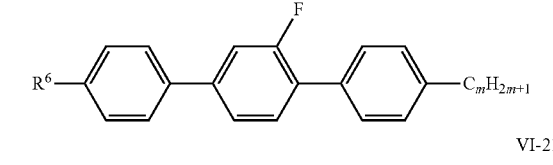
VI-21
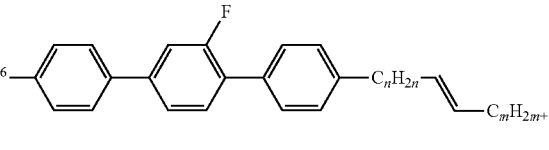

in which R⁶ denotes a straight-chain alkyl or alkoxy radical having 1 to 6 C atoms, (O) denotes —O— or a single bond, and m is 0, 1, 2, 3, 4, 5 or 6 and n is 0, 1, 2, 3 or 4.

R⁶ preferably denotes methyl, ethyl, propyl, butyl, pentyl, hexyl, methoxy, ethoxy, propoxy, butoxy, pentoxy.

In a preferred embodiment of the present invention the medium additionally comprises one or more compounds of the formulae VII-1 to VII-9

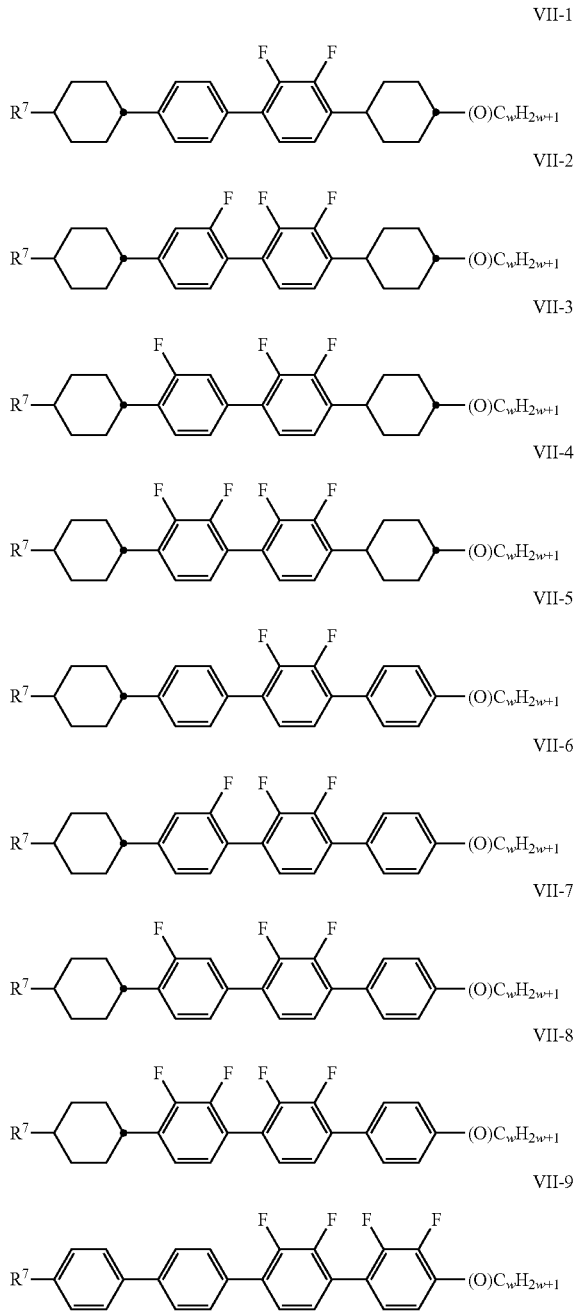

in which
R⁷ denotes a straight-chain alkyl or alkoxy radical having 1 to 6 C atoms, or a straight chain alkenyl radical having 2 to 6 C atoms, and
w is an integer from 1 to 6.

Particular preference is given to mixtures comprising at least one compound of the formula VII-9.

Particular preference is given to compounds of the formulae VI-1, VI-2, VI-4, VI-20 and VI-21. In these compounds, R⁶ preferably denotes alkyl, furthermore alkoxy, each having 1 to 5 C atoms. In the compounds of the formula VI-20, R⁶ preferably denotes alkyl or alkenyl, in particular alkyl. In the compound of the formula VI-21, R⁶ preferably denotes alkyl.

Further preferred embodiments are listed below:

a) Liquid-crystalline medium comprising at least one compound of the formulae Z-1 to Z-7,

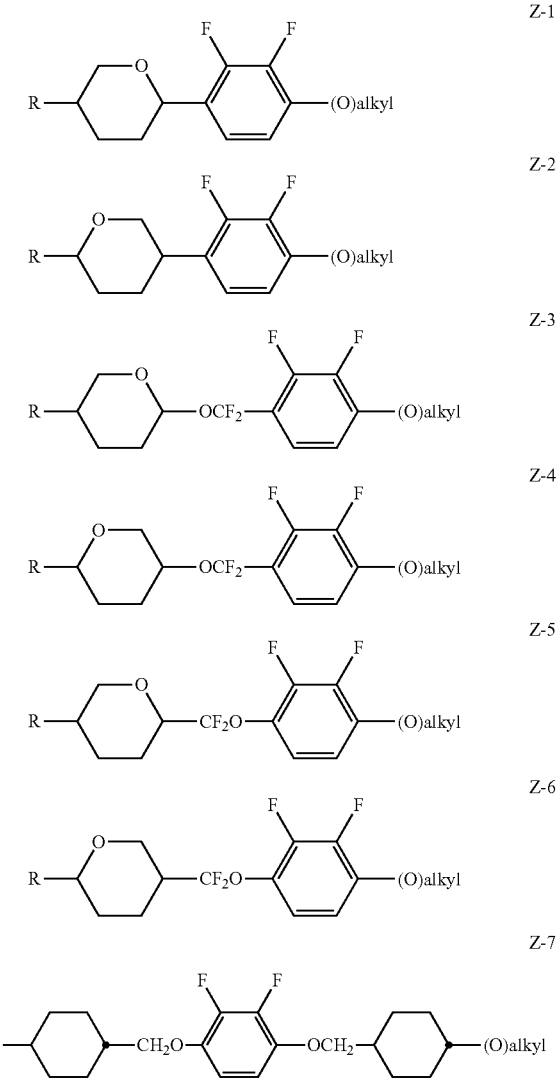

in which R has the meanings indicated for $R^{2A}$ in formula IIA above and alkyl denotes an alkyl radical having 1 to 6 C atoms.

b) Preferred liquid-crystalline media according to the invention comprise one or more substances which contain a tetrahydronaphthyl or naphthyl unit, such as, for example, the compounds of the formulae N-1 to N-5,

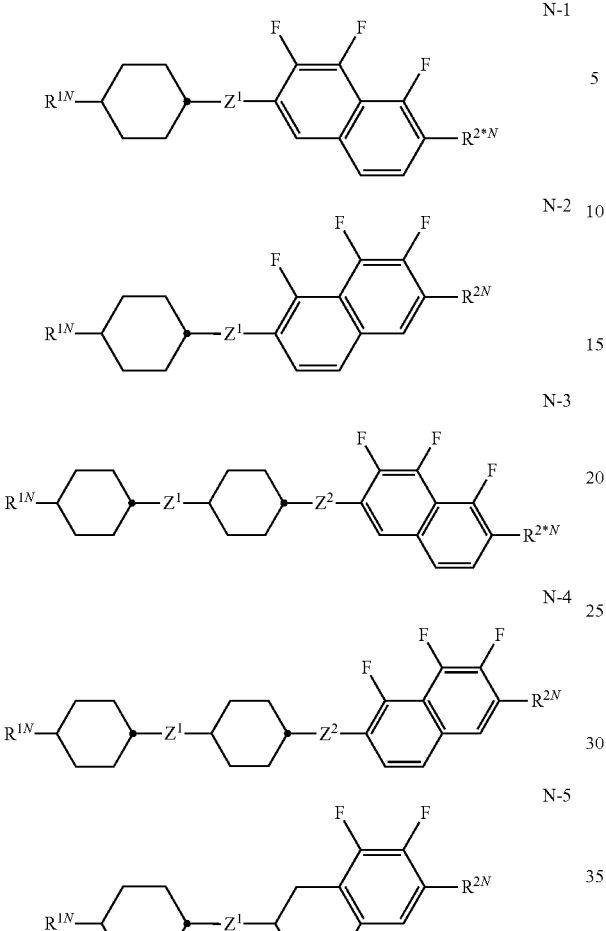

in which $R^{1N}$, $R^{2'N}$, and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3$O—, —O$(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CF$_2$O—, —OCF$_2$—, —CH$_2$— or a single bond.

c) Preferred mixtures comprise one or more compounds selected from the group of the difluorodibenzochroman compounds of the formula BC, chromans of the formula CR, and fluorinated phenanthrenes of the formulae PH-1 and PH-2,

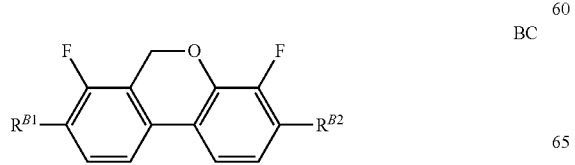

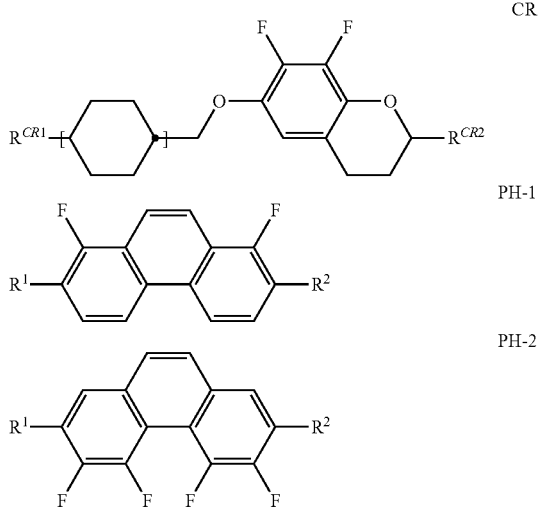

in which $R^{81}$, $R^{82}$, $R^{CR1}$, $R^{CR2}$, $R^1$, $R^2$, each, independently of one another, have the meaning of $R^{2A}$. c is 0, 1 or 2. $R^1$ and $R^2$ preferably, independently of one another, denote alkyl or alkoxy having 1 to 6 C atoms.

Particularly preferred compounds of the formulae BC and CR are the compounds BC-1 to BC-7 and CR-1 to CR-5,

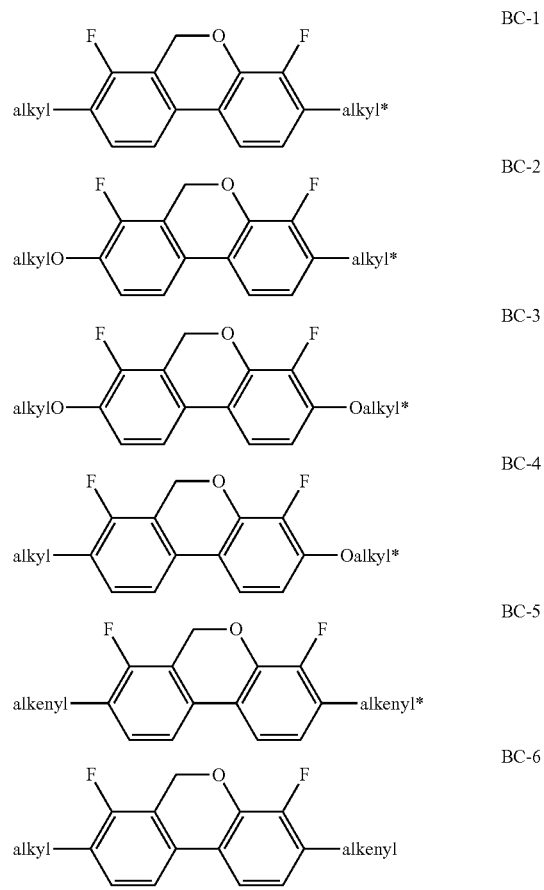

-continued

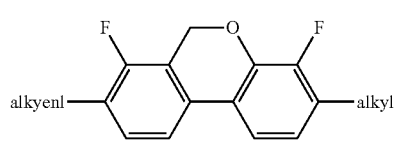
BC-7

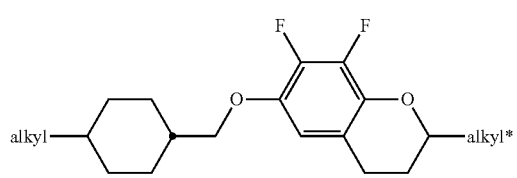
CR-1

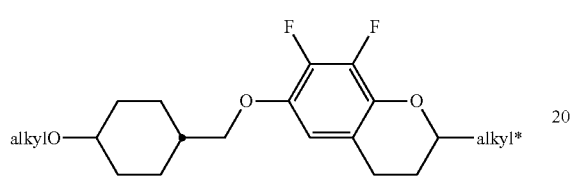
CR-2

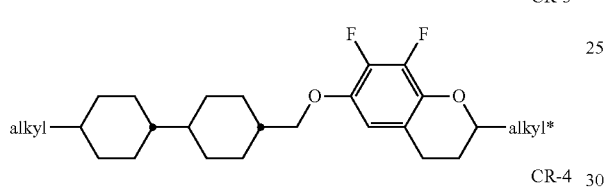
CR-3

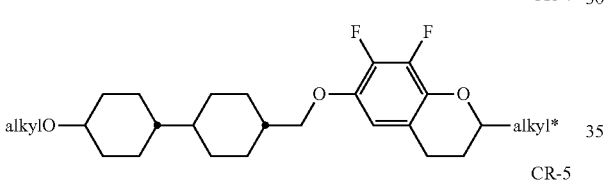
CR-4

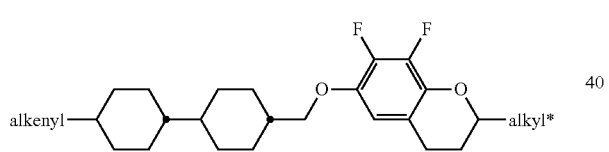
CR-5 in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.
Very particular preference is given to mixtures comprising one, two or three compounds of the formulae BC-2, CR-1 and/or CR-2.

d) Preferred mixtures comprise one or more indane compounds of the formula In,

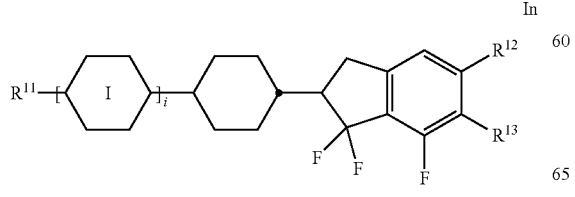
In in which
R$^{11}$, R$^{12}$, and R$^{13}$ each, independently of one another, denote a straight-chain alkyl, alkoxy, alkoxyalkyl or alkenyl radical having 1 to 6 C atoms,
R$^{12}$ and R$^{13}$ alternatively denote halogen, preferably F,

denotes

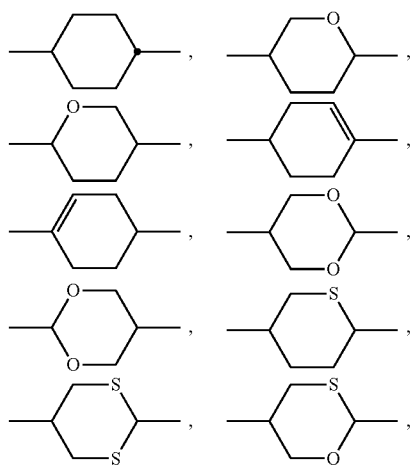

i denotes 0, 1 or 2.
Preferred compounds of the formula In are the compounds of the formulae In-1 to In-16 indicated below:

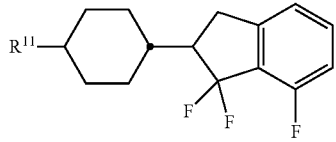
In-1

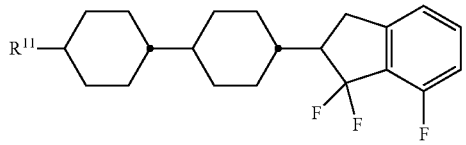
In-2

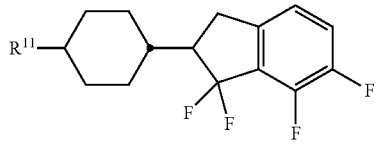
In-3

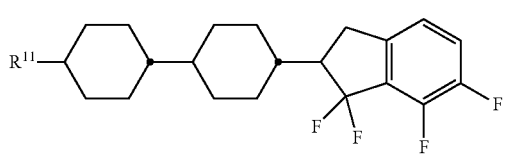
In-4

In-5 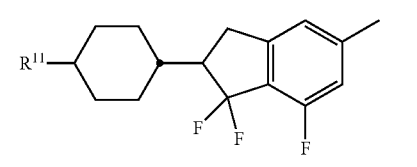
In-6 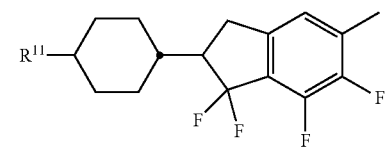
In-7 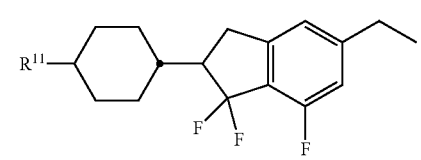
In-8 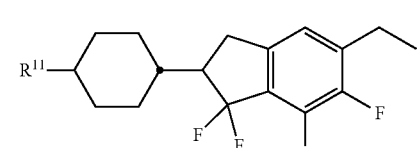
In-9 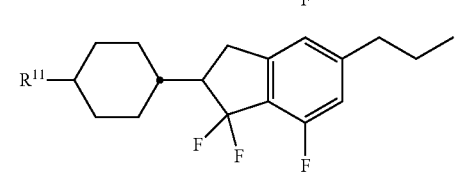
In-10 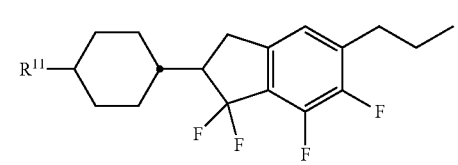
In-11 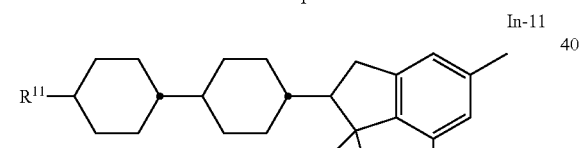
In-12 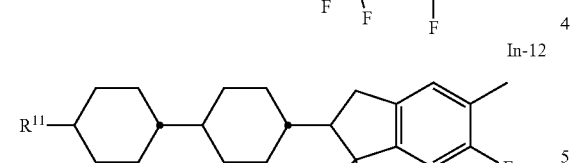
In-13 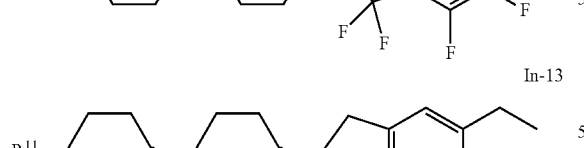
In-14 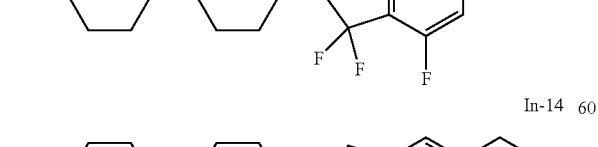
In-15 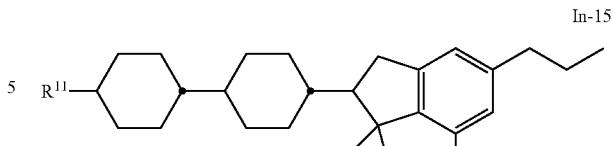
In-16 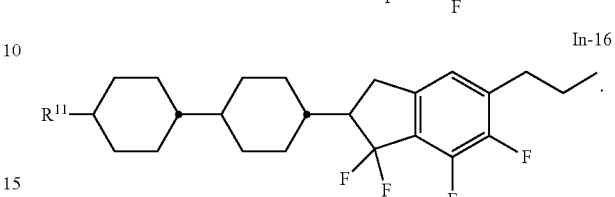
Particular preference is given to the compounds of the formulae In-1, In-2, In-3 and In-4.
e) Preferred mixtures additionally comprise one or more compounds of the formulae L-1 to L-5,
L-1 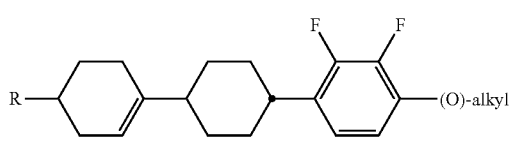
L-2 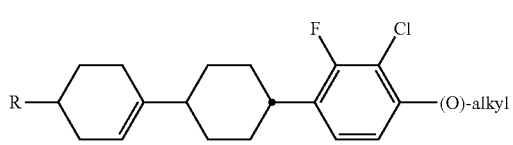
L-3 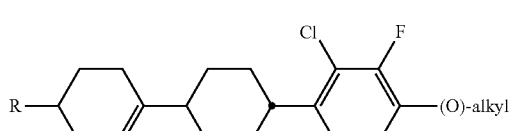
L-4 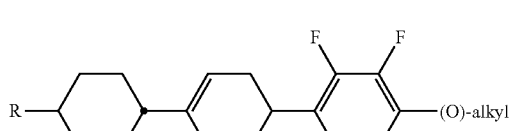
L-5 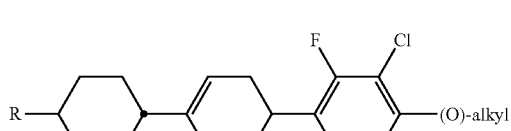
L-6 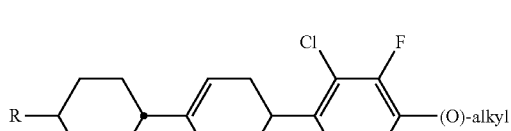

-continued

L-7
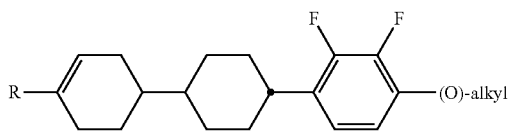

L-8
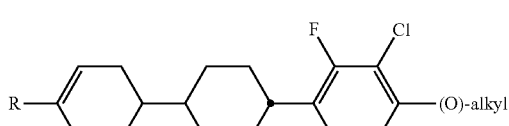

L-9
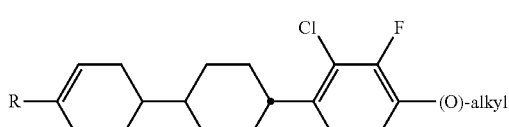

L-10
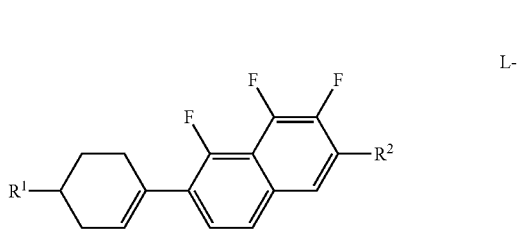

L-11
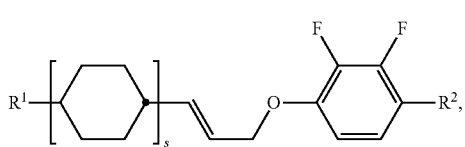

in which

R, R$^1$ and R$^2$ each, independently of one another, have the meanings indicated for R$^{2A}$ in formula IIA above, (O) denotes —O— or a single bond, and alkyl denotes an alkyl radical having 1 to 6 C atoms. The parameter s denotes 1 or 2.

The compounds of the formulae L-1 to L-11 are preferably employed in concentrations of 5 to 15% by weight, in particular 5 to 12% by weight and very particularly preferably 8 to 10% by weight.

f) Preferred mixtures additionally comprise one or more compounds of formula IIA-Y IIA-Y
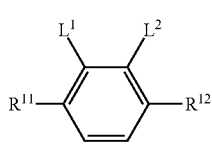

in which R$^{11}$ and R$^{12}$ have one of the meanings given for R$^{2A}$ in formula IIA above, and L$^1$ and L$^2$, identically or differently, denote F or Cl.

Preferred compounds of the formula IIA-Y are selected from the group consisting of the following sub-formulae IIA-Y1
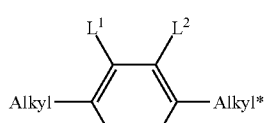

IIA-Y2
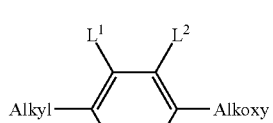

IIA-Y3
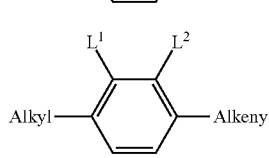

IIA-Y4
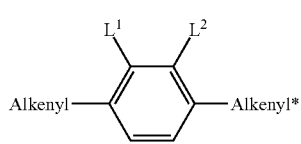

IIA-Y5
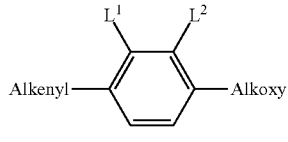

IIA-Y6
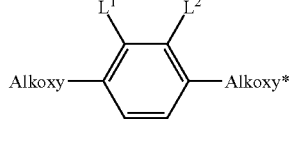

IIA-Y7
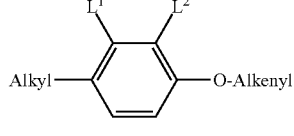

IIA-Y8
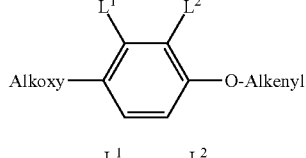

IIA-Y9
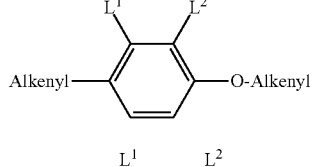

IIA-Y10
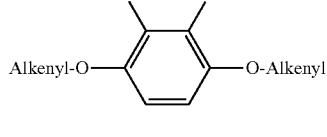

in which, Alkyl and Alkyl* each, independently of one another, denote a straight-chain alkyl radical having 1-6 C atoms, Alkoxy and Alkoxy* each, independently of one another, denote a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Particularly preferred compounds of the formula IIA-Y are selected from the group consisting of following sub-formulae:

IIA-Y6a
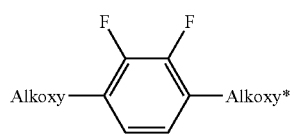

IIA-Y6b
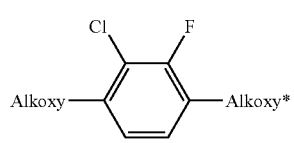

in which Alkoxy and Alkoxy* have the meanings defined above and preferably denote methoxy, ethoxy, n-propyloxy, n-butyloxy or n-pentyloxy.

Preferably, the medium according to the invention comprises a compound selected from the group of compounds of the formulae ST-1 to ST-18, very preferably of the formula ST-3:

ST-1
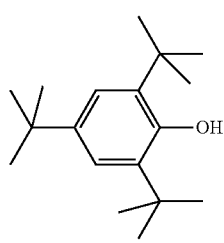

ST-2
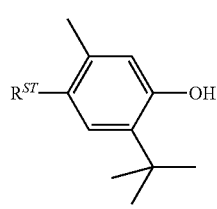

ST-3
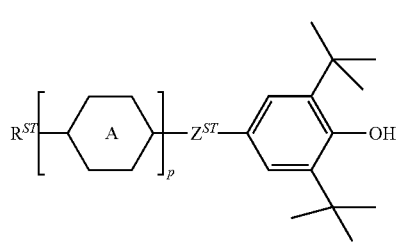

ST-4
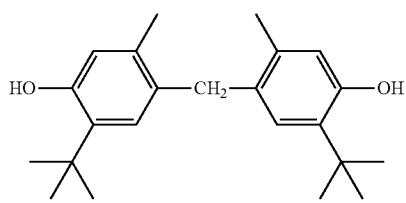

ST-5
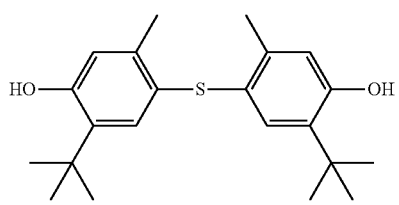

ST-6
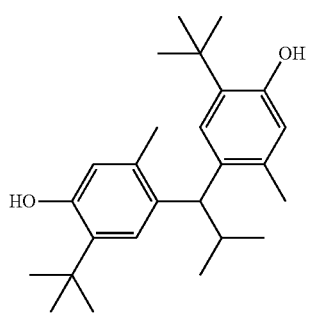

ST-7
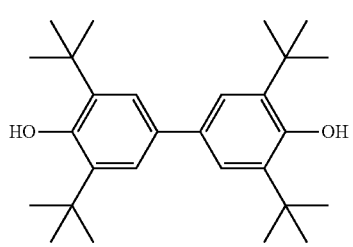

ST-8
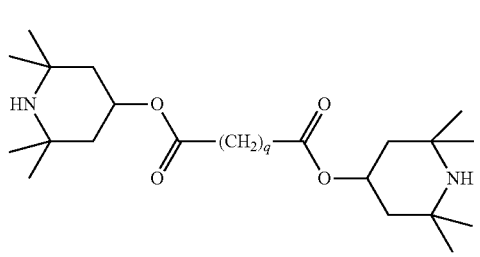

ST-9
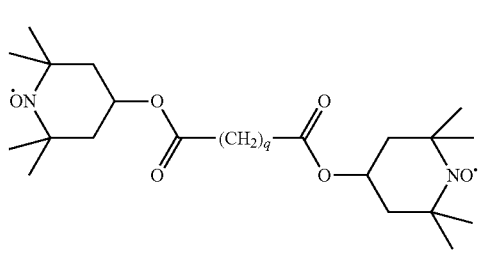

ST-10
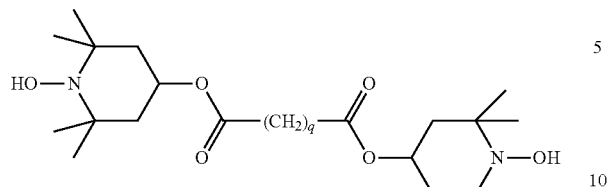
ST-11
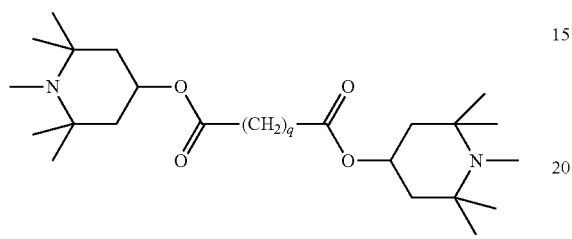
ST-12
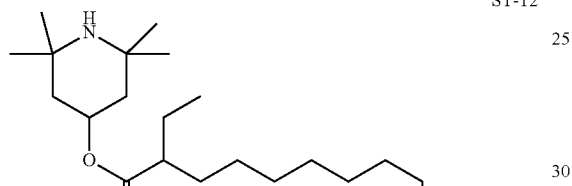
ST-13
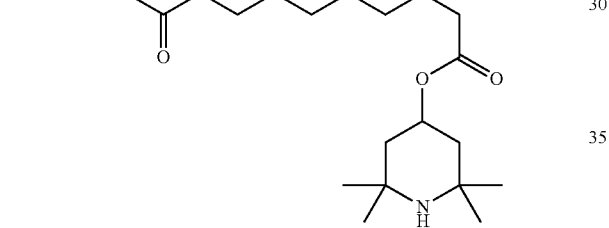
ST-14
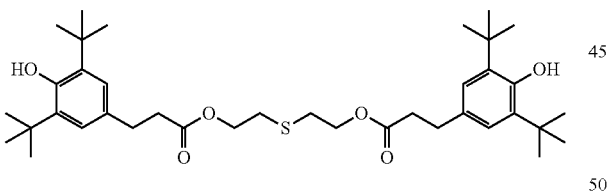
ST-15
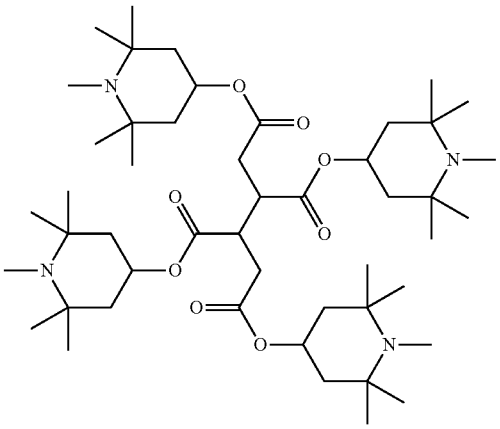
ST-16
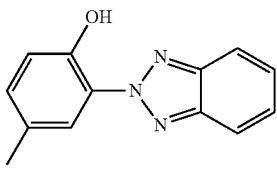
ST-17
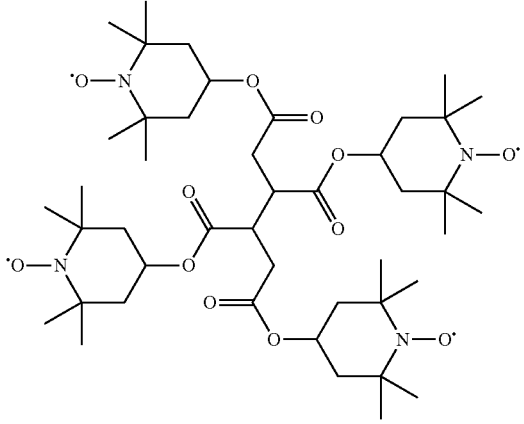
ST-18
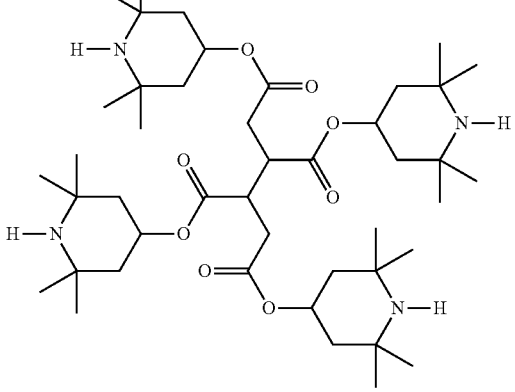
in which
$R^{ST}$ denotes H, an alkyl or alkoxy radical having 1 to 15 C atoms, where, in addition, one or more $CH_2$ groups in these radicals may each be replaced, independently of one another by —C≡C—, —CF$_2$O—, —OCF$_2$—, —CH=CH—,

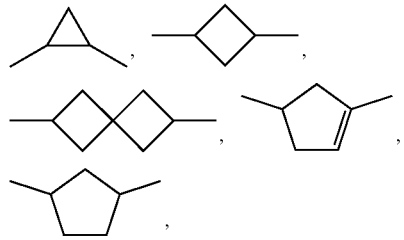

—O—, —CO—O—, —O—CO— in such a way that O atoms are not linked directly to one another, and in which, in addition, one or more H atoms may each be replaced by halogen,

on each occurrence, identically or differently, denotes

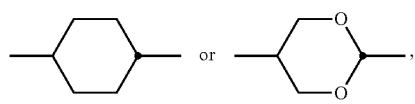

ZST each, independently of one another, denote —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—, —CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, L$^1$ and L$^2$ each, independently of one another, denote F, Cl, CH$_3$, CF$_3$ or CHF$_2$, p denotes 0, 1 or 2, q denotes 1, 2, 3, 4, 5, 6, 7, 8, 9 or 10.

Of the compounds of the formulae ST-1 to ST-18, special preference is given to the compounds of the formulae ST-3, ST-8, ST-9, ST-12. ST-16, ST-17, and ST-18, and in particular:

ST-1

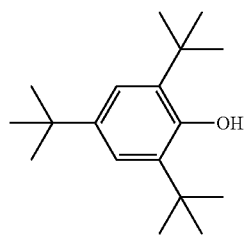

ST-3a

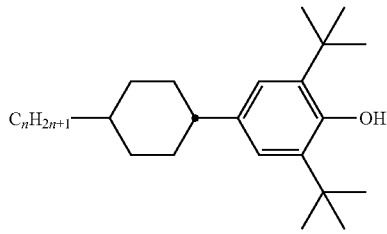

in which n=1, 2, 3, 4, 5, 6 or 7, preferably n=3

ST-3b

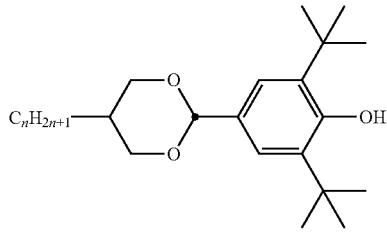

in which n=1, 2, 3, 4, 5, 6 or 7, preferably n=3

ST-3c

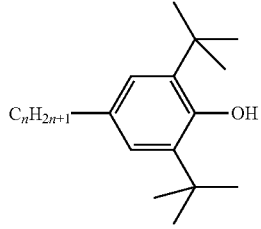

in which n=1, 2, 3, 4, 5, 6 or 7, preferably n=1 or 7

ST-8-1

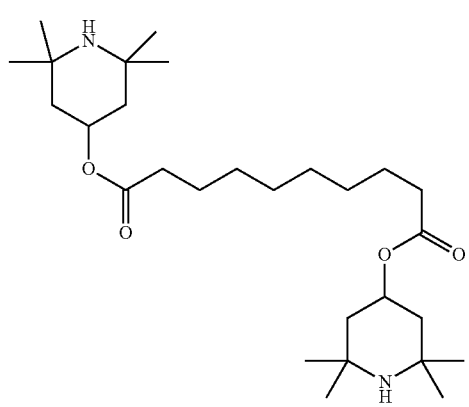

ST-9-1
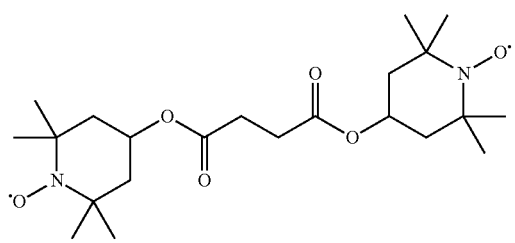
ST-12
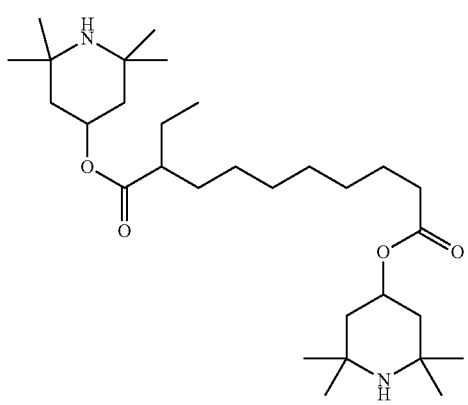
ST-16
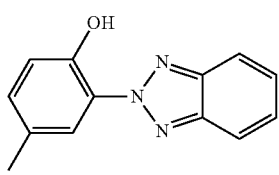
ST-17
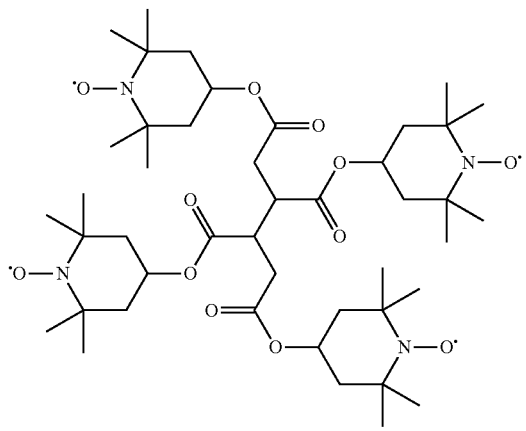
ST-18
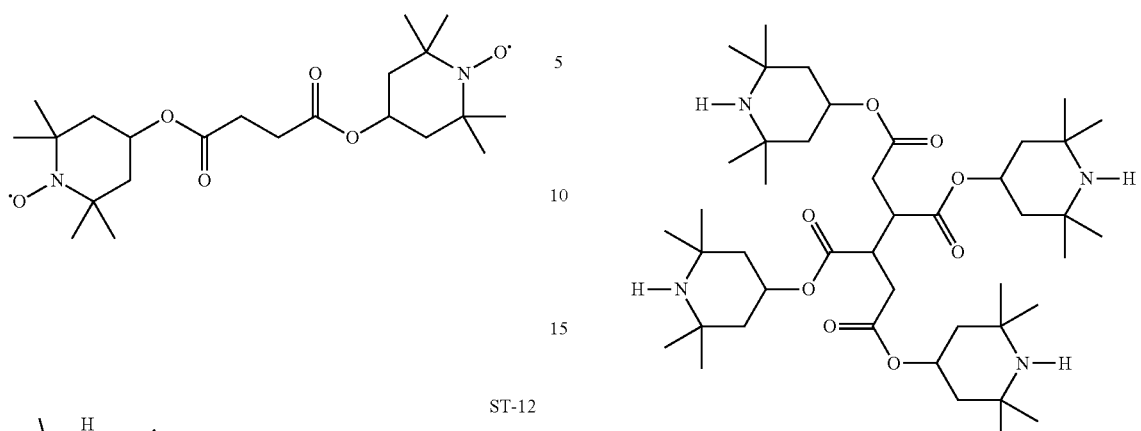
In the compounds of the formulae ST-3a and ST-3b, n preferably denotes 3. In the compounds of the formula ST-2a, n preferably denotes 7.
Very particularly preferred mixtures according to the invention comprise one or more stabilizers from the group of the compounds of the formulae ST-2a-1, ST-3a-1, ST-3b-1, ST-3c-1, ST-8-1, ST-9-1 and ST-12:
ST-3a-1
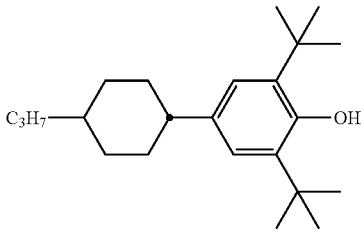
ST-3b-1
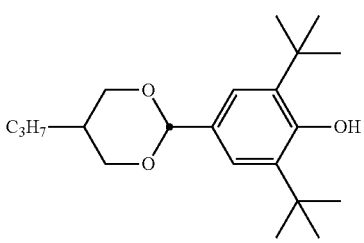
ST-3c-1
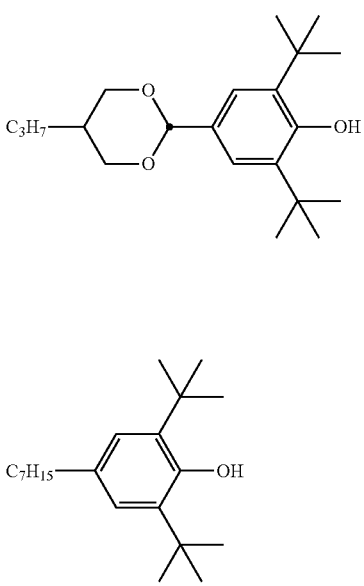

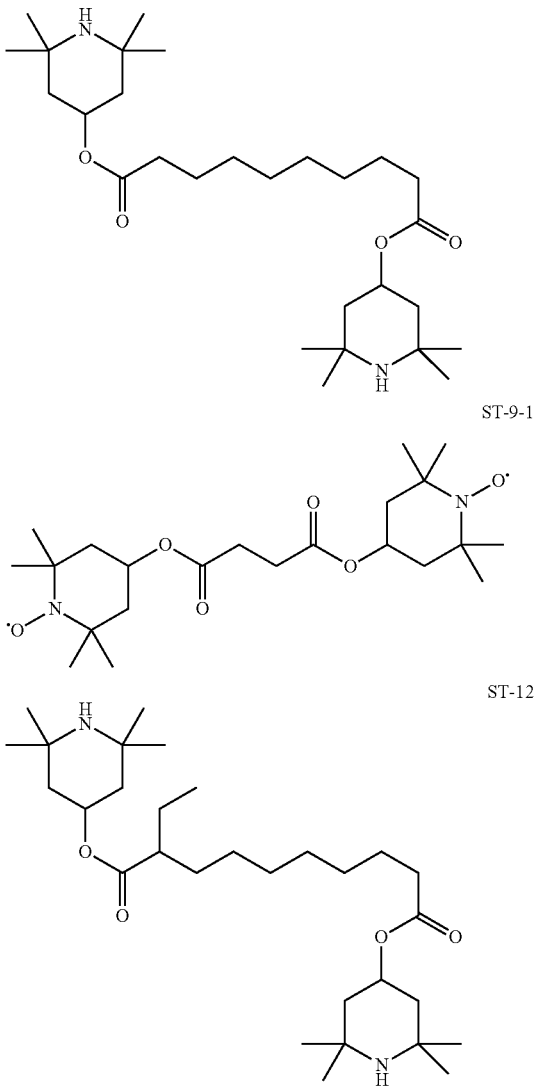

The compounds of the formulae ST-1 to ST-18 are preferably each present in the liquid-crystal mixtures according to the invention in amounts of 0.005-0.5%, based on the mixture.

If the mixtures according to the invention comprise two or more compounds from the group of the compounds of the formulae ST-1 to ST-18, the concentration correspondingly increases to 0.01-1% in the case of two compounds, based on the mixtures.

However, the total proportion of the compounds of the formulae ST-1 to ST-18, based on the mixture according to the invention, should not exceed 2%.

The liquid crystal medium according to the invention, herein also referred to as liquid crystal host mixture, is suitable for the use in polymer stabilised displays. To this end, the medium according to the invention optionally comprises one or more polymerisable compounds of formula P $$P\text{-}Sp\text{-}A^1\text{-}(Z^1\text{-}A^2)_z\text{-}R \qquad P$$

in which the individual radicals, independently of each other and on each occurrence identically or differently, have the following meanings:

P a polymerisable group,
Sp a spacer group or a single bond,
A1, A2 an aromatic, heteroaromatic, alicyclic or heterocyclic group, preferably having 4 to 25 ring atoms, which may also contain fused rings, and which is unsubstituted, or mono- or polysubstituted by L,
$Z^1$ —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —CH═CF—, —CF═CH—, —C≡C—, —CH═CH—CO—O—, —O—CO—CH═CH—, —CH$_2$—CH$_2$—CO—O—, —O—CO—CH$_2$—CH$_2$—, —CR$^0$R$^{00}$—, or a single bond,
$R^0$, $R^{00}$ H or alkyl having 1 to 12 C atoms,
R H, L, or P-Sp-,
L F, Cl, —CN, P-Sp- or straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by P-Sp-, F or Cl,
z 0, 1, 2 or 3,
n1 1, 2, 3 or 4.

The term "reliability" as used herein means the quality of the performance of the display during time and with different stress loads, such as light load, temperature, humidity, voltage, and comprises display effects such as image sticking (area and line image sticking), mura, yogore etc. which are known to the skilled person in the field of LC displays. As a standard parameter for categorising the reliability usually the voltage holding ration (VHR) value is used, which is a measure for maintaining a constant electrical voltage in a test display. Among other factors, a high VHR is a prerequisite for a high reliability of the LC medium.

Unless indicated otherwise, the term "PSA" is used hereinafter when referring to displays of the polymer sustained alignment type in general, and the term "PS" is used when referring to specific display modes, like PS-VA, PS-TN and the like.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display). The tilt angle here denotes the average angle (<90°) between the longitudinal molecular axes of the LC molecules (LC director) and the surface of the plane-parallel outer plates which form the LC cell. A low value for the tilt angle (i.e., a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerisation and are also referred to as "polymerisable group" or P.

Unless stated otherwise, the term "polymerisable compound" as used herein will be understood to mean a polymerisable monomeric compound.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic, or LC compounds is given in *Pure Appl. Chem.* 2001, 73(5), 888 and C. Tschierske, G. Pelzl, S. Diele, *Angew. Chem.* 2004, 116, 6340-6368.

As used herein, the terms "optically active" and "chiral" are synonyms for materials that are able to induce a helical pitch in a nematic host material, also referred to as "chiral dopants".

The term "spacer group", above and below also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerisable group(s) in a polymerisable mesogenic compound.

Likewise, in the compounds of formula I, a spacer group connects a central hydrocarbon group with a photoactive, stabilising hindered amine functional group.

Above and below,

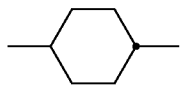

denotes a trans-1,4-cyclohexylene ring.

In a group

the single bond shown between the two ring atoms can be attached to any free position of the benzene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I, preferably F or Cl.

—CO—, —C(=O)— and —C(O)— denote a carbonyl group, i.e.,

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group, or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C—, —N($R^x$)—, —O—, —S—, —CO—, —CO—O—, —O—CO—, —O—CO—O— in such a way that O and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may each be replaced by —O—, —S—, —CO—, —CO—O—, —O—CO—, —O—CO—O— and in which one or more H atoms may each be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e., they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may each be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, aza-carbazole, benzocarboline, phenanthridine, phenanthroline, thieno[2,3b]thiophene, thieno[3,2b]thiophene, dithienothiophene, isobenzothiophene, dibenzothiophene, benzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e., those containing exclusively single bonds, and also partially unsaturated rings, i.e., those which may also contain multiple bonds. Heterocyclic rings contain one or more heteroatoms, preferably selected from Si, O, N, S and Se.

The (non-aromatic) alicyclic and heterocyclic groups can be monocyclic, i.e., contain only one ring (such as, for example, cyclohexane), or polycyclic, i.e., contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may each be replaced by Si and/or one or more CH groups may each be replaced by N and/or one or more non-adjacent $CH_2$ groups may each be replaced by —O— or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups. Preferred substituents, hereinafter also referred to as "$L^S$", are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P— or P-Sp-, and $Y^1$ denotes halogen.

"Substituted silyl or aryl" preferably means substituted by halogen, —CN, $R^0$, —$OR^0$, —CO—$R^0$, —CO—O—$R^0$, —O—CO—R⁰ or —O—CO—O—R⁰, wherein R⁰ denotes H or alkyl with 1 to 20 C atoms.

Particularly preferred substituents L are, for example, F, Cl, CN, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, furthermore phenyl.

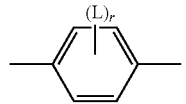

A1 and A2 very preferably denote in which L has one of the meanings indicated above and r denotes 0, 1, 2, 3 or 4, in particular

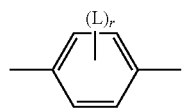

denotes

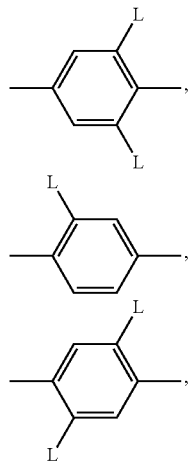

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of CH$_2$=CW$^1$—CO—O—, CH$_2$=CW$^1$—CO—,

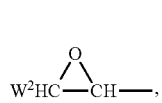

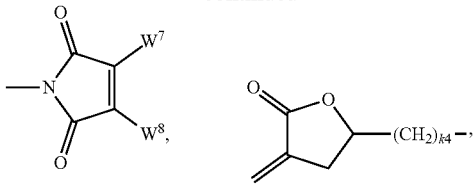

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, k$_1$, k$_2$ and k$_3$ each, independently of one another, denote 0 or 1, k$_3$ preferably denotes 1, and k$_4$ denotes an integer from 1 to 10.

Very preferred groups P are selected from the group consisting of CH$_2$=CW$^1$—CO—O—, CH$_2$=CW$^1$—CO—,

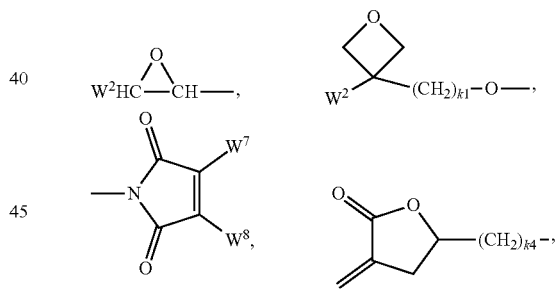

CH$_2$=CW$^2$—O—, CH$_2$=CW$^2$—, CW$^1$=CH—CO—(O)$_{k3}$—, CW$^1$=CH—CO—NH—, CH$_2$=CW$^1$—CO—NH—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, k$_1$, k$_2$ and k$_3$ each, independently of one another, denote 0 or 1, k$_3$ preferably denotes 1, and k$_4$ denotes an integer from 1 to 10.

Very particularly preferred groups P are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

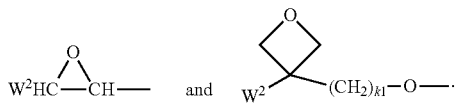

Further preferred polymerisable groups P are selected from the group consisting of vinyloxy, acrylate, methacrylate, fluoroacrylate, chloroacrylate, oxetane and epoxide, most preferably from acrylate and methacrylate.

If the spacer group Sp is different from a single bond, it is preferably of the formula Sp"-X", so that the respective radical P-Sp- conforms to the formula R-Sp"-X"—, wherein
Sp" denotes linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH=CH— or —C≡C— in such a way that O and/or S atoms are not linked directly to one another,
X" denotes —O—, —S—, —CO—, —CO—O—, —O—CO—, —O—CO—O—, —CO—N($R^0$)—, —N($R^0$)—CO—, —N($R^0$)—CO—N($R^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond,
$R^0$ and $R^{00}$ each, independently of one another, denote H or alkyl having 1 to 20 C atoms, and
$Y^2$ and $Y^3$ each, independently of one another, denote H, F, Cl or CN.
X" is preferably —O—, —S—, —CO—, —COO—, —OCO—, —O—COO—, —CO—NR$^0$—, —NR$^0$—CO—, —NR$^0$—CO—NR$^{00}$— or a single bond.

Typical spacer groups Sp and -Sp"-X"— are, for example, —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and R$^0$ and R$^{00}$ have the meanings indicated above.

Particularly preferred groups Sp and -Sp"-X"— are —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a preferred embodiment of the invention the compounds of formula P and its subformulae contain a spacer group Sp that is substituted by one or more polymerisable groups P, so that the group Sp-P corresponds to Sp(P)$_s$, with s being ≥2 (branched polymerisable groups).

Preferred compounds of formula P according to this preferred embodiment are those wherein s is 2, i.e., compounds which contain a group Sp(P)$_2$. Very preferred compounds of formula P according to this preferred embodiment contain a group selected from the following formulae:

| | |
|---|---|
| —X-alkyl-CHPP | S1 |
| —X-alkyl-CH((CH$_2$)$_{aa}$P)((CH$_2$)$_{bb}$P) | S2 |
| —X—N((CH$_2$)$_{aa}$P)((CH$_2$)$_{bb}$P) | S3 |
| —X-alkyl-CHP—CH$_2$—CH$_2$P | S4 |
| —X-alkyl-C(CH$_2$P)(CH$_2$P)—C$_{aa}$H$_{2aa+1}$ | S5 |
| —X-alkyl-CHP—CH$_2$P | S6 |
| —X-alkyl-CPP—C$_{aa}$H$_{2aa+1}$ | S7 |
| —X-alkyl-CHPCHP—C$_{aa}$H$_{2aa+1}$ | S8 | in which P is as defined in formula P,
alkyl denotes a single bond or straight-chain or branched alkylene having 1 to 12 C atoms which is unsubstituted or mono- or polysubstituted by F, Cl or CN and in which one or more non-adjacent CH$_2$ groups may each, independently of one another, be replaced by —C(R$^0$)=C(R$^0$)—, —C≡C—, —N(R$^0$)—, —O—, —S—, —CO—, —CO—O—, —O—CO—, —O—CO—O— in such a way that O and/or S atoms are not linked directly to one another, where R$^0$ has the meaning indicated above,
aa and bb each, independently of one another, denote 0, 1, 2, 3, 4, 5 or 6,
X has one of the meanings indicated for X", and is preferably O, CO, SO$_2$, O—CO—, CO—O or a single bond.

Preferred spacer groups Sp(P)$_2$ are selected from formulae S1, S2 and S3.

Very preferred spacer groups Sp(P)$_2$ are selected from the following subformulae:

| | |
|---|---|
| —CHPP | S1a |
| —O—CHPP | S1b |
| —CH$_2$—CHPP | S1c |
| —OCH$_2$—CHPP | S1d |
| —CH(CH$_2$—P)(CH$_2$—P) | S2a |
| —OCH(CH$_2$—P)(CH$_2$—P) | S2b |
| —CH$_2$—CH(CH$_2$—P)(CH$_2$—P) | S2c |
| —OCH$_2$—CH(CH$_2$—P)(CH$_2$—P) | S2d |
| —CO—NH((CH$_2$)$_2$P)((CH$_2$)$_2$P) | S3a |

In the compounds of formula P and its subformulae as described above and below, P is preferably selected from the group consisting of vinyloxy, acrylate, methacrylate, fluoroacrylate, chloroacrylate, oxetane and epoxide, most preferably from acrylate and methacrylate.

Further preferred are compounds of formula P and its subformulae as described above and below, wherein all polymerisable groups P that are present in the compound have the same meaning, and very preferably denote acrylate or methacrylate, most preferably methacrylate.

In the compounds of formula P and its subformulae as described above and below, R preferably denotes P-Sp-.

Further preferred are compounds of formula P and its subformulae as described above and below, wherein Sp denotes a single bond or —(CH$_2$)$_{p1}$—, —O—(CH$_2$)$_{p1}$—, —O—CO—(CH$_2$)$_{p1}$, or —CO—O—(CH$_2$)$_{p1}$, wherein p1 is 2, 3, 4, 5 or 6, and, if Sp is —O—(CH$_2$)$_{p1}$—, —O—CO—(CH$_2$)$_{p1}$ or —CO—O—(CH$_2$)$_{p1}$ the O-atom or CO-group, respectively, is linked to the benzene ring.

Further preferred are compounds of formula P and its subformulae as described above and below, wherein at least one group Sp is a single bond.

Further preferred are compounds of formula P and its subformulae as described above and below, wherein at least one group Sp is different from a single bond, and is preferably selected from —(CH$_2$)$_{p1}$—, —O—(CH$_2$)$_{p1}$—, —O—CO—(CH$_2$)$_{p1}$, or —CO—O—(CH$_2$)$_{p1}$, wherein p1 is 2, 3, 4, 5 or 6, and, if Sp is —O—(CH$_2$)$_{p1}$—, —O—CO—(CH$_2$)$_{p1}$ or —CO—O—(CH$_2$)$_{p1}$ the O-atom or CO-group, respectively, is linked to the benzene ring.

Very preferred groups -A$^1$-(Z-A$^2$)$_z$- in formula P are selected from the following formulae

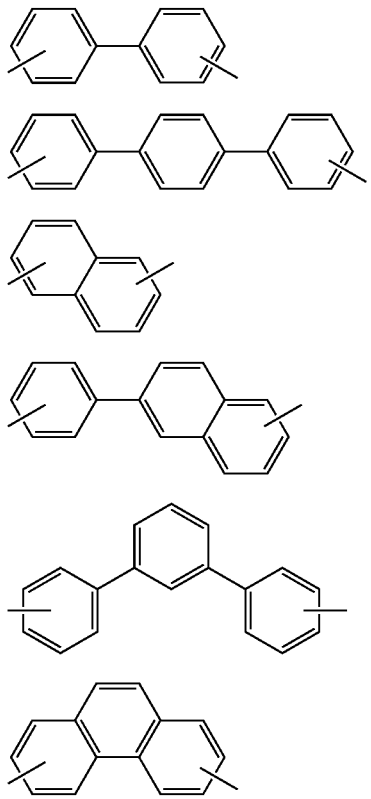

A1

A2

A3

A4

A5

A6 wherein at least one benzene ring is substituted by at last one group L and the benzene rings are optionally further substituted by one or more groups L or P-Sp-.

Preferred compounds of formula P and their subformulae are selected from the following preferred embodiments, including any combination thereof:

All groups P in the compound have the same meaning,
-A$^1$-(Z-A$^2$)$_z$- is selected from formulae A$^1$, A$^2$ and A$^5$,
the compounds contain exactly two polymerizable groups (represented by the groups P),
the compounds contain exactly three polymerizable groups (represented by the groups P),
P is selected from the group consisting of acrylate, methacrylate and oxetane, very preferably acrylate or methacrylate, P is methacrylate,
all groups Sp are a single bond,
at least one of the groups Sp is a single bond and at least one of the groups Sp is different from a single bond,
Sp, when being different from a single bond, is —(CH$_2$)$_{p2}$—, —(CH$_2$)$_{p2}$—O—, —(CH$_2$)$_{p2}$—CO—O—, —(CH$_2$)$_{p2}$—O—CO—, wherein p2 is 2, 3, 4, 5 or 6, and the O-atom or the CO-group, respectively, is connected to the benzene ring,
Sp is a single bond or denotes —(CH$_2$)$_{p2}$—, —(CH$_2$)$_{p2}$—O—, —(CH$_2$)$_{p2}$—CO—O—, —(CH$_2$)$_{p2}$—O—CO—, wherein p2 is 2, 3, 4, 5 or 6, and the O-atom or the CO-group, respectively, is connected to the benzene ring,
R denotes P-Sp-,
R does not denote or contain a polymerizable group,
R does not denote or contain a polymerizable group and denotes straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or La,
L or L' denote F, Cl or CN,
L is F.

Suitable and preferred compounds of formula P are selected from the following formulae:

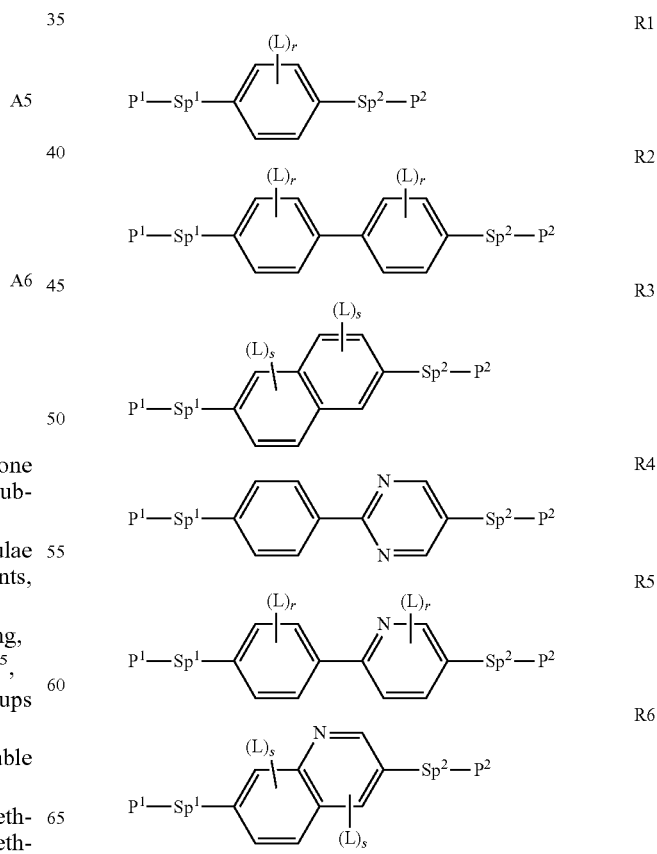

R1

R2

R3

R4

R5

R6

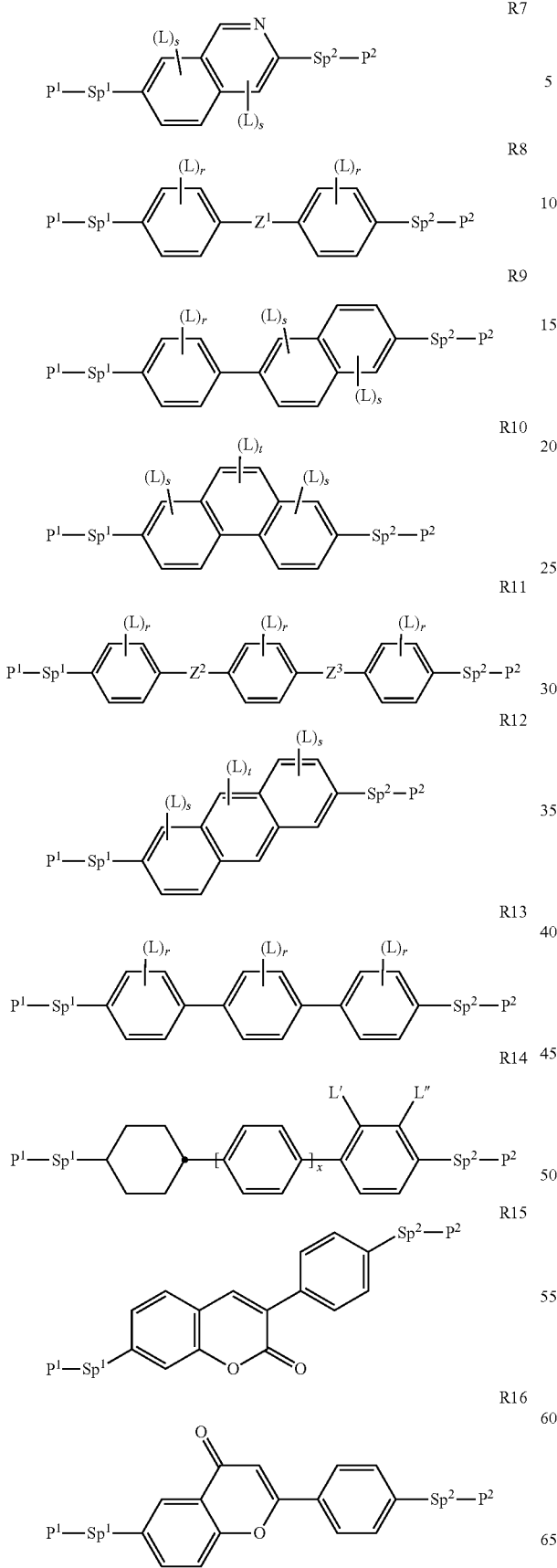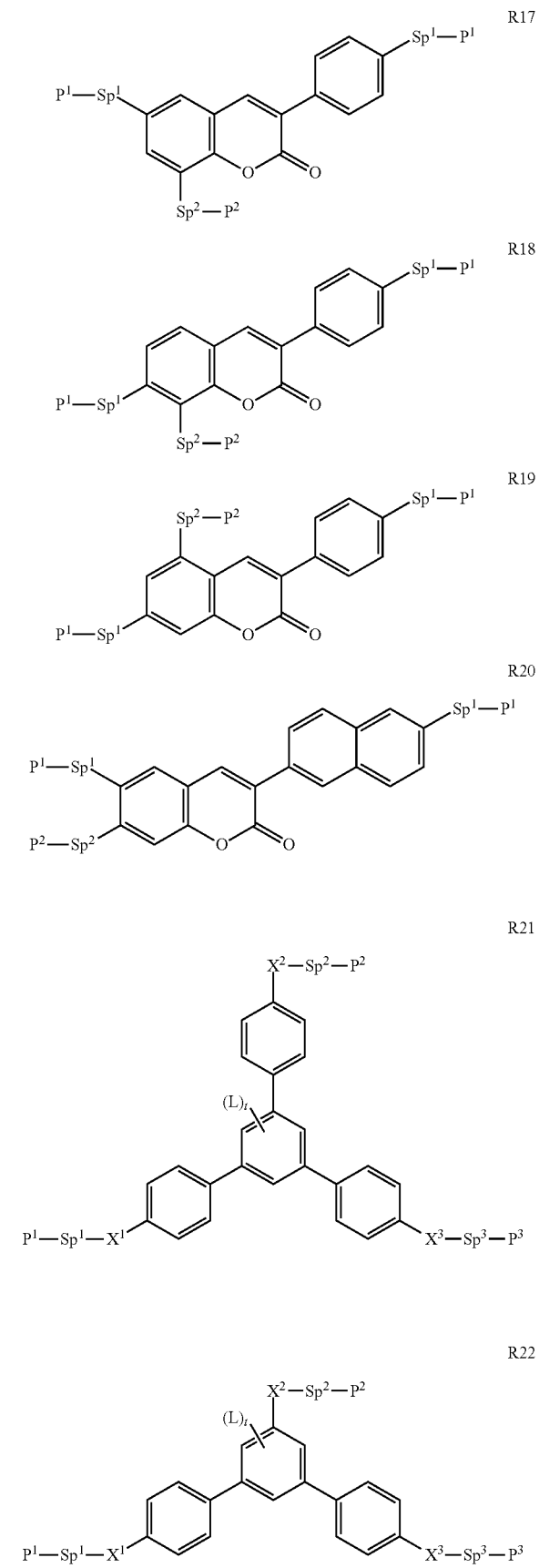

R23
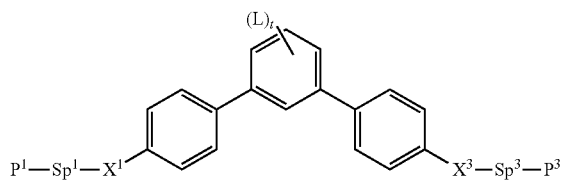

R24
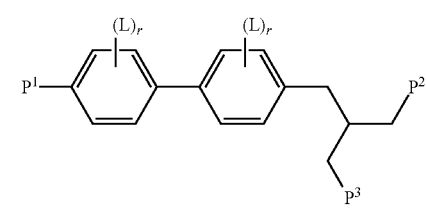

R25
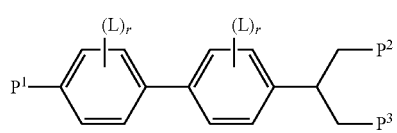

R26
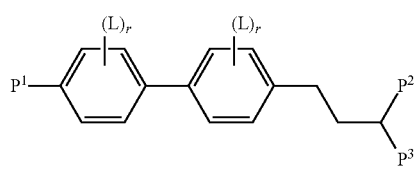

R27
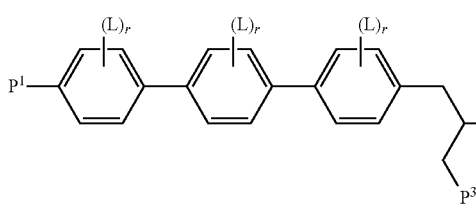

R28
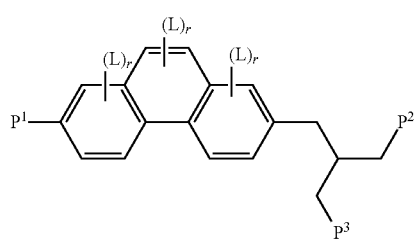

R29
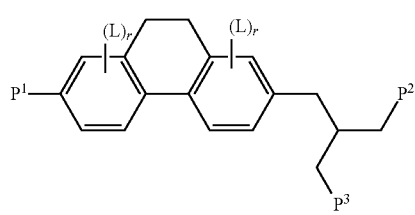

R30
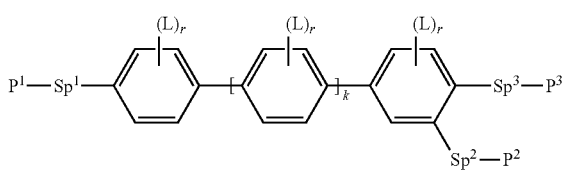

R31
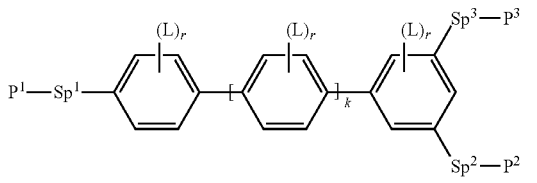

R32
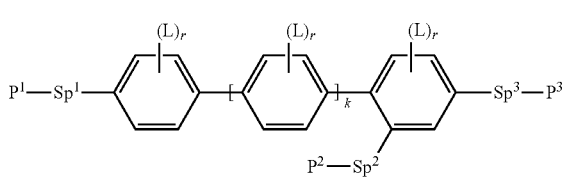

in which the individual radicals have the following meanings:

$P^1$, $P^2$ and $P^3$ each, independently of one another, denote an acrylate or methacrylate group, $Sp^1$, $Sp^2$ and Spa each, independently of one another, denote a single bond or a spacer group having one of the meanings indicated above and below for Sp, and particularly preferably denote $-(CH_2)_{p1}-$, $-(CH_2)_{p1}-O-$, $-(CH_2)_{p1}-CO-O-$, $-(CH_2)_{p1}-O-CO-$ or $-(CH_2)_{p1}-O-CO-O-$, in which p1 is an integer from 1 to 12, where, in addition, one or more of the radicals $P^1$-$Sp^1$-, $P^2$-$Sp^2$- and $P^3$-$Sp^3$- may denote $R^{aa}$, with the proviso that at least one of the radicals $P^1$-$Sp^1$-, $P^2$-$Sp^2$- and $P^3$-$Sp^3$- present is different from $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $-C(R^0)=C(R^{00})-$, $-C\equiv C-$, $-N(R^0)-$, $-O-$, $-S-$, $-CO-$, $-CO-O-$, $-O-CO-$, $-O-CO-O-$ in such a way that O and/or S atoms are not linked directly to one another, and in which, in addition, one or more H atoms may each be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote $-CO-O-$, $-O-CO-$ or a single bond, $Z^1$ denotes $-O-$, $-CO-$, $-C(R^yR^z)-$ or $-CF_2CF_2-$, $Z^2$ and $Z^3$ each, independently of one another, denote $-CO-O-$, $-O-CO-$, $-CH_2O-$, $-OCH_2-$, $-CF_2O-$, $-OCF_2-$ or $-(CH_2)_n-$, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, k denotes 0 or 1, r denotes 0, 1, 2, 3 or 4, s denotes 0, 1, 2 or 3, t denotes 0, 1 or 2, x denotes 0 or 1.

Especially preferred are compounds of the formulae R2, R13, R17, R22, R23, R24, R30, R31 and R32.

Further preferred are trireaktive compounds R15 to R30, in particular R17, R18, R19, R22, R23, R24, R25, R26, R30, R31 and R32.

In the compounds of formulae R1 to R32 the group

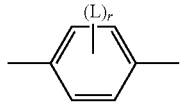

is preferably

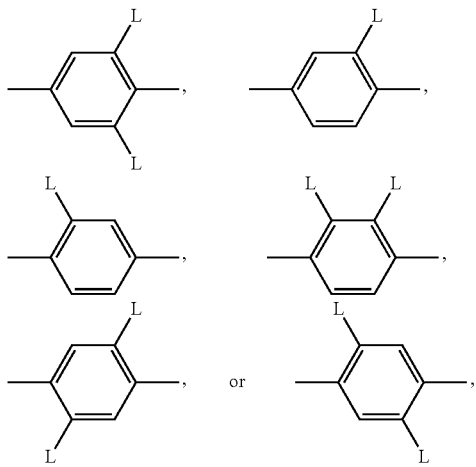

wherein L on each occurrence, identically or differently, has one of the meanings given above or below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, more preferably F, Cl, CH$_3$, OCH$_3$, COCH$_3$ oder OCF$_3$, especially F or CH$_3$.

Very particularly preferred compounds of the formula P are the compounds RM-1 to RM-152 published in WO2020165394 A1 page 199 to 221 (Table D).

For the production of PSA displays, the polymerisable compounds contained in the LC medium are polymerised or crosslinked (if one compound contains two or more polymerisable groups) by in-situ polymerisation in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

A preferred PSA type LC display of the present invention comprises:

a first substrate including a pixel electrode defining pixel areas, the pixel electrode being connected to a switching element disposed in each pixel area and optionally including a micro-slit pattern, and optionally a first alignment layer disposed on the pixel electrode, a second substrate including a common electrode layer, which may be disposed on the entire portion of the second substrate facing the first substrate, and optionally a second alignment layer, an LC layer disposed between the first and second substrates and including an LC medium comprising a polymerisable component comprising one or more compounds of formula R and a liquid crystal host including as described above and below, wherein the polymerisable component may also be polymerised.

The first and/or second alignment layer controls the alignment direction of the LC molecules of the LC layer. For example, in PS-VA displays the alignment layer is selected such that it imparts to the LC molecules homeotropic (or vertical) alignment (i.e., perpendicular to the surface) or tilted alignment. Such an alignment layer may for example comprise a polyimide, which may also be rubbed, or may be prepared by a photoalignment method.

The LC layer with the LC medium can be deposited between the substrates of the display by methods that are conventionally used by display manufacturers, for example the so-called one-drop-filling (ODF) method. The polymerisable component of the LC medium is then polymerised for example by UV photopolymerisation. The polymerisation can be carried out in one step or in two or more steps.

The PSA display may comprise further elements, like a colour filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example, for PS-VA displays a multi-domain orientation of the LC molecules can be induced by providing electrodes having slits and/or bumps or protrusions in order to create two, four or more different tilt alignment directions.

Upon polymerisation the polymerisable compounds form a crosslinked polymer, which causes a certain pretilt of the LC molecules in the LC medium. Without wishing to be bound to a specific theory, it is believed that at least a part of the crosslinked polymer, which is formed by the polymerisable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerisation can be carried out in one step. It is also possible firstly to carry out the polymerisation, optionally while applying a voltage, in a first step in order to produce a pretilt angle, and subsequently, in a second polymerisation step without an applied voltage, to polymerise or crosslink the compounds which have not reacted in the first step ("end curing").

Suitable and preferred polymerisation methods are, for example, thermal or photopolymerisation, preferably photopolymerisation, in particular UV induced photopolymerisation, which can be achieved by exposure of the polymerisable compounds to UV radiation.

Optionally one or more polymerisation initiators are added to the LC medium. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If a polymerisation initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such, for example, lower material costs and in particular less contamination of the LC medium by possible residual amounts of the initiator or degradation products thereof. The polymerisation can thus also be carried out without the addition of an initiator. In a preferred embodiment, the LC medium thus does not contain a polymerisation initiator.

The LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component (component P), is preferably 10-500,000 ppm, particularly preferably 50-50,000 ppm.

The polymerisable compounds of formula P in particular show good UV absorption in, and are therefore especially suitable for, a process of preparing a PSA display including one or more of the following features:
the polymerisable medium is exposed to UV light in the display in a 2-step process, including a first UV exposure step ("UV-1 step") to generate the tilt angle, and a second UV exposure step ("UV-2 step") to finish polymerization,
the polymerisable medium is exposed to UV light in the display generated by an energy-saving UV lamp (also known as "green UV lamps"). These lamps are characterized by a relative low intensity (1/100-1/10 of a conventional UV1 lamp) in their absorption spectra from 300-380 nm, and are preferably used in the UV2 step, but are optionally also used in the UV1 step when avoiding high intensity is necessary for the process.
the polymerisable medium is exposed to UV light in the display generated by a UV lamp with a radiation spectrum that is shifted to longer wavelengths, preferably 340 nm or more, to avoid short UV light exposure in the PS-VA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features:
the polymerisable LC medium is exposed to UV light in a 2-step process, including a first UV exposure step ("UV-1 step") to generate the tilt angle, and a second UV exposure step ("UV-2 step") to finish polymerization,
the polymerisable LC medium is exposed to UV light generated by a UV lamp having an intensity of from 0.5 mW/cm$^2$ to 10 mW/cm$^2$ in the wavelength range from 300-380 nm, preferably used in the UV2 step, and optionally also in the UV1 step,
the polymerisable LC medium is exposed to UV light having a wavelength of 340 nm or more, and preferably 400 nm or less.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths $\lambda$ of 300-400 nm is desired, UV exposure can be carried out using a wide band pass filter being substantially transmissive for wavelengths 300 nm<$\lambda$<400 nm. When irradiation with UV light of wavelength $\lambda$ of more than 340 nm is desired, UV exposure can be carried out using a cut-off filter being substantially transmissive for wavelengths $\lambda$>340 nm.

"Substantially transmissive" means that the filter transmits a substantial part, preferably at least 50% of the intensity, of incident light of the desired wavelength(s). "Substantially blocking" means that the filter does not transmit a substantial part, preferably at least 50% of the intensity, of incident light of the undesired wavelengths. "Desired (undesired) wavelength" e.g., in case of a band pass filter means the wavelengths inside (outside) the given range of $\lambda$, and in case of a cut-off filter means the wavelengths above (below) the given value of $\lambda$.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

Preferably the LC medium according to the present invention essentially consist of a polymerisable component P) comprising or one or more polymerisable compounds of formula P, and an LC host mixture, and an optically active component comprising one or more chiral dopants, as described above and below. However, the LC medium may additionally comprise one or more further components or additives, preferably selected from the list including but not limited to co-monomers, polymerisation initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

Particular preference is given to LC media comprising one, two or three polymerisable compounds of formula P.

Preferably the proportion of compounds of formula P in the LC medium is from >0 to <5%, very preferably from >0 to <1%, most preferably from 0.01 to 0.5%.

The medium according to the invention preferably comprises one or more compounds of formula I in a total concentration in the range of from 1000 ppm to 5000 ppm, more preferably from more than 1000 ppm to 5000 ppm, still more preferably from 1200 ppm to 4500 ppm, very preferably from 2000 ppm to 4000 ppm and in particular from 2500 to 3500 ppm.

In a first preferred embodiment, the medium according to the invention comprises
- one or more compounds of the formula IID-10, preferably in a total concentration in the range of from 5% to 25%, more preferably from 10% to 20% and very preferably from 12% to 18%;

and
- one or more compounds of the formula IIA, preferably of the formula IIA-10, in a total concentration in the range of from 5% to 25%, more preferably from 10% to 20% and very preferably from 12% to 17%;

and/or
- one or more compounds of the formula IID, preferably of the formula IID-4 in addition to the compound(s) of the formula IID-10, in a total concentration in the range of from 25% to 55%, more preferably from 30% to 50% and very preferably from 33% to 43%;

and/or
- one or more compounds of the formulae IIA and IID, in a total concentration in the range of from 35% to 70%, more preferably from 40% to 65% and very preferably from 45% to 60%;

and/or
- one or more compounds of the formula III, preferably of the formula III-2, more preferably of the formula III-2-6, in a total concentration in the range of from 0.5% to 10%, more preferably from 1% to 7% and very preferably from 2% to 5%;

and/or
- one or more compounds of the formula IV in a total concentration in the range of from 20% to 65%, more preferably from 28% to 52%, still more preferably from 30% to 50% and very preferably from 32% to 44%, in particular from 35% to 42%;

and/or
- one or more compounds of the formula IV-1 in a total concentration in the range of from 1% to 15%, more preferably from 2% to 12%, still more preferably from 4% to 10% and very preferably from 5% to 8%;

and/or
- one or more compounds of the formula IV-2 in a total concentration in the range of from 0.2% to 5%, more preferably from 0.5% to 3%, still more preferably from 1% to 2%;

and/or
- one or more compounds of the formula IV-3, preferably selected from the formulae IV-3-4 to IV-3-6, very preferably of the formulae IV-3-4 and/or IV-3-5, in a total concentration in the range of from 15% to 50%, more preferably from 17% to 45%, still more preferably from 20% to 40% and very preferably from 27% to 35%;

and/or
- one or more compounds of the formula V in a total concentration in the range of from 3% to 15%, more preferably from 4% to 14%, still more preferably from 5% to 13% and very preferably from 6% to 12%;
- one or more compounds of the formula V-3 in a total concentration in the range of from 1% to 12%, more preferably from 2% to 10%, still more preferably from 3% to 9% and very preferably from 4% to 8%.

In a second preferred embodiment, the medium according to the invention comprises:
- one or more compounds of the formula CL;

and
- one or more compounds of the formula IIB, preferably of the formula IIB-2 and/or IIB-10, in a total concentration in the range of from 5% to 25%, more preferably from 7% to 20% and very preferably from 10% to 15%;

and/or
- one or more compounds of the formula IID, preferably of the formula IID-4, in a total concentration in the range of from 5% to 25%, more preferably from 10% to 20% and very preferably from 12% to 18%;

and/or
- one or more compounds of the formulae IIB and IID, in a total concentration in the range of from 10% to 45%, more preferably from 17% to 35% and very preferably from 22% to 30%;

and/or
- one or more compounds of the formula III, preferably of the formula III-2, more preferably of the formula III-2-6, in a total concentration in the range of from 2% to 16%, more preferably from 5% to 15% and very preferably from 10% to 14%;

and/or
- one or more compounds of the formula IV in a total concentration in the range of from 30% to 70%, more preferably from 35% to 65%, still more preferably from 40% to 60% and very preferably from 43% to 57%, in particular from 45% to 55%;

and/or
- one or more compounds of the formula IV-1 in a total concentration in the range of from 2% to 20%, more preferably from 4% to 17%, still more preferably from 6% to 15% and very preferably from 8% to 13%;

and/or
- one or more compounds of the formula IV-3, preferably selected from the formulae IV-3-3 to IV-3-5, very preferably of the formulae IV-3-3 and/or IV-3-4, in a total concentration in the range of from 2% to 20%, more preferably from 3% to 15%, still more preferably from 4% to 12% and very preferably from 6% to 10%;

and/or
- one or more compounds of the formula IV-3, preferably selected from the formulae IV-3-1 and IV-3-3 to IV-3-5, very preferably of the formulae IV-3-1 and IV-3-3 and/or IV-3-4, in a total concentration in the range of from 30% to 70%, more preferably from 35% to 65%, still more preferably from 40% to 60% and very preferably from 43% to 57%, in particular from 45% to 55%;

and/or
- one or more compounds of the formula V in a total concentration in the range of from 3% to 15%, more preferably from 4% to 14%, still more preferably from 5% to 13% and very preferably from 6% to 12%, and/or
- one or more compounds of the formula IIA-Y, preferably of the formula IIA-Y6, in a total concentration in the range of from 0.5% to 10%, more preferably from 1% to 8%, and very preferably from 2% to 5%.

It is advantageous for the liquid-crystalline medium according to the invention to preferably have a nematic phase from ≤−20° C. to ≥126° C., particularly preferably from ≤−30° C. to ≥130° C., very particularly preferably from ≤−40° C. to ≥135° C.

In a first preferred embodiment, the medium according to the invention has a clearing temperature of 70° C. or more, preferably of 72° C. or more, more preferably of 74° C. or more and in particular of 76° C. or more.

In a second preferred embodiment, the medium according to the invention has a clearing temperature of 100° C. or more, preferably of 110° C. or more, more preferably of 115° C. or more and in particular of 120° C. or more.

The expression "have a nematic phase" herein means on the one hand that no smectic phase and no crystallisation are observed at low temperatures at the corresponding temperature and on the other hand that clearing (phase transition to the isotropic phase) still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The liquid crystal mixture according to the invention is nematic, preferably at a temperature of −20° C. or less, preferably at −30° C. or less, very preferably at −40° C. or less.

In a preferred embodiment of the present invention, the medium has a birefringence in the range of from 0.085 to 0.110, more preferably from 0.088 to 0.105, very preferably from 0.089 to 0.100 and in particular from 0.090 to 0.098.

In a preferred embodiment, the liquid-crystal mixture according to the invention has a dielectric anisotropy Δε of −2.5 to −5.0, preferably of −2.8 to −4.2, in particular −3.6 to −3.9.

In a preferred embodiment, the liquid-crystal mixture according to the invention has a dielectric anisotropy Δε of −2.0 to −4.0, preferably of −2.3 to −3.2, in particular −2.5 to −3.0.

The rotational viscosity $\gamma_1$ at 20° C. is preferably in the range of from 150 to 250 mPas, more preferably from 170 to 210 mPa s.

In another preferred embodiment, the rotational viscosity $\gamma_1$ at 20° C. is preferably in the range of from 40 to 80 mPas, more preferably from 50 to 65 mPa s.

The liquid-crystal media according to the invention have relatively low values for the threshold voltage ($V_0$). They are preferably in the range from 1.7 V to 3.0 V, particularly preferably ≤2.8 V and very particularly preferably ≤2.6 V.

For the present invention, the term "threshold voltage" relates to the capacitive threshold ($V_0$), also called the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5≤Δε≤1.5 and the term "dielectrically negative compounds" denotes those having Δε<−1.5. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA). They are furthermore suitable for IPS (in-plane switching) and FFS (fringe field switching) applications having negative Δε, in particular UB-FFS.

It goes without saying for the person skilled in the art that the VA, IPS or FFS mixture according to the invention may also comprise compounds in which, for example, H, N, O, Cl and F have been replaced by the corresponding isotopes.

The compounds according to the present invention can be synthesized by or in analogy to known methods described in the literature (for example in the standard works such as Houben-Weyl, Methoden der Organischen Chemie [Methods of Organic Chemistry], Georg-Thieme-Verlag, Stuttgart), under reaction conditions which are known and suitable for said reactions. Use may also be made here of variants which are known per se but are not mentioned here. In particular, they can be prepared as described in or in analogy to the following reaction schemes. Further methods for preparing the inventive compounds can be taken from the examples.

Other mesogenic compounds which are not explicitly mentioned above can optionally and advantageously also be used in the media in accordance with the present invention. Such compounds are known to the person skilled in the art.

For the present invention and in the following examples, the structures of the liquid-crystal compounds are indicated by means of acronyms, with the transformation into chemical formulae taking place in accordance with Tables A to C below. All radicals $C_mH_{2m+1}$, $C_nH_{2n+1}$, and $C_lH_{2l+1}$ or $C_mH_{2m-1}$, $C_nH_{2n-1}$ and $C_lH_{2l-1}$ are straight-chain alkyl radicals or alkylene radicals, in each case having n, m and l C atoms respectively. Preferably n, m and l are independently of each other 1, 2, 3, 4, 5, 6, or 7. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

Ring elements

C

D

DI

TABLE A-continued

| Ring elements | | |
|---|---|---|
| A | tetrahydropyran (2,5-linked) | |
| AI | tetrahydropyran (reversed) | |
| P | 1,4-phenylene | |
| G | 3-fluoro-1,4-phenylene | |
| GI | 2-fluoro-1,4-phenylene | |
| U | 3,5-difluoro-1,4-phenylene | |
| UI | 2,6-difluoro-1,4-phenylene | |
| Y | 2,3-difluoro-1,4-phenylene | |
| P(F, Cl)Y | 2-fluoro-3-chloro-1,4-phenylene | |
| P(Cl, F)Y | 2-chloro-3-fluoro-1,4-phenylene | |
| N | pyridine-2,5-diyl | |
| NI | pyridine-2,5-diyl (reversed) | |
| N(F) | fluoropyridine | |
| NI(F) | fluoropyridine (reversed) | |
| np | naphthalene-2,6-diyl | |
| n3f | trifluoronaphthalene | |
| nN3fI | trifluoronaphthalene (reversed) | |
| th | tetrahydronaphthalene | |
| thI | tetrahydronaphthalene (reversed) | |
| tH2f | difluorotetrahydronaphthalene | |
| tH2fI | difluorotetrahydronaphthalene (reversed) | |
| o2f | difluorochromane | |

TABLE A-continued
Ring elements
o2fI 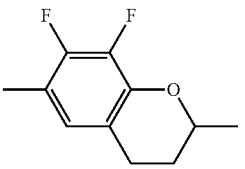
dh 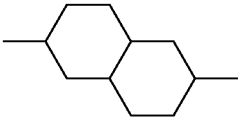
B 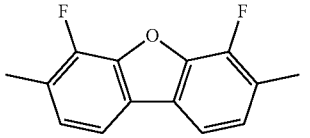
B(S) 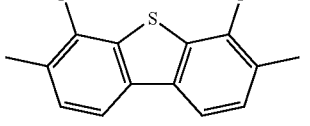
O 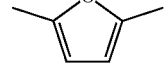
S 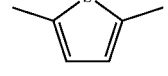
K 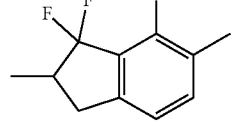
KI 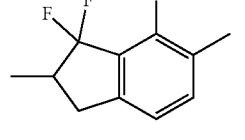
L 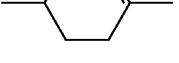
LI 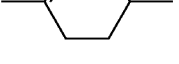
F 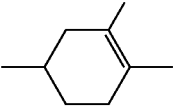
FI 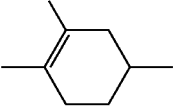
TABLE A-continued
Ring elements
Bh 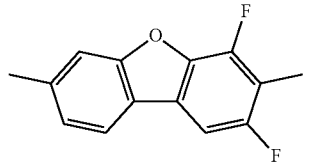
Bh(S) 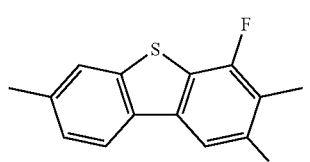
Bf 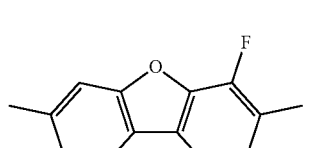
Bf(S) 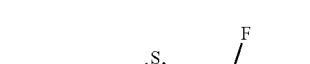
Bfi 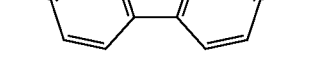
Bfi(S) 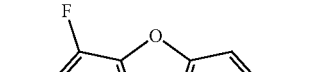
TABLE B
Bridging units
| | | | |
|---|---|---|---|
| E | —CH$_2$—CH$_2$— | | |
| V | —CH=CH— | | |
| T | —C≡C— | | |
| W | —CF$_2$—CF$_2$— | | |
| B | —CF=CF— | | |
| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE C

End groups

| On the left individually or in combination | | On the right individually or in combination | |
|---|---|---|---|
| -n- | $C_nH_{2n+1}$— | -n | —$C_nH_{2n+1}$ |
| -nO— | $C_nH_{2n+1}$—O— | —On | —O—$C_nH_{2n+1}$ |
| —V— | $CH_2$=CH— | —V | —CH=$CH_2$ |
| -nV— | $C_nH_{2n+1}$—CH=CH— | -nV | —$C_nH_{2n}$—CH=$CH_2$ |
| —Vn- | $CH_2$=CH—$C_nH_{2n}$— | —Vn | —CH=CH—$C_nH_{2n+1}$ |
| -nVm— | —$C_nH_{2n+1}$—CH=CH—$C_mH_{2m}$— | -nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —CL— | Cl— | —CL | —Cl |
| —M— | $CFH_2$- | —M | —$CFH_2$ |
| —D— | $CF_2H$— | —D | —$CF_2H$ |
| —T— | $CF_3$- | —T | —$CF_3$ |
| —MO— | $CFH_2O$— | —OM | —$OCFH_2$ |
| —DO— | $CF_2HO$— | —OD | —$OCF_2H$ |
| —TO— | $CF_3O$— | —OT | —$OCF_3$ |
| —A— | H—C≡C— | —A | —C≡C—H |
| -nA— | $C_nH_{2n+1}$—C≡C— | —An | —C≡C—$C_nH_{2n+1}$ |
| —NA— | N≡C—C≡C— | —AN | —C≡C—C≡N |
| —(cn)— | ![cyclopropyl $(CH_2)_{n-2}$] | —(cn) | ![cyclopropyl $(CH_2)_{n-2}$] |
| —(cn)m— | ![cyclopropyl $(CH_2)_{n-2}$—$(CH_2)_m$—] | —m(cn) | ![—$(CH_2)_m$—cyclopropyl $(CH_2)_{n-2}$] |
| —(c5-1en)m— | ![cyclopent-1-enyl—$(CH_2)_m$—] | —m(c5-1en) | ![—$(CH_2)_m$—cyclopent-1-enyl] |
| —(c5-2en)m— | ![cyclopent-2-enyl—$(CH_2)_m$—] | —m(c5-2en) | ![—$(CH_2)_m$—cyclopent-2-enyl] |
| —(c5-3en)m— | ![cyclopent-3-enyl—$(CH_2)_m$—] | —m(c5-3en) | ![—$(CH_2)_m$—cyclopent-3-enyl] |

| On the left only in combination | | On the right only in combination | |
|---|---|---|---|
| —...n...— | —$C_nH_{2n}$— | —...n... | —$C_nH_{2n}$— |
| —...M...— | —CFH— | —...M... | —CFH— |
| —...D...— | —$CF_2$— | —...D... | —$CF_2$— |
| —...V...— | —CH=CH— | —...V... | —CH=CH— |
| —...Z...— | —CO—O— | —...Z... | —CO—O— |
| —...ZI...— | —O—CO— | —...ZI... | —O—CO— |
| —...K...— | —CO— | —...K... | —CO— |
| —...W...— | —CF=CF— | —...W... | —CF=CF— | in which n and m are each integers, and the three dots "..." are placeholders for other abbreviations from this table.

Apart from the compounds according to claim 1, the mixtures according to the invention optionally comprise one or more compounds shown in Table D below.

The following abbreviations are used:
(n, m, k and l are, independently of one another, each an integer, preferably 1 to 9 preferably 1 to 7, k and l possibly may be also 0 and preferably are 0 to 4, more preferably 0 or 2 and most preferably 2, n preferably is 1, 2, 3, 4 or 5, in the combination "-nO-" it preferably is 1, 2, 3 or 4, preferably 2 or 4, m preferably is 1, 2, 3, 4 or 5, in the combination "-Om" it preferably is 1, 2, 3 or 4, more preferably 2 or 4. The combination "-IVm" preferably is "2V1".)

TABLE D

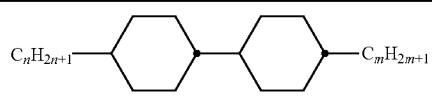

CC-n-m

TABLE D-continued
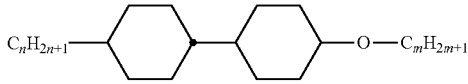
CC-n-Om
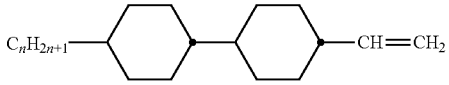
CC-n-V
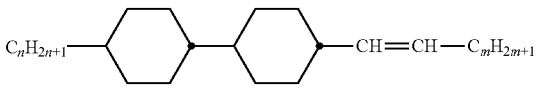
CC-n-Vm
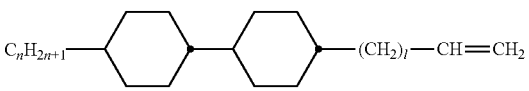
CC-n-IV
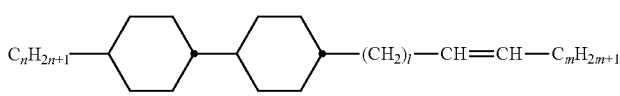
CC-n-IVm
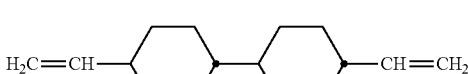
CC-V-V
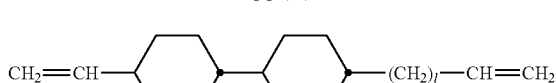
CC-V-IV
CC-V-Vm
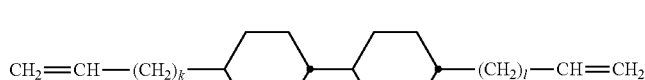
CC-Vk-IV
CC-nV-IV
CC-nV-Vm TABLE D-continued
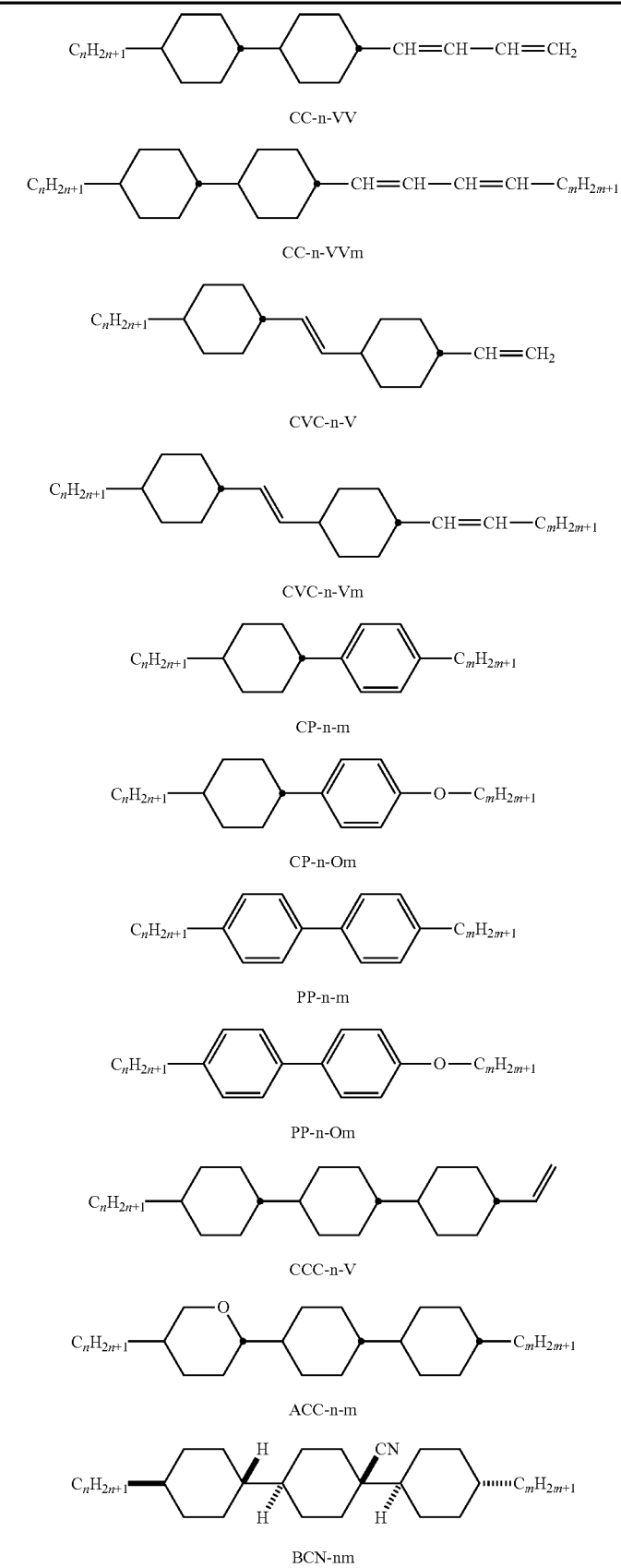

TABLE D-continued
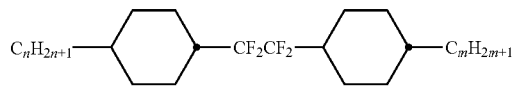
CWC-n-m
CCP-n-m
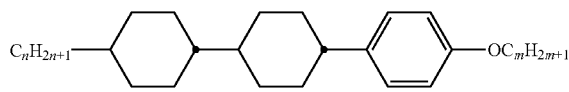
CCP-n-Om
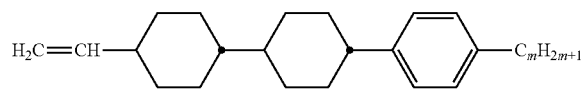
CCP-V-m
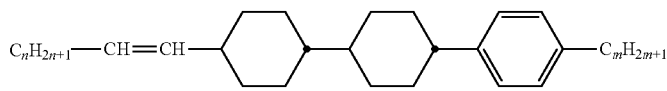
CCP-nV-m
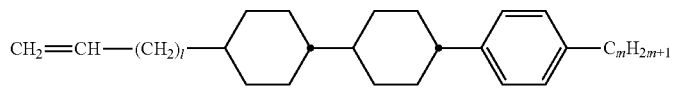
CCP-Vl-m
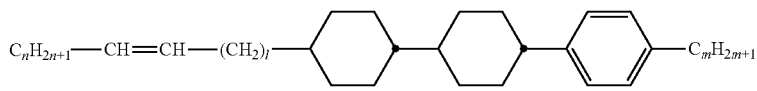
CCP-nVl-m
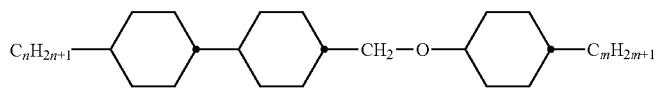
CCOC-n-m
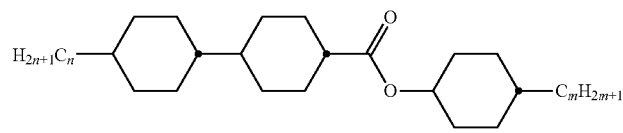
CCZC-n-m
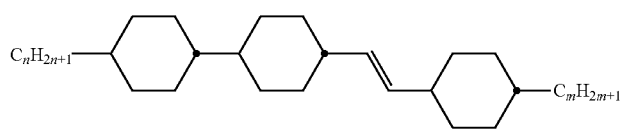
CCVC-n-m TABLE D-continued
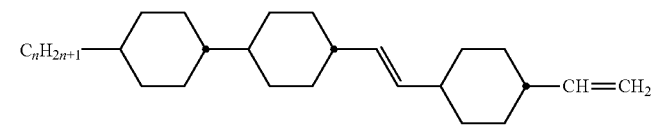
CCVC-n-V
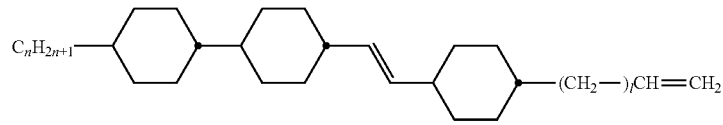
CCVC-n-IV
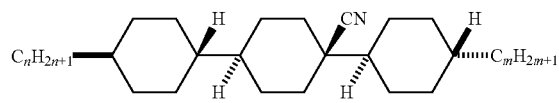
BN-nm
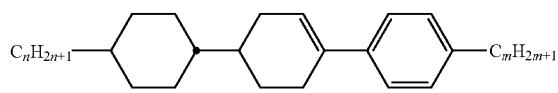
CLP-n-m
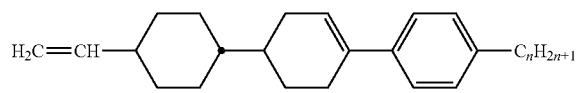
CLP-V-n
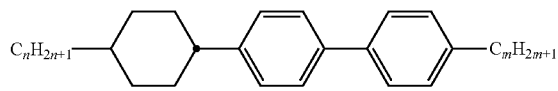
CPP-n-m
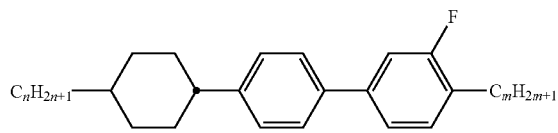
CPG-n-m
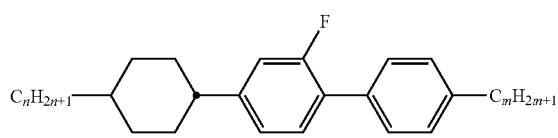
CGP-n-m
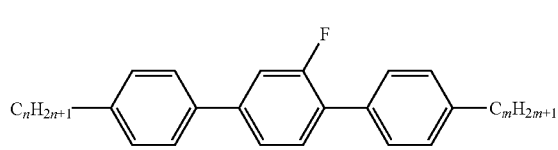
PGP-n-m TABLE D-continued
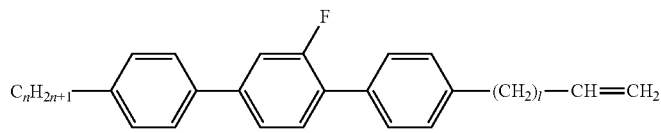
PGP-n-IV
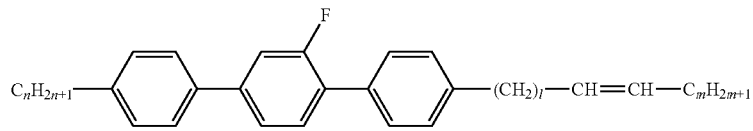
PGP-n-IVm
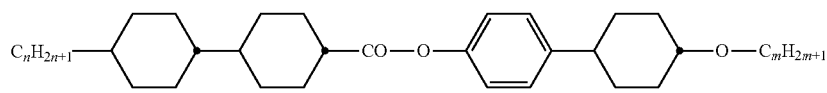
CCZPC-n-m
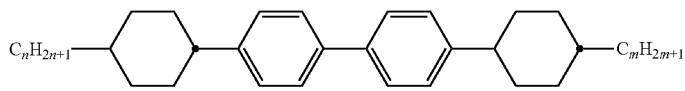
CPPC-n-m
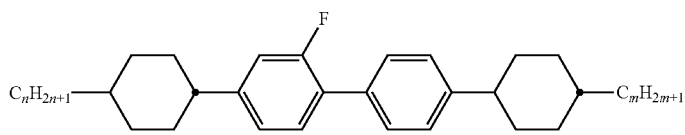
CGPC-n-m
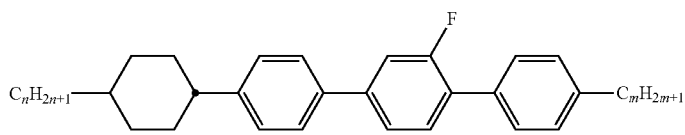
CPGP-n-m
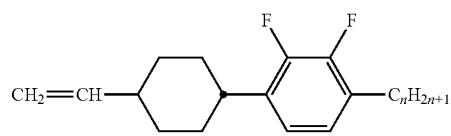
CY-V-n
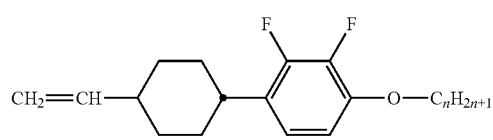
CY-V-On
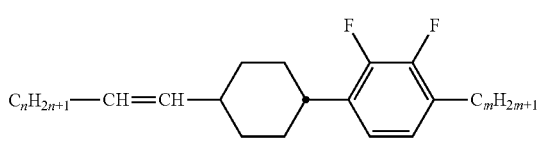
CY-nV-m TABLE D-continued
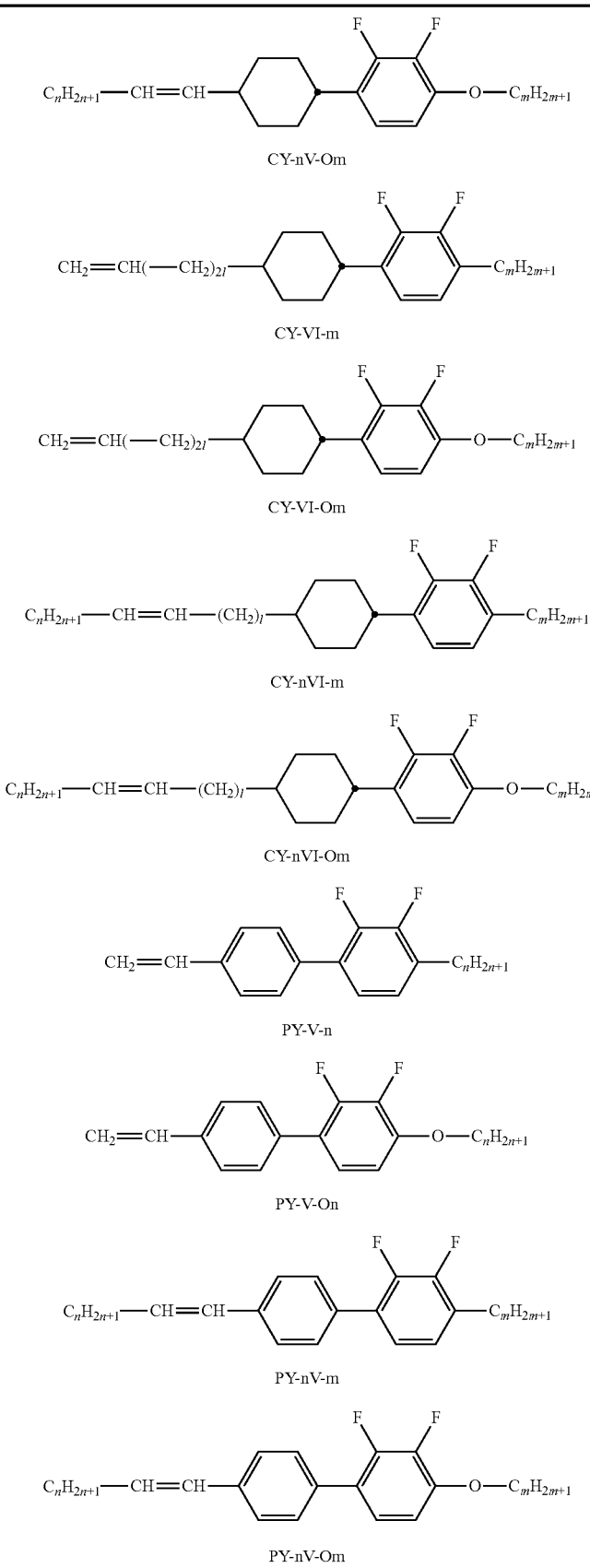

TABLE D-continued
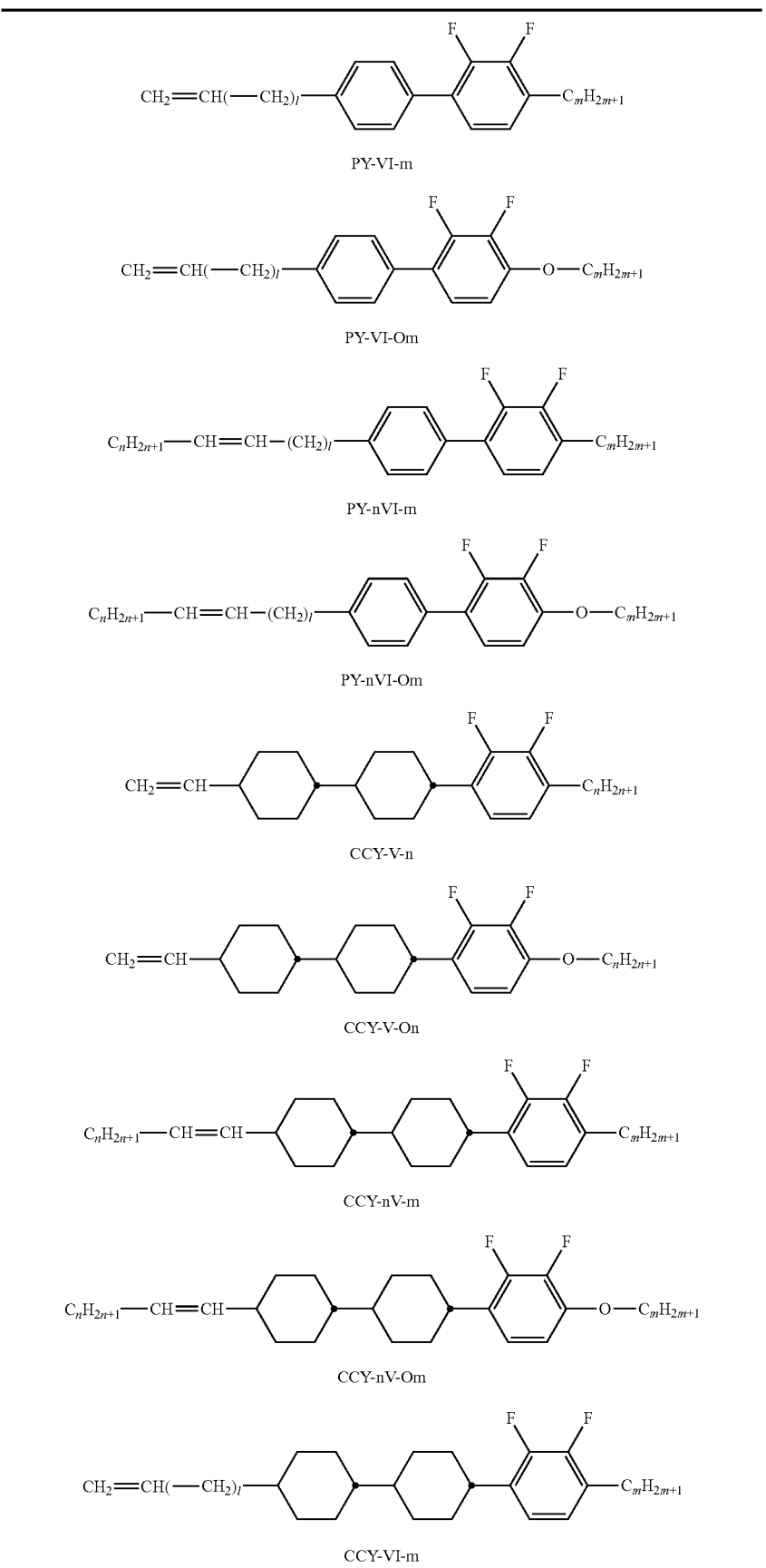

TABLE D-continued
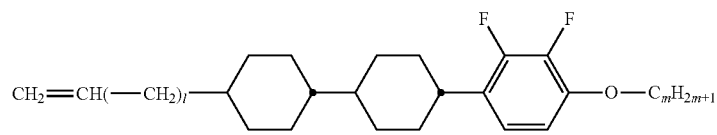
CCY-VI-Om
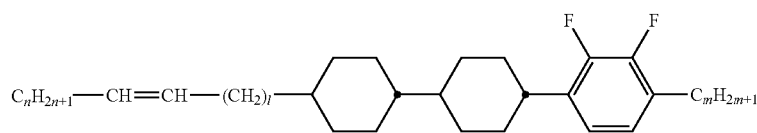
CCY-nVI-m
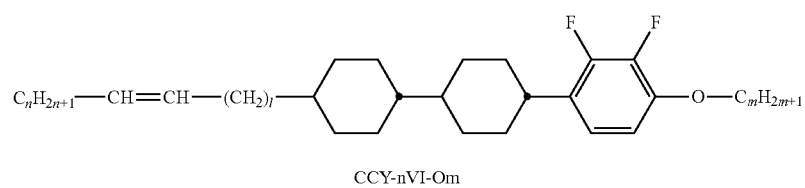
CCY-nVI-Om
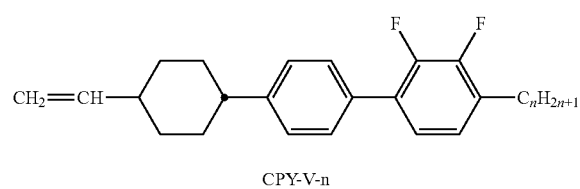
CPY-V-n
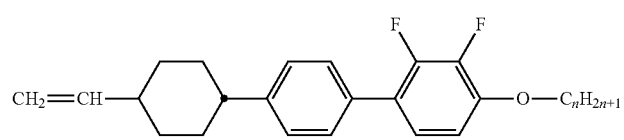
CPY-V-On
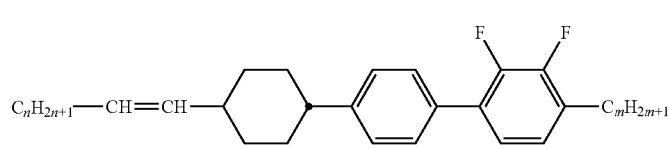
CPY-nV-m
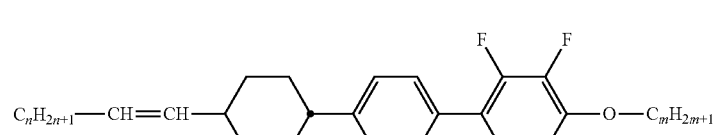
CPY-nV-Om
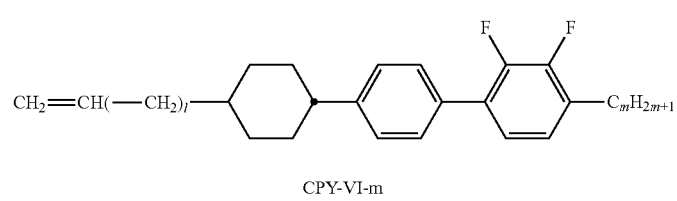
CPY-VI-m TABLE D-continued
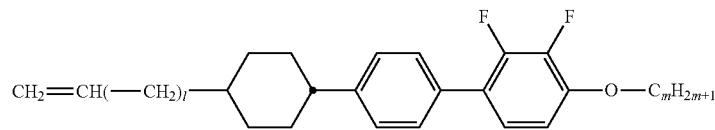
CPY-VI-Om
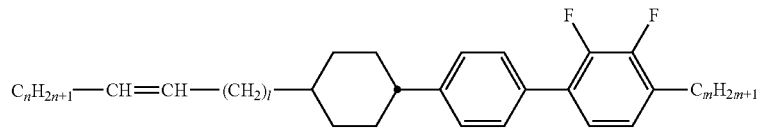
CPY-nVI-k
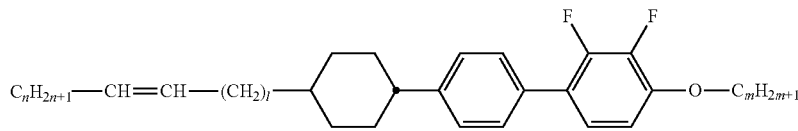
CPY-nVI-Om
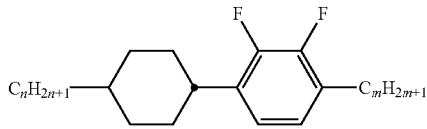
CY-n-m
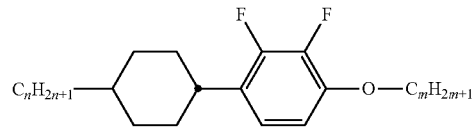
CY-n-Om
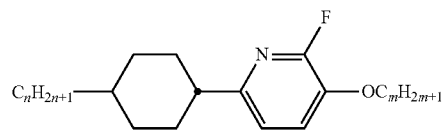
CNI(F)-n-Om
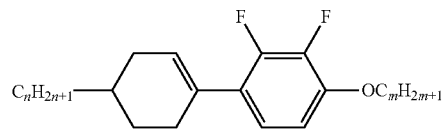
LY-n-Om
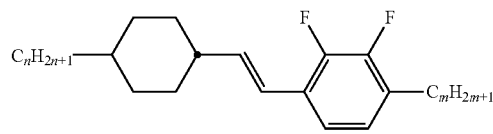
CVY-n-m
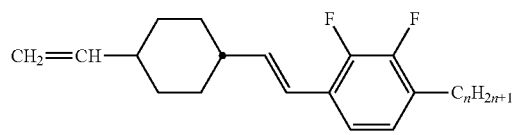
CVY-V-n TABLE D-continued
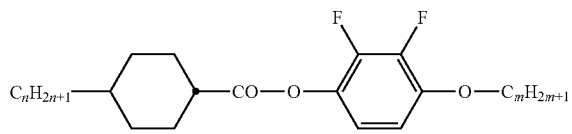
CZY-n-Om
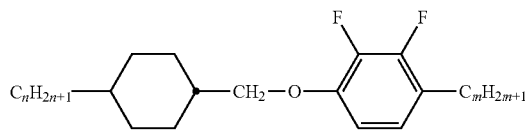
COY-n-m
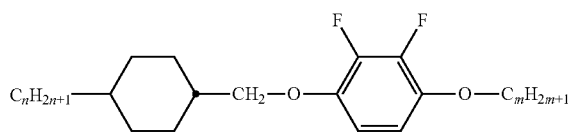
COY-n-Om
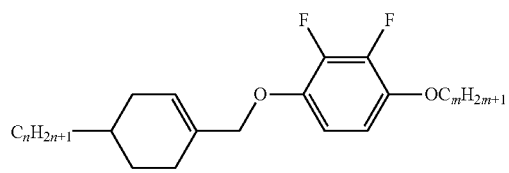
LOY-n-Om
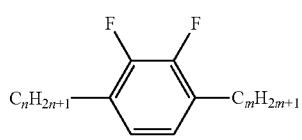
Y-n-m
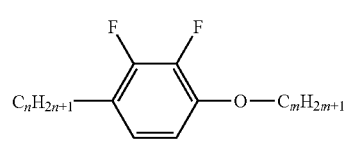
Y-n-Om
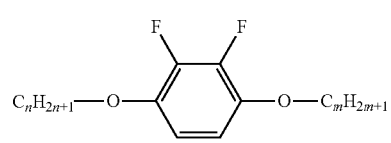
Y-nO-Om
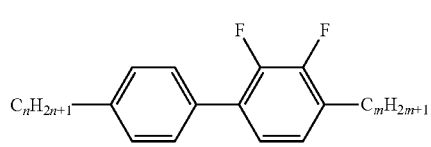
PY-n-m TABLE D-continued
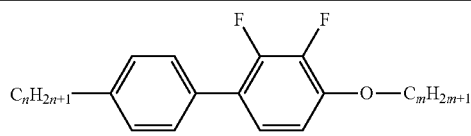
PY-n-Om
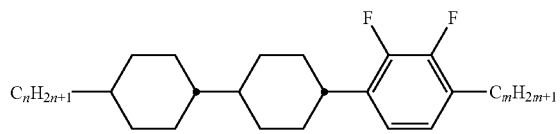
CCY-n-m
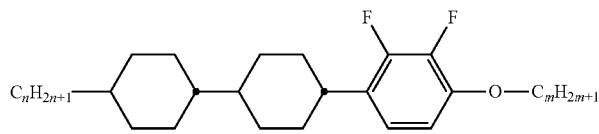
CCY-n-Om
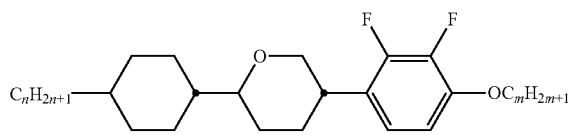
CAIY-n-Om
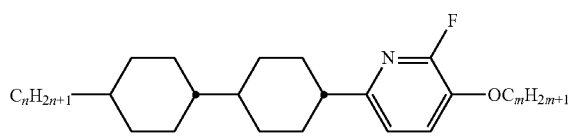
CCNI(F)-n-Om
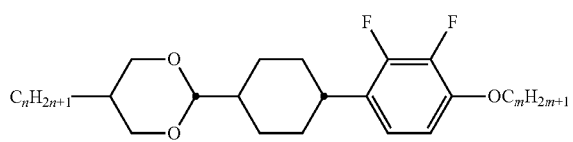
DCY-n-Om
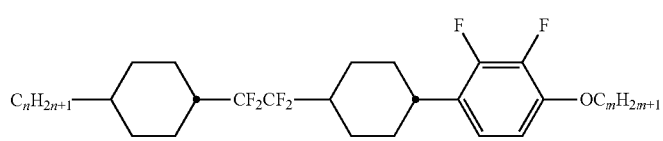
CWCY-n-Om
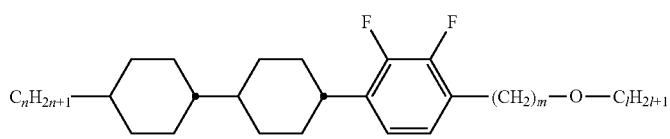
CCY-n-mOl
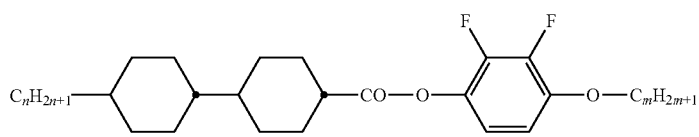
CCZY-n-Om TABLE D-continued
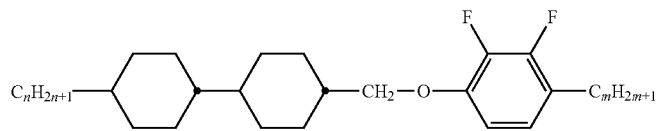
CCOY-n-m
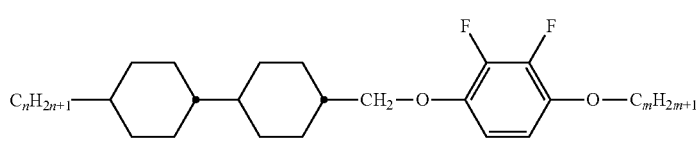
CCOY-n-Om
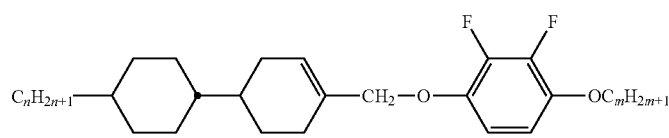
CLOY-n-Om
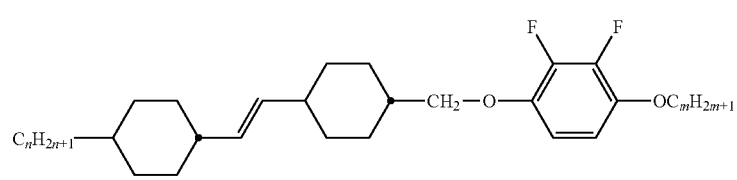
CVCOY-n-Om
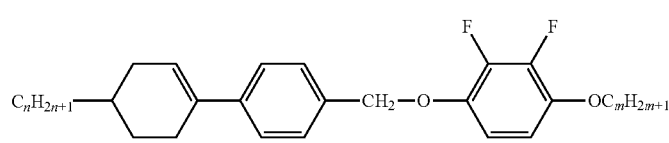
LPOY-n-Om
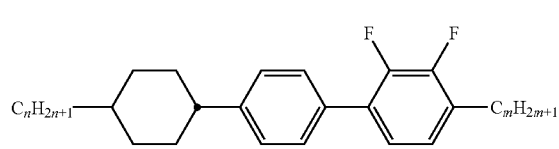
CPY-n-m
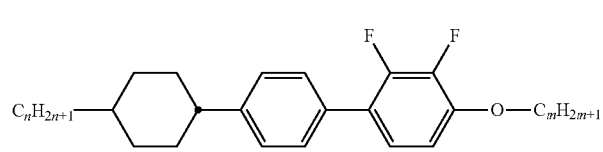
CPY-n-Om
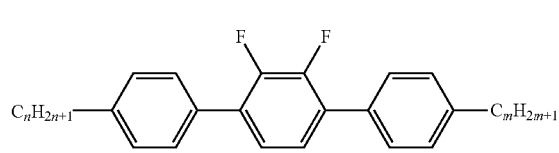
PYP-n-m TABLE D-continued
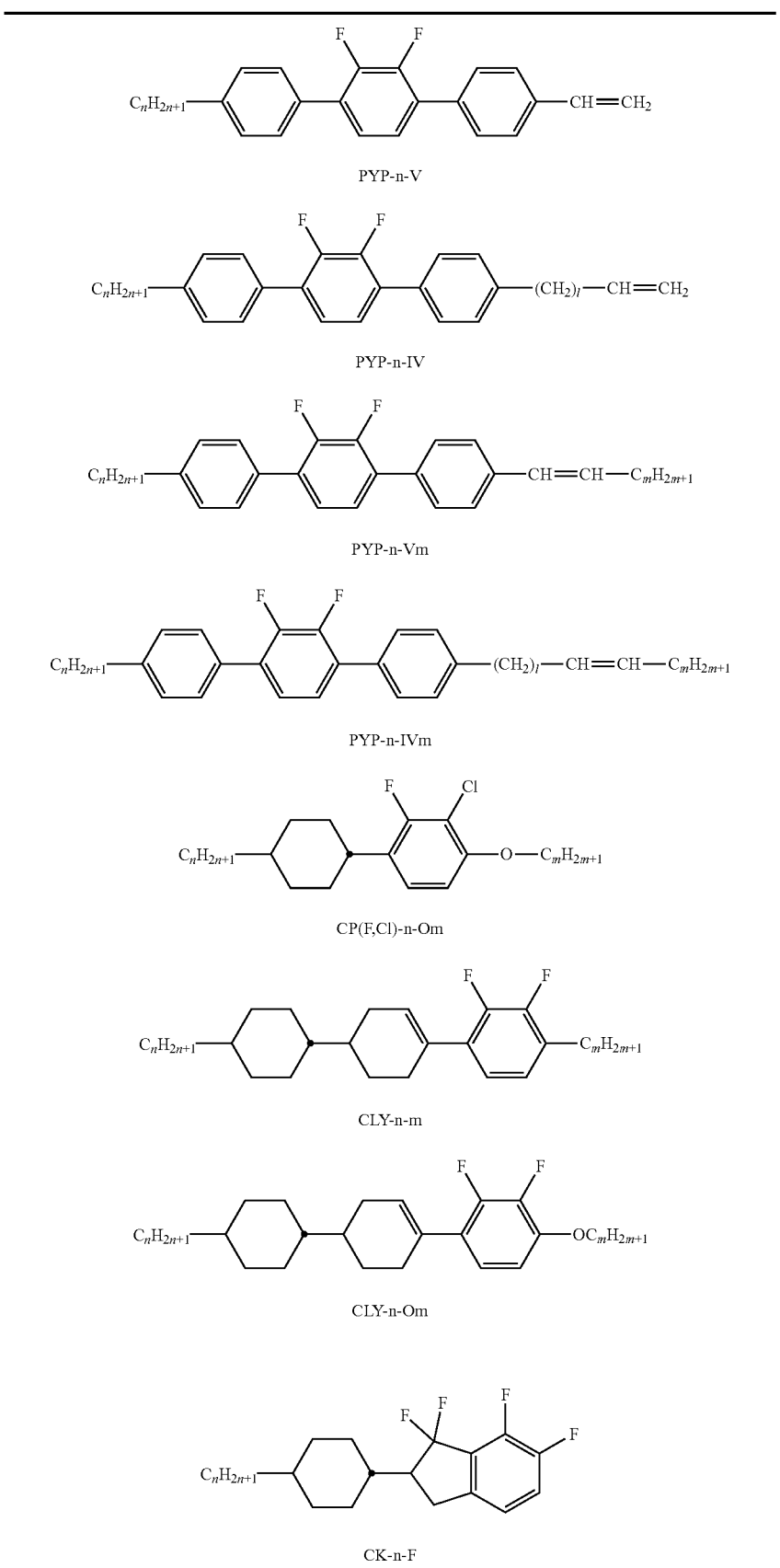

TABLE D-continued
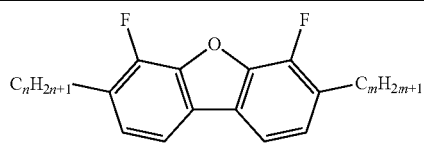
B-n-m
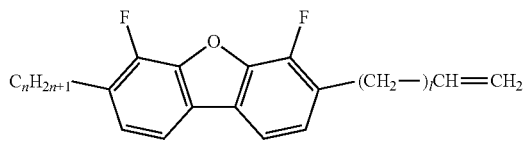
B-n-IV
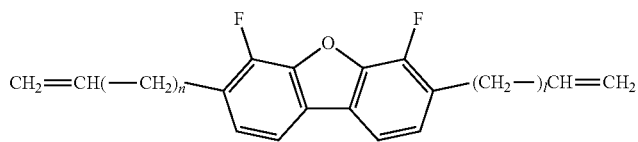
B-Vn-IV
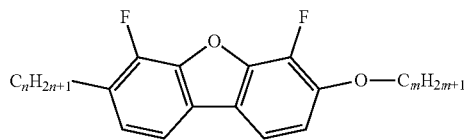
B-n-Om
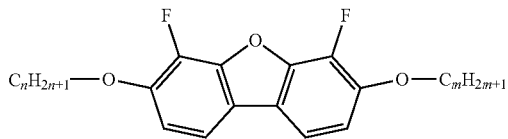
B-nO-Om
CB-n-Om
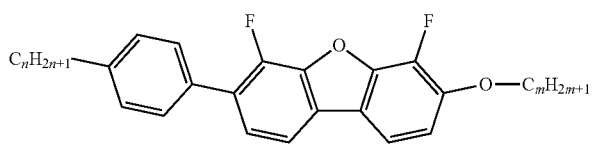
PB-n-Om
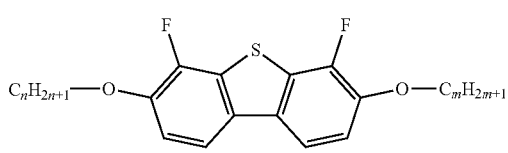
B(S)-nO-Om TABLE D-continued
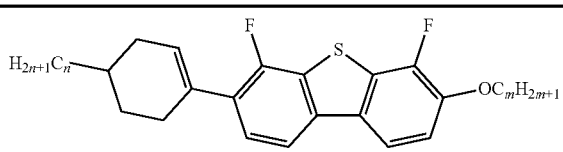
LB(S)-n-OT
COB(S)-n-Om
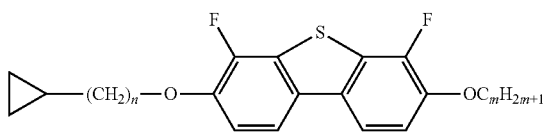
B(S)-(c3)nO-Om
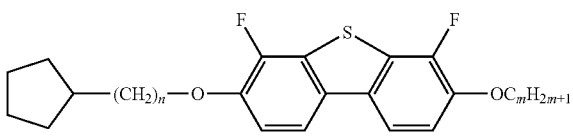
B(S)-(c5)nO-Om
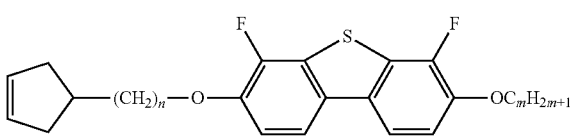
B(S)-(c5-3en)nO-Om
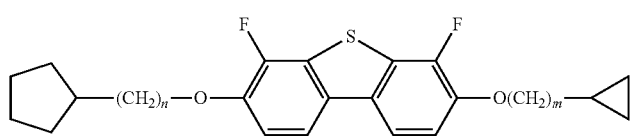
B(S)-(c5)nO-Om(c3)
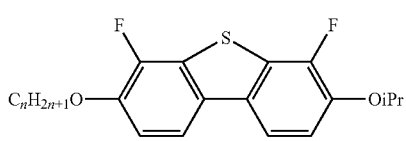
B(S)-nO-OiPr
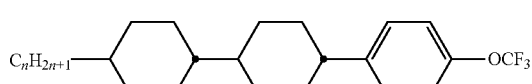
CCP-n-OT
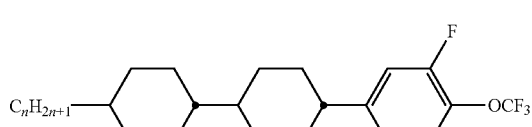
CCG-n-OT TABLE D-continued
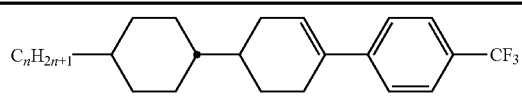
CLP-n-T
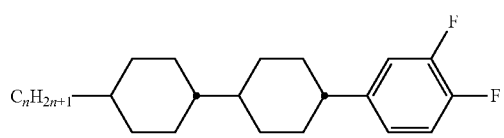
CCG-n-F
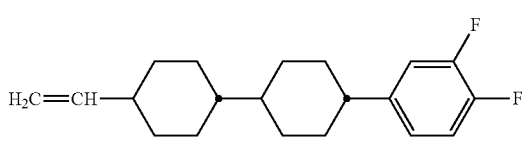
CCG-V-F
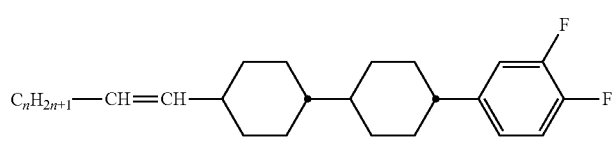
CCG-nV-F
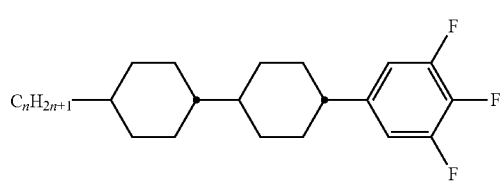
CCU-n-F
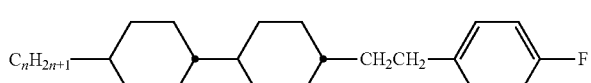
CCEP-n-F
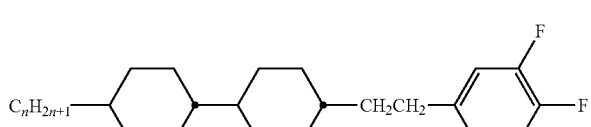
CCEU-n-F
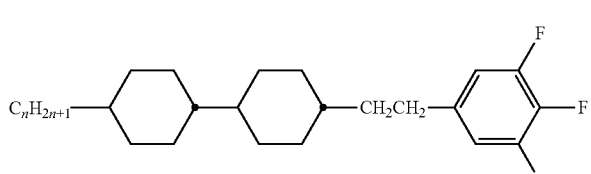
CCEU-n-F
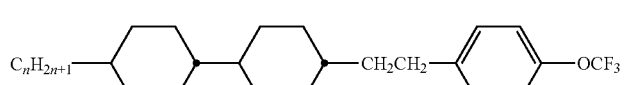
CCEP-n-OT TABLE D-continued
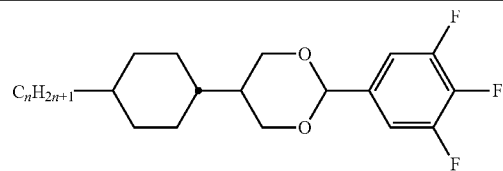
CDU-n-F
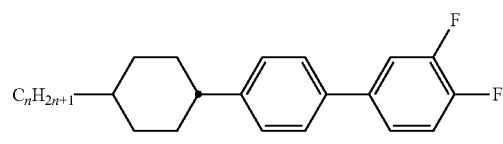
CPG-n-F
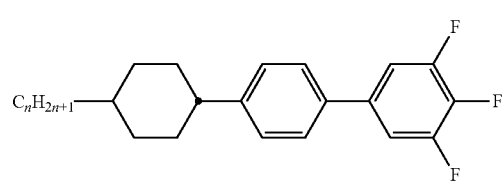
CPU-n-F
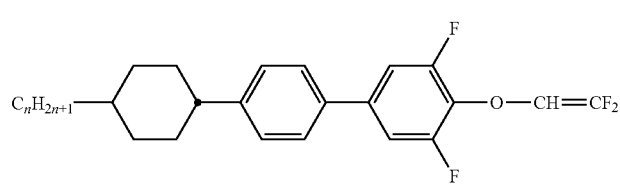
CPU-n-OXF
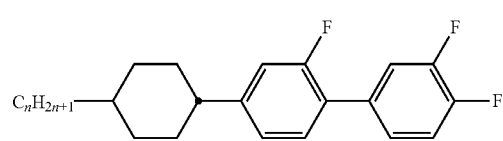
CGG-n-F
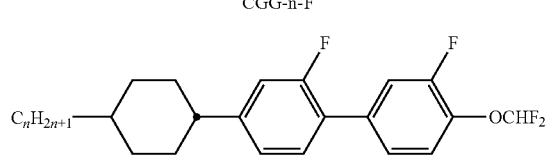
CGG-n-OD
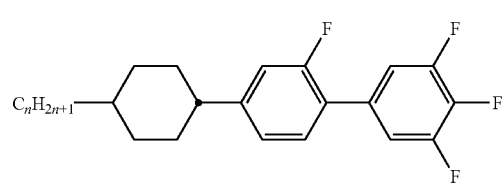
CGU-n-F
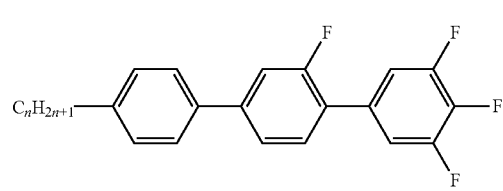
PGU-n-F TABLE D-continued
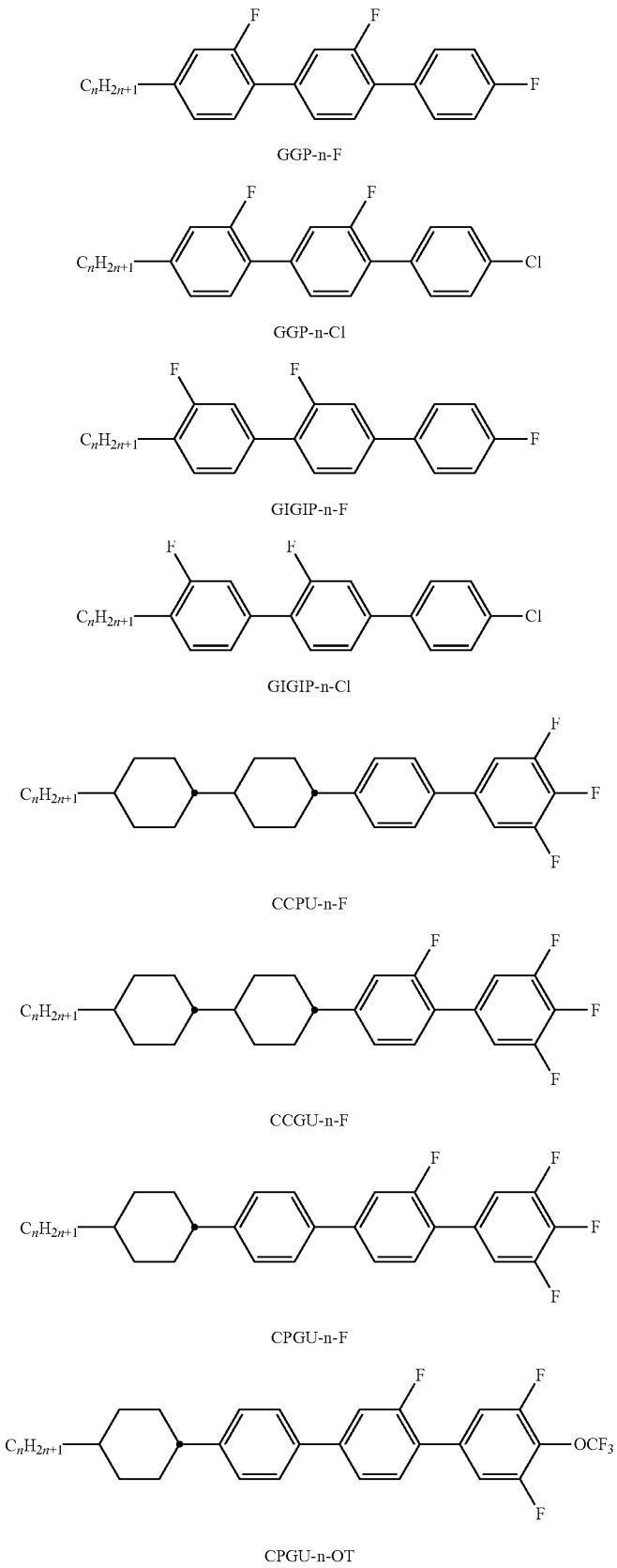

TABLE D-continued
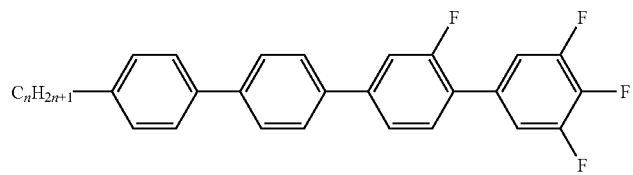
PPGU-n-F
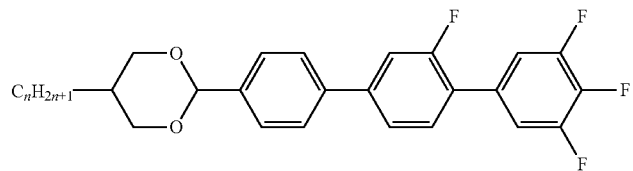
DPGU-n-F
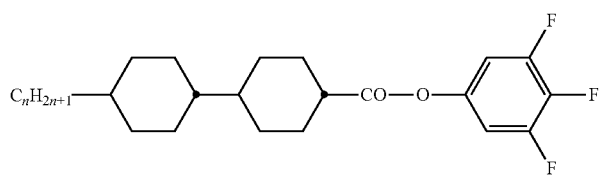
CCZU-n-F
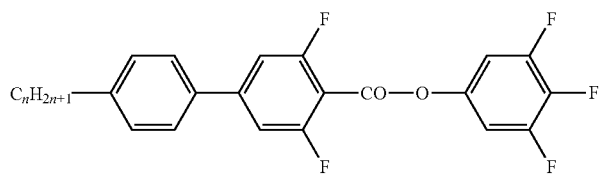
PUZU-n-F
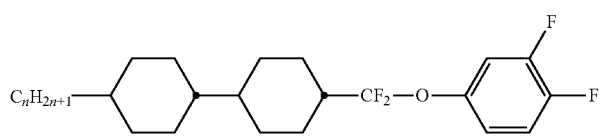
CCQG-n-F
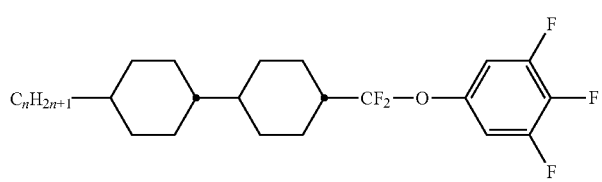
CCQU-n-F
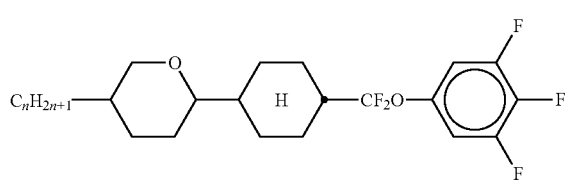
ACQU-n-F TABLE D-continued
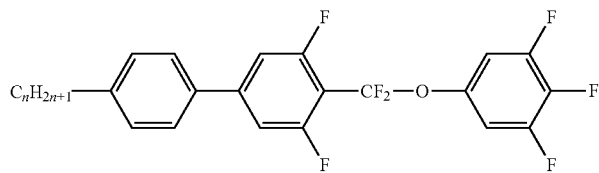
PUQU-n-F
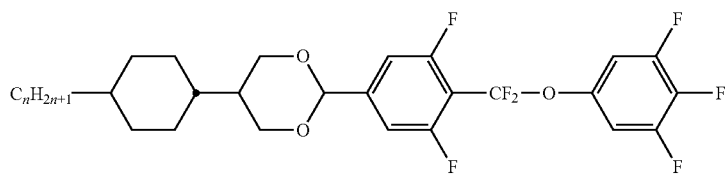
CDUQU-n-F
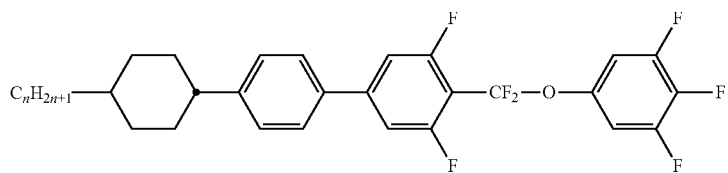
CPUQU-n-F
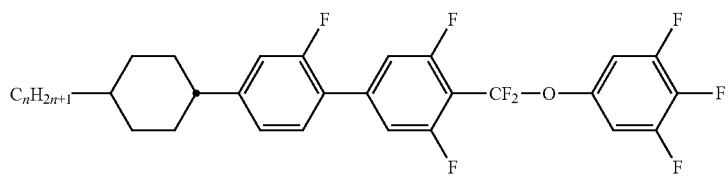
CGUQU-n-F
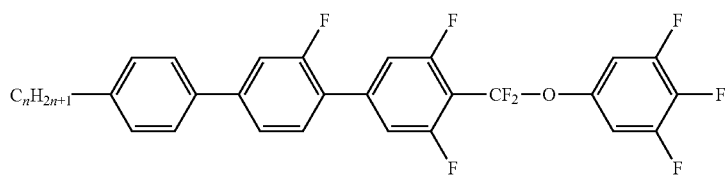
PGUQU-n-F
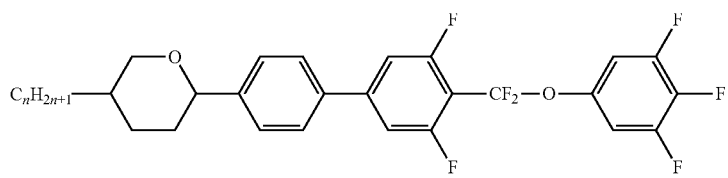
APUQU-n-F
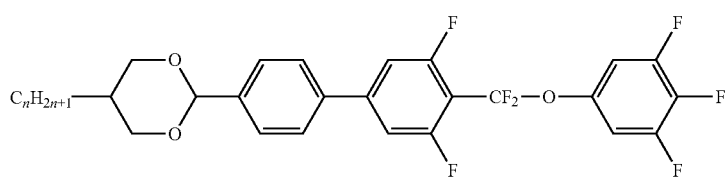
DPUQU-n-F TABLE D-continued
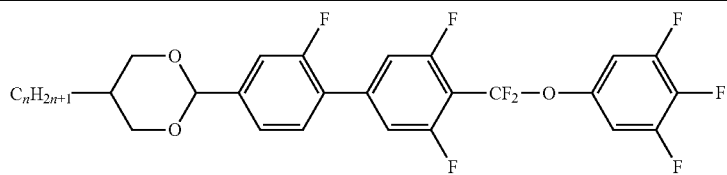
DGUQU-n-F
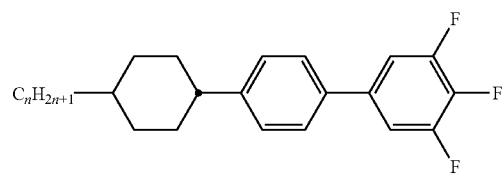
CPU-n-F
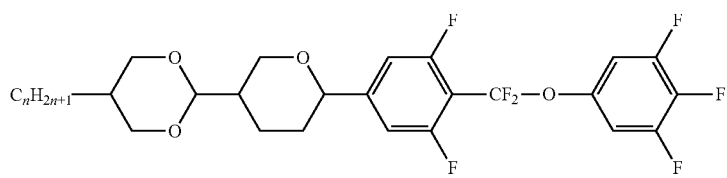
DAUQU-n-F
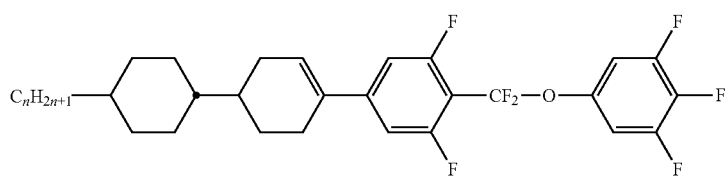
CLUQU-n-F
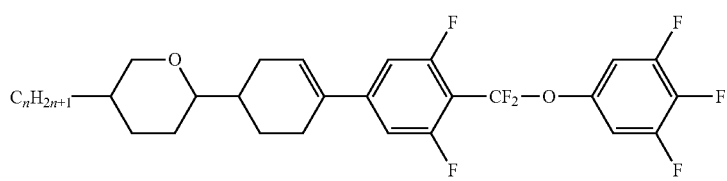
ALUQU-n-F
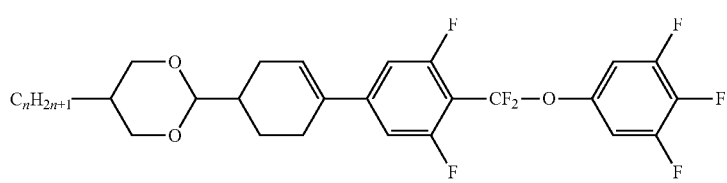
DLUQU-n-F
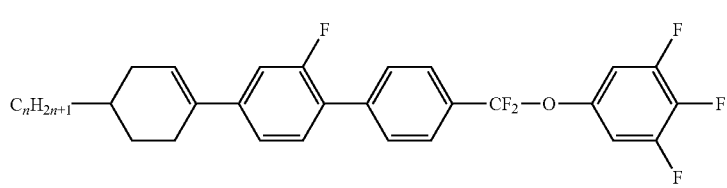
LGPQU-n-F TABLE D-continued

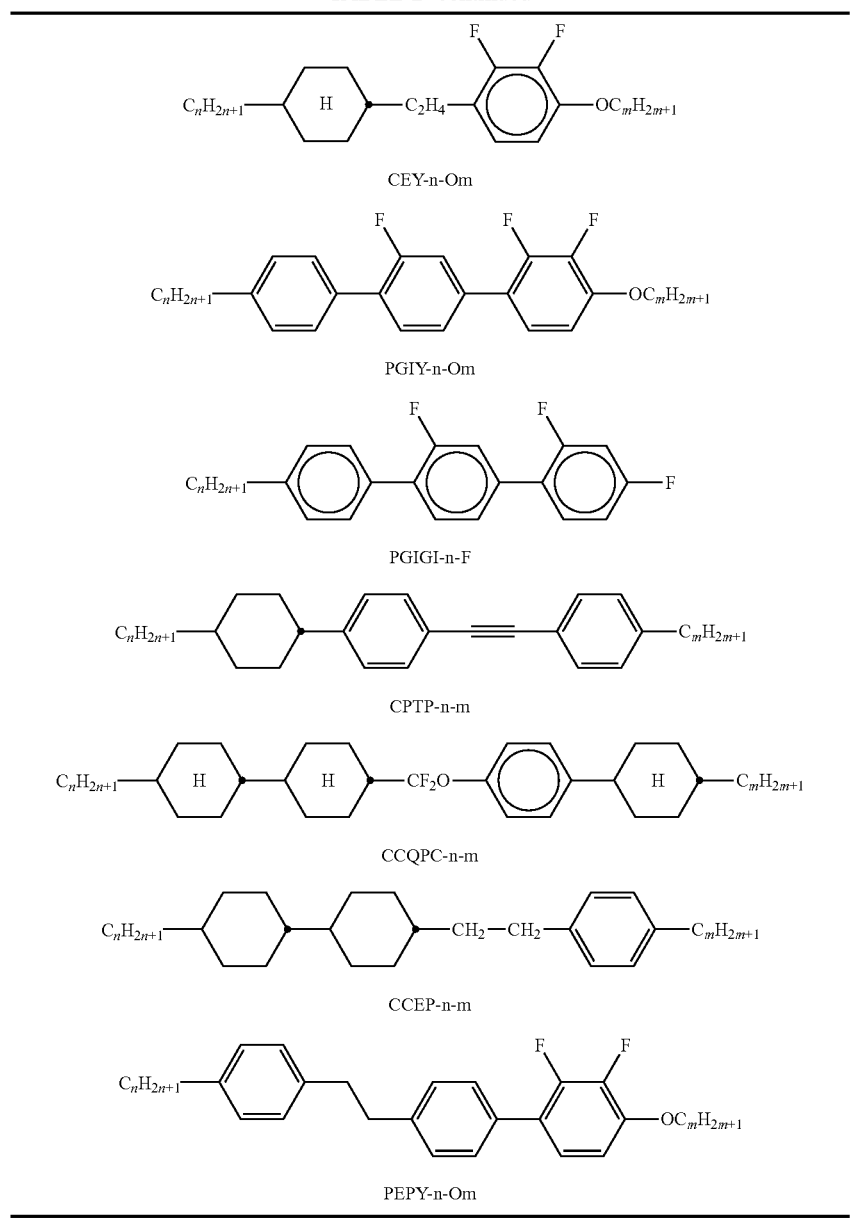

CEY-n-Om

PGIY-n-Om

PGIGI-n-F

CPTP-n-m

CCQPC-n-m

CCEP-n-m

PEPY-n-Om

EXAMPLES

The present invention is illustrated in detail by the following non-restrictive working examples.

The following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., T(N,I) clearing point [° C.],
$\gamma_1$ rotational viscosity at 20° C. [m·Pas],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck kGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerising the polymerisable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates with a distance of 25 μm, each of which has on the inside an electrode layer and an unrubbed polyimide alignment layer on top, which effect homeotropic alignment of the liquid-crystal molecules.

The display or test cell used for measurement of the tilt angles consists of two plane-parallel glass outer plates at a separation of 4 μm, each of which has on the inside an electrode layer and a polyimide alignment layer on top, where the two polyimide layers are rubbed antiparallel to one another and effect a homeotropic edge alignment of the liquid-crystal molecules.

The polymerisable compounds are polymerised in the display or test cell by irradiation with UV light of defined intensity for a prespecified time, with a voltage simultaneously being applied to the display (usually 10 V to 30 V alternating current, 1 kHz). In the examples, unless indicated otherwise, a fluorescent lamp and an intensity of 0 to 20 mW/cm² is used for polymerisation. The intensity is measured using a standard meter (Ushio Accumulate UV meter with central wavelength of 313 nm).

The transmission measurements are performed in test cells with fishbone electrode layout (from Merck Ltd., Japan; 1 pixel fishbone electrode (ITO, 10×10 mm, 47.7° angle of fishbone with 3 μm line/3 μm space), 3.2 μm cell gap, AF-glass, tilt angle 1°).

The storage stability in the bulk ($LTS_{bulk}$) of the media according to the invention at a given temperature T is determined by visual inspection. 2 g of the media of interest are filled into a closed glass vessel (bottle) of appropriate size placed in a refrigerator at a predetermined temperature. The bottles are checked at defined time intervals for the occurrence of smectic phases or crystallisation. For every material and at each temperature two bottles are stored. If crystallisation or the appearance of a smectic phase is observed in at least one of the two correspondent bottles the test is terminated and the time of the last inspection before the one at which the occurrence of a higher ordered phase is observed is recorded as the respective storage stability.

EXAMPLES

The following stabilisers of formula I are used:

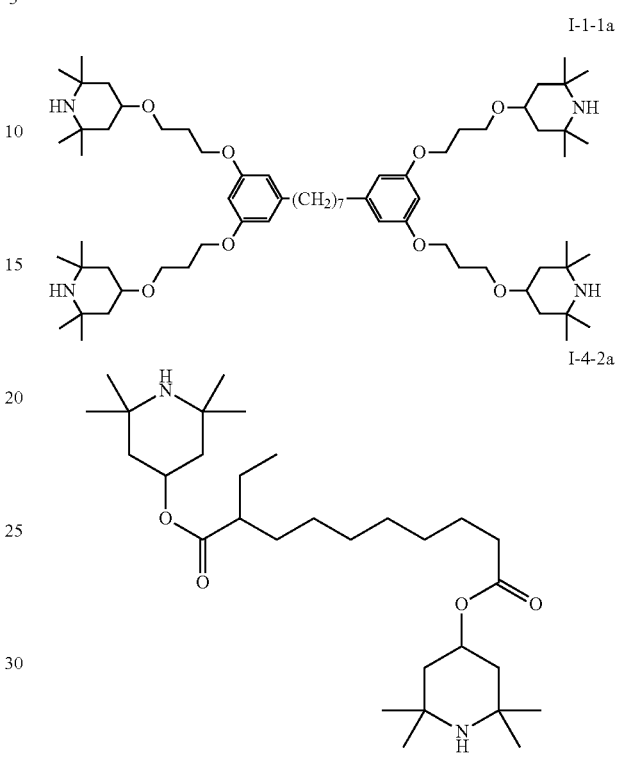

I-1-1a

I-4-2a

The nematic LC host mixtures H1 to H88 and Mixture Examples N1 to N88 have the compositions and the properties given in the following tables.

Mixture H1

| | |
|---|---|
| B(S)-2O-O6 | 2.0% |
| CCY-3-O2 | 8.0% |
| CCY-3-O1 | 3.0% |
| CLOY-3-O2 | 15.0% |
| CLY-3-O2 | 12.0% |
| CLY-4-O2 | 5.0% |
| CLY-5-O2 | 5.0% |
| CCY-5-O2 | 4.0% |
| CC-3-V1 | 15.0% |
| CC-4-V1 | 16.0% |
| CC-3-O3 | 1.0% |
| CC-3-5 | 6.0% |
| CCZC-3-3 | 4.0% |
| CCZC-3-5 | 4.0% |
| Σ | 100.0% |

Mixture Example N1

| | | | |
|---|---|---|---|
| H1 | 99.94% | $T_{(N,I)}$ [° C.]: | 125.4 |
| ST-3a-1 | 0.03% | Δn (589 nm, 25° C.): | 0.0904 |
| I-1-1a | 0.03% | Δε (1 kHz, 25° C.): | −3.7 |
| Σ | 100.0% | $K_1$ [pN], 25° C.): | |
| | | $K_3$ [pN], (25° C.): | 26.2 |
| | | $γ_1$ [mPa · s], (25° C.): | 206 |

Mixture H2

| | |
|---|---|
| B(S)-2O-O4 | 4.0% |
| B(S)-2O-O5 | 5.0% |
| B(S)-2O-O6 | 2.5% |
| Y-4O-O4 | 3.0% |
| PY-3-O2 | 7.5% |
| CLY-3-O2 | 9.0% |
| CLY-3-O3 | 6.0% |
| CPY-3-O2 | 4.5% |
| CC-2-3 | 6.0% |
| CC-3-5 | 4.5% |
| CC-3-V | 32.0% |
| CC-3-V1 | 8.0% |
| CLP-V-1 | 8.0% |
| Σ | 100.0% |

Mixture Example N2

| | | | |
|---|---|---|---|
| H2 | 99.87% | $T_{(N,I)}$ [° C.]: | 76 |
| ST-3a-1 | 0.03% | Δn (589 nm, 25° C.): | 0.0969 |
| I-1-1a | 0.10% | $n_e$ (25° C., 589.3 nm): | 1.5800 |
| Σ | 100.0% | $n_o$ (25° C., 589.3 nm): | 1.4831 |
| | | Δε (1 kHz, 25° C.): | −2.7 |
| | | $ε_{\parallel}$ (1 kHz, 25° C.): | 3.4 |
| | | $ε_{\perp}$ (1 kHz, 25° C.): | 6.1 |
| | | $K_1$ [pN], (25° C.): | 15.1 |
| | | $K_3$ [pN], (25° C.): | 14.1 |
| | | $γ_1$ [mPa·s], (25° C.): | 57 |
| | | $V_0$ [V], (25° C.): | 2.39 |

Low temperature stability (LTS) tests of the host mixtures H1 and H2 and of the mixtures N1 and N2 according to the invention are performed as described above. The results are summarized in the following table.

| Mixture | $LTS_{bulk}$ (−30° C.) [h] |
|---|---|
| H1 | 96 |
| N1 | >240 |
| H2 | 120 |
| N2 | 168 |

The addition of a compound of formula I to a host medium significantly increases the LTS. By increasing the amount of the compound I-1-1a in Mixture Example N2 to 1200 ppm, the LTS is further increased.

Mixture H3

| | |
|---|---|
| B(S)-2O-O4 | 4.0% |
| B(S)-2O-O5 | 5.0% |
| Y-4O-O4 | 8.0% |
| CY-3-O2 | 5.5% |
| CCY-3-O2 | 2.0% |
| CLY-3-O2 | 9.0% |
| CLY-3-O3 | 6.0% |
| CPY-3-O2 | 2.5% |
| CC-3-4 | 6.0% |
| CC-3-5 | 5.0% |
| CC-3-V | 25.0% |
| CC-3-V1 | 5.0% |
| CCP-3-1 | 10.0% |
| CLP-V-1 | 7.0% |
| Σ | 100.0% |

Mixture Example N3

| | | | |
|---|---|---|---|
| H3 | 99.87% | $T_{(N,I)}$ [° C.]: | 80 |
| ST-3a-1 | 0.03% | Δn (589 nm, 25° C.): | 0.0922 |
| I-4-2a | 0.01% | $n_e$ (25° C., 589.3 nm): | 1.5751 |
| Σ | 100.0% | $n_o$ (25° C., 589.3 nm): | 1.4829 |
| | | Δε (1 kHz, 25° C.): | −3.1 |
| | | $ε_{\parallel}$ (1 kHz, 25° C.): | 3.5 |
| | | $ε_{\perp}$ (1 kHz, 25° C.): | 6.6 |
| | | $K_1$ [pN], (25° C.): | 16.3 |
| | | $K_3$ [pN], (25° C.): | 15.5 |
| | | $γ_1$ [mPa·s], (25° C.): | 82 |
| | | $V_0$ [V], (25° C.): | 2.37 |

The host mixture H3 and mixture N3 are cooled to −40° C. After 24 h a smectic phase is observed in host mixture H3, whereas the mixture N3 according to the invention is nematic.

Mixture H4

| | |
|---|---|
| B(S)-(c5)1O-O2 | 2.0% |
| CCY-3-O2 | 8.0% |
| CCY-3-O1 | 3.0% |
| CLOY-3-O2 | 15.0% |
| CLY-3-O2 | 12.0% |
| CLY-4-O2 | 5.0% |
| CLY-5-O2 | 5.0% |
| CCY-5-O2 | 4.0% |
| CC-3-V1 | 15.0% |
| CC-4-V1 | 16.0% |
| CC-3-O3 | 1.0% |
| CC-3-5 | 6.0% |
| CCZC-3-3 | 4.0% |
| CCZC-3-5 | 4.0% |
| Σ | 100.0% |

Mixture Example N4

| | | | |
|---|---|---|---|
| H1 | 99.92% | $T_{(N,I)}$ [° C.]: | 125 |
| ST-3a-1 | 0.03% | Δn (589 nm, 25° C.): | 0.0906 |
| I-1-1a | 0.05% | Δε (1 kHz, 25° C.): | −3.7 |
| Σ | 100.0% | $K_1$ [pN], (25° C.): | 24.1 |
| | | $K_3$ [pN], (25° C.): | 24.9 |
| | | $γ_1$ [mPa·s], (25° C.): | 209 |

Mixture H5

| | |
|---|---|
| CC-3-V1 | 10.0% |
| CC-4-V1 | 16.0% |
| CC-3-O3 | 8.0% |
| CC-3-5 | 5.0% |
| Y-4O-O4 | 5.5% |
| CY-5-O2 | 2.0% |
| CCY-3-O2 | 8.0% |
| CCY-5-O2 | 2.5% |
| CLOY-3-O2 | 15.0% |
| CLY-3-O2 | 9.0% |
| CLY-4-O2 | 5.0% |
| CLY-5-O2 | 5.0% |
| CLY-3-O3 | 1.0% |
| CCZC-3-3 | 4.0% |
| CCZC-3-5 | 4.0% |
| Σ | 100.0% |

Mixture Example N5

| | | | |
|---|---|---|---|
| H1 | 99.87% | $T_{(N,I)}$ [° C.]: | 103.5 |
| ST-3a-1 | 0.02% | Δn (589 nm, 25° C.): | 0.0833 |
| I-1-1a | 0.11% | $n_e$ (25° C., 589.3 nm): | 1.5583 |
| Σ | 100.0% | $n_o$ (25° C., 589.3 nm): | 1.4750 |
| | | Δε (1 kHz, 25° C.): | −3.8 |
| | | $ε_{\parallel}$ (1 kHz, 25° C.): | 3.3 |
| | | $ε_{\perp}$ (1 kHz, 25° C.): | 7.1 |
| | | $K_1$ [pN], (25° C.): | 21.2 |
| | | $K_3$ [pN], (25° C.): | 21.2 |
| | | $γ_1$ [mPa · s], (25° C.): | 151 |
| | | $V_0$ [V], (25° C.): | 2.50 |

Mixture H6

| | |
|---|---|
| CC-3-V1 | 10.0% |
| CC-4-V1 | 14.0% |
| CC-3-O3 | 8.0% |
| CC-3-5 | 13.5% |
| CCOY-2-O2 | 3.5% |
| CCOY-3-O2 | 9.0% |
| CLOY-3-O2 | 15.0% |
| CLY-3-O2 | 10.0% |
| CLY-4-O2 | 5.0% |
| CLY-5-O2 | 4.0% |
| CLY-3-O3 | 1.0% |
| CCZC-3-3 | 4.0% |
| CCZC-3-5 | 3.0% |
| Σ | 100.0% |

Mixture Example N6

| | | | |
|---|---|---|---|
| H1 | 99.92% | $T_{(N,I)}$ [° C.]: | 115 |
| ST-3a-1 | 0.03% | Δn (589 nm, 25° C.): | 0.0836 |
| I-1-1a | 0.05% | Δε (1 kHz, 25° C.): | −3.8 |
| Σ | 100.0% | $K_1$ [pN], (25° C.): | 25.3 |
| | | $K_3$ [pN], (25° C.): | 24.8 |
| | | $γ_1$ [mPa · s], (25° C.): | 180 |
| | | $V_0$ [V], (25° C.): | 2.80 |

Mixture H7

| | |
|---|---|
| CC-3-V1 | 10.0% |
| CC-4-V1 | 16.0% |
| CC-3-O3 | 8.0% |
| CC-3-5 | 5.0% |
| Y-4O-O4 | 5.5% |
| CEY-5-O2 | 2.0% |
| CCY-3-O2 | 8.0% |
| CCY-5-O2 | 2.5% |
| CLOY-3-O2 | 15.0% |
| CLY-3-O2 | 9.0% |
| CLY-4-O2 | 5.0% |
| CLY-5-O2 | 5.0% |
| CLY-3-O3 | 1.0% |
| CCZC-3-3 | 4.0% |
| CCZC-3-5 | 4.0% |
| Σ | 100.0% |

Mixture Example N7

| | | | |
|---|---|---|---|
| H1 | 99.87% | $T_{(N,I)}$ [° C.]: | 103 |
| ST-3a-1 | 0.02% | Δn (589 nm, 25° C.): | 0.0832 |
| I-1-1a | 0.11% | $n_e$ (25° C., 589.3 nm): | 1.5582 |
| Σ | 100.0% | $n_o$ (25° C., 589.3 nm): | 1.4750 |
| | | Δε (1 kHz, 25° C.): | −3.8 |
| | | $ε_{\parallel}$ (1 kHz, 25° C.): | 3.3 |
| | | $ε_{\perp}$ (1 kHz, 25° C.): | 7.1 |
| | | $K_1$ [pN], (25° C.): | 21.0 |
| | | $K_3$ [pN], (25° C.): | 21.1 |
| | | $γ_1$ [mPa · s], (25° C.): | 152 |
| | | $V_0$ [V], (25° C.): | 2.51 |

The Mixture Examples N8 to N88 consist of the host mixtures H8 to H88 below, and 1000 ppm of the compound I-1-1a each. The mixtures are distinguished by a particularly high LTS.

Mixture H8

| | | | |
|---|---|---|---|
| B(S)-2O-O6 | 2.0% | $T_{(N,I)}$ [° C.]: | 122 |
| CCY-3-O2 | 8.0% | Δn (589 nm, 25° C.): | 0.0898 |
| CAIY-3-O2 | 3.0% | Δε (1 kHz, 25° C.): | −3. |
| CLOY-3-O2 | 15.0% | $K_1$ [pN], (25° C.): | 21.1 |
| CLY-3-O2 | 12.0% | $K_3$ [pN], (25° C.): | 21.9 |
| CLY-4-O2 | 5.0% | $γ_1$ [mPa · s], (25° C.): | 200 |
| CLY-5-O2 | 5.0% | | |
| CCY-5-O2 | 4.0% | | |
| CC-3-V1 | 15.0% | | |
| CC-4-V1 | 16.0% | | |
| CC-3-O3 | 1.0% | | |
| CC-3-5 | 6.0% | | |
| CC-1-3 | 2.0% | | |
| CCZC-3-3 | 4.0% | | |
| CCZC-3-5 | 4.0% | | |
| Σ | 100.0% | | |

Mixture H9

| | | | |
|---|---|---|---|
| B(S)-2O-O4 | 4.0% | cl. p. [° C.]: | 123 |
| B(S)-2O-O5 | 2.5% | Δn [589 nm, 20° C.]: | 0.0972 |
| CC-3-V | 2.0% | Δε [1 kHz, 20° C.]: | −3.9 |
| CC-3-V1 | 10.0% | $γ_1$ [mPa s, 20° C.]: | 228 |
| CC-4-V1 | 15.0% | | |
| CC-3-5 | 13.0% | | |
| CCP-3-1 | 5.0% | | |
| CCY-3-O2 | 10.0% | | |
| CCY-5-O2 | 6.5% | | |
| CLOY-3-O2 | 8.5% | | |
| CCOY-2-O3 | 4.0% | | |
| CLY-3-O2 | 9.5% | | |
| CLY-4-O2 | 5.0% | | |
| CLY-5-O2 | 5.0% | | |
| Σ | 100.0% | | |

Mixture H10

| | | | |
|---|---|---|---|
| B(S)-2O-O4 | 4.0% | cl. p. [° C.]: | 76 |
| B(S)-(c5)1O-O2 | 5.0% | Δn [589 nm, 20° C.]: | 0.0957 |
| CC-3-V | 10.5% | Δε [1 kHz, 20° C.]: | −6.1 |
| CC-3-V1 | 10.0% | $γ_1$ [mPa s, 20° C.]: | 115 |
| CC-3-4 | 12.0% | | |
| CC-3-5 | 6.5% | | |
| CCY-3-O2 | 11.0% | | |
| CLOY-3-O2 | 1.0% | | |

| | |
|---|---|
| CLY-3-O2 | 10.0% |
| CLY-4-O2 | 4.5% |
| COB(S)-2-O4 | 11.0% |
| Y-4O-O4 | 14.5% |
| Σ | 100.0% |

Mixture H11

| | | | |
|---|---|---|---|
| B(S)-2O-O4 | 4.0% | cl. p. [° C.]: | 75 |
| B(S)-(c5-3en)1O-O2 | 5.0% | Δn [589 nm, 20° C.]: | 0.0944 |
| CC-3-V | 10.5% | Δε [1 kHz, 20° C.]: | −6.0 |
| CC-3-V1 | 10.0% | γ₁ [mPa s, 20° C.]: | 112 |
| CC-3-4 | 12.0% | | |
| CC-3-5 | 6.5% | | |
| CCY-3-O2 | 11.0% | | |
| CLOY-3-O2 | 1.0% | | |
| CLY-3-O2 | 10.0% | | |
| CLY-4-O2 | 4.5% | | |
| COB(S)-2-O4 | 11.0% | | |
| Y-4O-O4 | 14.5% | | |
| Σ | 100.0% | | |

Mixture H12

| | | | |
|---|---|---|---|
| CLP-3-O1 | 8.0% | cl. p. [° C.]: | 125.5 |
| B(S)-2O-O4 | 3.68% | Δn [589 nm, 20° C.]: | 0.1064 |
| B(S)-2O-O5 | 2.76% | ε$_{\parallel}$ [1 kHz, 20° C.]: | 3.2 |
| B(S)-2O-O6 | 3.68% | ε$_{\perp}$ [1 kHz, 20° C.]: | 7.0 |
| CC-3-V1 | 9.2% | Δε [1 kHz, 20° C.]: | −3.8 |
| CC-4-V1 | 12.88% | K₁ [pN, 20° C.]: | 32.1 |
| CC-3-4 | 1.84% | K₃ [pN, 20° C.]: | 50.2 |
| CC-3-5 | 9.2% | V₀ [V, 20° C.]: | 3.84 |
| CCP-3-1 | 5.52% | | |
| CCP-V2-1 | 7.82% | | |
| CCY-3-O2 | 8.28% | | |
| CLOY-3-O2 | 14.26% | | |
| CLY-3-O2 | 8.28% | | |
| CLY-5-O2 | 4.6% | | |
| Σ | % | | |

Mixture H13

| | | | |
|---|---|---|---|
| B(S)-2O-O4 | 4.0% | cl. p. [° C.]: | 120.1 |
| B(S)-2O-O5 | 2.5% | Δn [589 nm, 20° C.]: | 0.0969 |
| CC-3-V | 2.%0 | ε$_{\parallel}$ [1 kHz, 20° C.]: | 3.2 |
| CC-3-V1 | 10.0% | ε$_{\perp}$ [1 kHz, 20° C.]: | 7.2 |
| CC-4-V1 | 15.0% | Δε [1 kHz, 20° C.]: | −4.0 |
| CC-3-5 | 13.0% | γ₁ [mPa s, 20° C.]: | 236 |
| CCP-3-1 | 5.0% | K₁ [pN, 20° C.]: | 27.3 |
| CCY-3-O2 | 10.0% | K₃ [pN, 20° C.]: | 27.5 |
| CCY-5-O2 | 6.5% | V₀ [V, 20° C.]: | 2.74 |
| CLOY-3-O2 | 12.5% | | |
| CLY-3-O2 | 9.5% | | |
| CLY-4-O2 | 5.0% | | |
| CLY-5-O2 | 5.0% | | |
| Σ | 100.0% | | |

Mixture H14

| | | | |
|---|---|---|---|
| B(S)-2O-O4 | 3.0% | cl. p. [° C.]: | 121.2 |
| B(S)-2O-O5 | 3.0% | Δn [589 nm, 20° C.]: | 0.0972 |
| CC-3-V | 3.0% | ε$_{\parallel}$ [1 kHz, 20° C.]: | 3.1 |
| CC-3-V1 | 8.0% | ε$_{\perp}$ [1 kHz, 20° C.]: | 6.9 |
| CC-4-V1 | 9.0% | Δε [1 kHz, 20° C.]: | −3.8 |
| CC-3-5 | 12.0% | γ₁ [mPa s, 20° C.]: | 232 |
| CCP-3-1 | 12.0% | K₁ [pN, 20° C.]: | 28.7 |
| CCY-3-O2 | 9.0% | K₃ [pN, 20° C.]: | 29.0 |
| CCY-5-O2 | 2.0% | V₀ [V, 20° C.]: | 2.90 |
| CLOY-3-O2 | 12.5% | | |
| CLY-3-O2 | 9.0% | | |
| CLY-5-O2 | 5.0% | | |
| CLY-3-O3 | 4.0% | | |
| CLY-4-O2 | 4.0% | | |
| CC-3-O3 | 4.5% | | |
| Σ | 100.0% | | |

Mixture H15

| | | | |
|---|---|---|---|
| B(S)-2O-O4 | 4.0% | cl. p. [° C.]: | 74.8 |
| B(S)-2O-O5 | 5.0% | Δn [589 nm, 20° C.]: | 0.0963 |
| CC-3-V | 10.5% | ε$_{\parallel}$ [1 kHz, 20° C.]: | 4.3 |
| CC-3-V1 | 10.0% | ε$_{\perp}$ [1 kHz, 20° C.]: | 10.3 |
| CC-3-4 | 12.0% | Δε [1 kHz, 20° C.]: | −6.0 |
| CC-3-5 | 6.5% | γ₁ [mPa s, 20° C.]: | 110 |
| CCY-3-O2 | 11.0% | K₁ [pN, 20° C.]: | 16.4 |
| CLOY-3-O2 | 1.0% | K₃ [pN, 20° C.]: | 13.8 |
| CLY-3-O2 | 10.0 | V₀ [V, 20° C.]: | 1.58 |
| CLY-4-O2 | 4.5 | | |
| COB(S)-2-O4 | 11.0 | | |
| Y-4O-O4 | 14.5 | | |
| Σ | 100.0% | | |

Mixture H16

| | | | |
|---|---|---|---|
| B(S)-2O-O4 | 3.0% | cl. p. [° C.]: | 121.1 |
| B(S)-2O-O5 | 3.0% | Δn [589 nm, 20° C.]: | 0.0971 |
| CC-3-V | 3.5% | ε$_{\parallel}$ [1 kHz, 20° C.]: | 3.1 |
| CC-3-V1 | 8.5% | ε$_{\perp}$ [1 kHz, 20° C.]: | 6.9 |
| CC-4-V1 | 9.0% | Δε [1 kHz, 20° C.]: | −3.8 |
| CC-3-O3 | 4.0% | γ₁ [mPa s, 20° C.]: | 229 |
| CC-3-5 | 11.5% | K₁ [pN, 20° C.]: | 28.3 |
| CCP-3-1 | 12.0% | K₃ [pN, 20° C.]: | 28.0 |
| CCY-3-O2 | 10.0% | V₀ [V, 20° C.]: | 2.86 |
| CCY-5-O2 | 1.5% | | |
| CLOY-3-O2 | 12.5% | | |
| CLY-3-O2 | 9.0% | | |
| CLY-3-O3 | 4.0% | | |
| CLY-4-O2 | 4.0% | | |
| CLY-5-O2 | 4.5% | | |
| Σ | 100.0% | | |

Mixture H17

| | | | |
|---|---|---|---|
| B(S)-2O-O4 | 2.0% | cl. p. [° C.]: | 120.3 |
| CC-3-O3 | 5.0% | Δn [589 nm, 20° C.]: | 0.0906 |
| CC-3-V | 4.0% | ε$_{\parallel}$ [1 kHz, 20° C.]: | 3.1 |
| CC-3-V1 | 8.0% | ε$_{\perp}$ [1 kHz, 20° C.]: | 6.8 |
| CC-4-V1 | 12.5% | Δε [1 kHz, 20° C.]: | −3.7 |
| CC-3-5 | 12.0% | γ₁ [mPa s, 20° C.]: | 247 |
| CCP-3-1 | 2.0% | K₁ [pN, 20° C.]: | 25.9 |
| CCY-3-O1 | 2.5% | K₃ [pN, 20° C.]: | 26.2 |
| CCY-3-O2 | 9.0% | V₀ [V, 20° C.]: | 2.79 |
| CCY-5-O2 | 3.0% | | |
| CLOY-3-O2 | 15.0% | | |
| CLY-3-O2 | 9.0% | | |
| CLY-5-O2 | 5.0% | | |
| CLY-3-O3 | 4.5% | | |
| CLY-4-O2 | 4.0% | | |
| CCZPC-3-5 | 2.5% | | |
| Σ | 100.0% | | |

Mixture H18

| | | | |
|---|---|---|---|
| B(S)-2O-O4 | 4.0% | cl. p. [° C.]: | 75.5 |
| B(S)-2O-O5 | 5.0% | Δn [589 nm, 20° C.]: | 0.0960 |
| CC-3-V | 3.5% | $\varepsilon_{\parallel}$ [1 kHz, 20° C.]: | 4.6 |
| CC-3-V1 | 9.5% | $\varepsilon_{\perp}$ [1 kHz, 20° C.]: | 11.5 |
| CC-3-4 | 12.0% | Δε [1 kHz, 20° C.]: | −7.0 |
| CC-3-5 | 5.5% | $\gamma_1$ [mPa s, 20° C.]: | 141 |
| CCY-3-O2 | 11.0% | $K_1$ [pN, 20° C.]: | 16.7 |
| CCY-4-O2 | 10.5% | $K_3$ [pN, 20° C.]: | 14.9 |
| CLOY-3-O2 | 6.5% | $V_0$ [V, 20° C.]: | 1.53 |
| CLY-3-O2 | 10.0% | | |
| COB(S)-2-O4 | 6.5% | | |
| Y-4O-O4 | 16.0% | | |
| Σ | 100.0% | | |

Mixture H19

| | | | |
|---|---|---|---|
| B(S)-2O-O4 | 4.0% | cl. p. [° C.]: | 110.4 |
| B(S)-2O-O5 | 4.0% | Δn [589 nm, 20° C.]: | 0.1023 |
| B(S)-2O-O6 | 3.0% | $\varepsilon_{\parallel}$ [1 kHz, 20° C.]: | 3.2 |
| CC-3-V | 12.0% | $\varepsilon_{\perp}$ [1 kHz, 20° C.]: | 6.7 |
| CC-3-V1 | 8.0% | Δε [1 kHz, 20° C.]: | −3.6 |
| CC-4-V1 | 11.0% | $\gamma_1$ [mPa s, 20° C.]: | 164 |
| CC-3-5 | 12.0% | $K_1$ [pN, 20° C.]: | 24.4 |
| CCP-3-1 | 9.0% | $K_3$ [pN, 20° C.]: | 23.2 |
| CCY-3-O2 | 9.0% | $V_0$ [V, 20° C.]: | 2.71 |
| CLOY-3-O2 | 8.5% | | |
| CLP-V-1 | 5.0% | | |
| CLY-3-O2 | 9.0% | | |
| COB(S)-2-O4 | 5.5% | | |
| Σ | 100.0% | | |

Mixture H20

| | | | |
|---|---|---|---|
| B(S)-2O-O4 | 4.0% | cl. p. [° C.]: | 73.3 |
| B(S)-2O-O5 | 4.0% | Δn [589 nm, 20° C.]: | 0.1077 |
| B(S)-2O-O6 | 4.0% | $\varepsilon_{\parallel}$ [1 kHz, 20° C.]: | 4.3 |
| B-2O-O5 | 4.0% | $\varepsilon_{\perp}$ [1 kHz, 20° C.]: | 11.3 |
| CC-3-V | 33.5% | Δε [1 kHz, 20° C.]: | −7.0 |
| CCY-3-O2 | 9.0% | $\gamma_1$ [mPa s, 20° C.]: | 131 |
| CLOY-3-O2 | 5.0% | $K_1$ [pN, 20° C.]: | 14.5 |
| CLY-3-O2 | 7.0% | $K_3$ [pN, 20° C.]: | 14.5 |
| CLY-4-O2 | 1.5% | $V_0$ [V, 20° C.]: | 1.52 |
| COB(S)-2-O4 | 10.0% | | |
| CY-3-O2 | 15.0% | | |
| LY-3-O2 | 3.0% | | |
| Σ | 100.0% | | |

Mixture H21

| | | | |
|---|---|---|---|
| B(S)-2O-O4 | 4.0% | cl. p. [° C.]: | 109.9 |
| B(S)-2O-O5 | 3.0% | Δn [589 nm, 20° C.]: | 0.1031 |
| B(S)-2O-O6 | 4.0% | $\varepsilon_{\parallel}$ [1 kHz, 20° C.]: | 3.3 |
| CC-3-V | 6.0% | $\varepsilon_{\perp}$ [1 kHz, 20° C.]: | 7.8 |
| CC-3-V1 | 12.0% | Δε [1 kHz, 20° C.]: | −4.6 |
| CC-4-V1 | 15.0% | $\gamma_1$ [mPa s, 20° C.]: | 186 |
| CC-3-5 | 12.0% | $K_1$ [pN, 20° C.]: | 25.4 |
| CCP-3-1 | 2.0% | $K_3$ [pN, 20° C.]: | 24.5 |
| CCY-3-O2 | 8.0% | $V_0$ [V, 20° C.]: | 2.43 |
| CLOY-3-O2 | 10.0% | | |
| CLY-3-O2 | 7.0% | | |
| CLY-3-O3 | 6.0% | | |
| CLY-4-O2 | 5.0% | | |
| COB(S)-2-O4 | 6.0% | | |
| Σ | 100.0% | | |

Mixture H22

| | | | |
|---|---|---|---|
| B(S)-2O-O4 | 4.0% | cl. p. [° C.]: | 112.9 |
| B(S)-2O-O5 | 4.0% | Δn [589 nm, 20° C.]: | 0.1028 |
| B(S)-2O-O6 | 3.0% | $\varepsilon_{\parallel}$ [1 kHz, 20° C.]: | 3.2 |
| CC-3-V | 14.0% | $\varepsilon_{\perp}$ [1 kHz, 20° C.]: | 6.8 |
| CC-3-V1 | 11.0% | Δε [1 kHz, 20° C.]: | −3.6 |
| CC-4-V1 | 7.0% | $\gamma_1$ [mPa s, 20° C.]: | 165 |
| CC-3-5 | 10.0% | $K_1$ [pN, 20° C.]: | 24.2 |
| CCP-3-1 | 12.0% | $K_3$ [pN, 20° C.]: | 23.3 |
| CCP-V2-1 | 3.0% | $V_0$ [V, 20° C.]: | 2.68 |
| CCY-3-O2 | 9.0% | | |
| CLOY-3-O2 | 5.5% | | |
| CLY-3-O2 | 9.0% | | |
| CLY-4-O2 | 1.0% | | |
| COB(S)-2-O4 | 7.5% | | |
| Σ | 100.0% | | |

Mixture H23

| | | | |
|---|---|---|---|
| B(S)-2O-O4 | 4.0% | cl. p. [° C.]: | 111.8 |
| B(S)-2O-O5 | 2.5% | Δn [589 nm, 20° C.]: | 0.1030 |
| B(S)-2O-O6 | 4.0% | $\varepsilon_{\parallel}$ [1 kHz, 20° C.]: | 3.2 |
| CC-3-V | 8.0% | $\varepsilon_{\perp}$ [1 kHz, 20° C.]: | 7.0 |
| CC-3-V1 | 10.0% | Δε [1 kHz, 20° C.]: | −3.8 |
| CC-4-V1 | 14.5% | $\gamma_1$ [mPa s, 20° C.]: | 169 |
| CC-3-4 | 3.0% | $K_1$ [pN, 20° C.]: | 25.6 |
| CC-3-5 | 10.0% | $K_3$ [pN, 20° C.]: | 24.2 |
| CCP-3-1 | 7.5% | $V_0$ [V, 20° C.]: | 2.65 |
| CCP-3-3 | 1.0% | | |
| CCP-V2-1 | 1.0% | | |
| CCY-3-O2 | 7.0% | | |
| CLOY-3-O2 | 6.0% | | |
| CLY-3-O2 | 7.0% | | |
| CLY-5-O2 | 5.0% | | |
| COB(S)-2-O4 | 9.5% | | |
| Σ | 100.0% | | |

Mixture H24

| | | | |
|---|---|---|---|
| B(S)-2O-O4 | 4.0% | $\varepsilon_{\parallel}$ [1 kHz, 20° C.]: | 3.1 |
| B(S)-2O-O5 | 2.5% | $\varepsilon_{\perp}$ [1 kHz, 20° C.]: | 6.3 |
| CC-3-V | 5.5% | Δε [1 kHz, 20° C.]: | −3.3 |
| CC-3-V1 | 8.0% | $\gamma_1$ [mPa s, 20° C.]: | 203 |
| CC-4-V1 | 12.0% | $K_1$ [pN, 20° C.]: | 28.2 |
| CC-3-4 | 2.0% | $K_3$ [pN, 20° C.]: | 27.7 |
| CC-3-5 | 12.0% | $V_0$ [V, 20° C.]: | 3.04 |
| CCP-3-1 | 10.0% | | |
| CCVC-3-V | 3.0% | | |
| CCY-3-O2 | 8.0% | | |
| CCY-5-O2 | 4.5% | | |
| CLOY-3-O2 | 9.5% | | |
| CLY-3-O2 | 9.0% | | |
| CLY-4-O2 | 5.0% | | |
| CLY-5-O2 | 5.0% | | |
| Σ | 100.0% | | |

Mixture H25

| | | | |
|---|---|---|---|
| B(S)-2O-O4 | 4.0% | cl. p. [° C.]: | 115.7 |
| B(S)-2O-O5 | 3.0% | Δn [589 nm, 20° C.]: | 0.0959 |
| B(S)-2O-O6 | 1.5% | $\varepsilon_{\parallel}$ [1 kHz, 20° C.]: | 3.2 |
| CC-3-V | 10.5% | $\varepsilon_{\perp}$ [1 kHz, 20° C.]: | 6.7 |
| CC-3-V1 | 8.5% | Δε [1 kHz, 20° C.]: | −3.6 |
| CC-4-V1 | 7.0% | $\gamma_1$ [mPa s, 20° C.]: | 210 |
| CC-3-5 | 12.5% | $K_1$ [pN, 20° C.]: | 25.2 |
| CCOC-3-3 | 3.0% | $K_3$ [pN, 20° C.]: | 25.7 |
| CCP-3-1 | 10.5% | $V_0$ [V, 20° C.]: | 2.81 |
| CCY-3-O2 | 8.0% | LTS bulk [h, −20° C.]: | 192 |
| CCY-5-O2 | 5.0% | | |

-continued

| | | | |
|---|---|---|---|
| CLOY-3-O2 | 12.5% | | |
| CLY-3-O2 | 9.0% | | |
| CLY-5-O2 | 5.0% | | |
| Σ | 100.0% | | |

Mixture H26

| | | | |
|---|---|---|---|
| B(S)-2O-O4 | 4.0% | cl. p. [° C.]: | 112.3 |
| B(S)-2O-O5 | 3.0% | Δn [589 nm, 20° C.]: | 0.1025 |
| B(S)-2O-O6 | 4.0% | $\varepsilon_{\parallel}$ [1 kHz, 20° C.]: | 3.2 |
| CC-3-V | 7.5% | $\varepsilon_{\perp}$ [1 kHz, 20° C.]: | 7.1 |
| CC-3-V1 | 10.0% | Δε [1 kHz, 20° C.]: | −3.9 |
| CC-4-V1 | 14.0% | $\gamma_1$ [mPa s, 20° C.]: | 178 |
| CC-3-4 | 3.0% | $K_1$ [pN, 20° C.]: | 25.2 |
| CC-3-5 | 9.5% | $K_3$ [pN, 20° C.]: | 24.0 |
| CCP-3-1 | 6.5% | $V_0$ [V, 20° C.]: | 2.61 |
| CCP-V2-1 | 2.5% | | |
| CCY-3-O2 | 8.0% | | |
| CLOY-3-O2 | 7.5% | | |
| CLY-3-O2 | 8.0% | | |
| CLY-5-O2 | 6.0% | | |
| COB(S)-2-O4 | 6.5% | | |
| Σ | 100.0% | | |

Mixture H27

| | | | |
|---|---|---|---|
| B(S)-2O-O4 | 4.5% | cl. p. [° C.]: | 116.9 |
| B(S)-2O-O5 | 4.5% | Δn [589 nm, 20° C.]: | 0.1038 |
| B(S)-2O-O6 | 2.0% | $\varepsilon_{\parallel}$ [1 kHz, 20° C.]: | 3.3 |
| CC-3-V | 1.0% | $\varepsilon_{\perp}$ [1 kHz, 20° C.]: | 7.9 |
| CC-3-V1 | 10.5% | Δε [1 kHz, 20° C.]: | −4.6 |
| CC-4-V1 | 15.0% | $\gamma_1$ [mPa s, 20° C.]: | 239 |
| CC-3-5 | 12.0% | $K_1$ [pN, 20° C.]: | 26.7 |
| CCP-3-1 | 5.5% | $K_3$ [pN, 20° C.]: | 27.2 |
| CCY-3-O2 | 10.5% | $V_0$ [V, 20° C.]: | 2.56 |
| CCY-5-O2 | 6.0% | | |
| CLOY-3-O2 | 13.0% | | |
| CLY-3-O2 | 9.0% | | |
| CLY-5-O2 | 5.0% | | |
| PGIY-2-O4 | 1.5% | | |
| Σ | 100.0% | | |

Mixture H28

| | | | |
|---|---|---|---|
| B(S)-2O-O4 | 3.0% | Cl. p. [° C.]: | 102.8 |
| B(S)-2O-O5 | 4.0% | Δn [589 nm, 20° C.]: | 0.1047 |
| B(S)-2O-O6 | 3.0% | $\varepsilon_{\parallel}$ [1 kHz, 20° C.]: | 3.6 |
| CC-3-V | 26.5% | $\varepsilon_{\perp}$ [1 kHz, 20° C.]: | 7.7 |
| CC-3-V1 | 10.0% | Δε [1 kHz, 20° C.]: | −4.1 |
| CC-3-5 | 5.0% | $\gamma_1$ [mPa s, 20° C.]: | 162 |
| CCG-V-F | 3.0% | $K_1$ [pN, 20° C.]: | 19.5 |
| CCY-3-O2 | 7.0% | $K_3$ [pN, 20° C.]: | 22.4 |
| CLOY-3-O2 | 11.0% | $V_0$ [V, 20° C.]: | 2.45 |
| CLY-3-O2 | 7.0% | | |
| CLY-4-O2 | 5.0% | | |
| CLY-5-O2 | 4.5% | | |
| CPY-3-O2 | 11.0% | | |
| Σ | 100.0% | | |

Mixture H29

| | | | |
|---|---|---|---|
| B(S)-2O-O4 | 3.0% | Cl. p. [° C.]: | 105.1 |
| B(S)-2O-O5 | 4.0% | Δn [589 nm, 20° C.]: | 0.1014 |
| B(S)-2O-O6 | 3.0% | $\varepsilon_{\parallel}$ [1 kHz, 20° C.]: | 3.6 |
| CC-3-V | 18.5% | $\varepsilon_{\perp}$ [1 kHz, 20° C.]: | 7.8 |
| CC-3-V1 | 10.0% | Δε [1 kHz, 20° C.]: | −4.2 |
| CC-4-V1 | 8.0% | $\gamma_1$ [mPa s, 20° C.]: | 180 |
| CCG-V-F | 3.0% | $K_1$ [pN, 20° C.]: | 20.6 |
| CC-3-5 | 5.0% | $K_3$ [pN, 20° C.]: | 22.9 |
| CCY-3-O2 | 9.0% | $V_0$ [V, 20° C.]: | 2.44 |
| CLOY-3-O2 | 13.5% | | |
| CLY-3-O2 | 8.0% | | |
| CLY-4-O2 | 5.0% | | |
| CLY-5-O2 | 5.0% | | |
| CPY-3-O2 | 5.0% | | |
| Σ | 100.0% | | |

Mixture H30

| | | | |
|---|---|---|---|
| B(S)-2O-O4 | 4.0% | Cl. p. [° C.]: | 114.1 |
| B(S)-2O-O5 | 1.0% | Δn [589 nm, 20° C.]: | 0.1028 |
| B(S)-2O-O6 | 4.0% | $\varepsilon_{\parallel}$ [1 kHz, 20° C.]: | 3.1 |
| CC-3-V1 | 10.0% | $\varepsilon_{\perp}$ [1 kHz, 20° C.]: | 6.1 |
| CC-4-V1 | 11.5% | Δε [1 kHz, 20° C.]: | −3.0 |
| CC-3-5 | 10.0% | $\gamma_1$ [mPa s, 20° C.]: | 179 |
| CCP-3-1 | 7.5% | $K_1$ [pN, 20° C.]: | 24.0 |
| CCP-3-3 | 4.5% | $K_3$ [pN, 20° C.]: | 24.8 |
| CCP-V2-1 | 7.0% | $V_0$ [V, 20° C.]: | 3.04 |
| CCY-3-O1 | 1.5% | | |
| CCY-3-O2 | 7.0% | | |
| CCY-5-O2 | 2.5% | | |
| CLOY-3-O2 | 4.0% | | |
| CLY-3-O2 | 6.0% | | |
| CLY-4-O2 | 1.5% | | |
| CLY-5-O2 | 4.0% | | |
| CPY-3-O2 | 3.0% | | |
| CY-3-O2 | 3.0% | | |
| CP-3-O2 | 8.0% | | |
| Σ | 100.0% | | |

Mixture H31

| | | | |
|---|---|---|---|
| B(S)-2O-O4 | 4.0% | Cl. p. [° C.]: | 118.8 |
| B(S)-2O-O5 | 1.0% | Δn [589 nm, 20° C.]: | 0.1028 |
| B(S)-2O-O6 | 4.0% | $\varepsilon_{\parallel}$ [1 kHz, 20° C.]: | 3.1 |
| CC-3-V1 | 10.0% | $\varepsilon_{\perp}$ [1 kHz, 20° C.]: | 5.9 |
| CC-4-V1 | 8.0% | Δε [1 kHz, 20° C.]: | −2.9 |
| CC-3-5 | 10.0% | $\gamma_1$ [mPa s, 20° C.]: | 198 |
| CCP-3-1 | 8.0% | $K_1$ [pN, 20° C.]: | 25.5 |
| CCP-3-3 | 6.0% | $K_3$ [pN, 20° C.]: | 26.8 |
| CCP-V2-1 | 11.5% | $V_0$ [V, 20° C.]: | 3.22 |
| CCY-3-O2 | 8.5% | | |
| CLOY-3-O2 | 9.0% | | |
| CLY-3-O2 | 7.0% | | |
| CLY-5-O2 | 5.0% | | |
| CP-3-O2 | 8.0% | | |
| Σ | 100.0% | | |

Mixture H32

| | | | |
|---|---|---|---|
| CC-3-O1 | 18.5% | cl. p. [° C.]: | 94.1 |
| CCOC-3-3 | 4.0% | Δn [589 nm, 20° C.]: | 0.0803 |
| CCPC-33 | 3.5% | $\varepsilon_{\parallel}$ [1 kHz, 20° C.]: | 4.1 |
| CCY-3-O1 | 8.0% | $\varepsilon_{\perp}$ [1 kHz, 20° C.]: | 9.8 |
| CCY-3-O3 | 4.0% | Δε [1 kHz, 20° C.]: | −5.7 |
| CCY-4-O2 | 8.0% | $\gamma_1$ [mPa s, 20° C.]: | 294 |
| CCY-5-O2 | 6.0% | $K_1$ [pN, 20° C.]: | 16.2 |

| | | | |
|---|---|---|---|
| CCZC-3-3 | 2.5% | K₃ [pN, 20° C.]: | 18.6 |
| CCZC-4-3 | 4.0% | V₀ [V, 20° C.]: | 1.91 |
| CCZC-4-5 | 4.0% | | |
| CLOY-3-O2 | 24.0% | | |
| CY-3-O2 | 7.5% | | |
| Y-4O-O4 | 6.0% | | |
| Σ | 100.0% | | |

Mixture H33

| | | | |
|---|---|---|---|
| B(S)-2O-O4 | 4.0% | Cl. p. [° C.]: | 100.3 |
| B(S)-2O-O5 | 3.0% | Δn [589 nm, 20° C.]: | 0.1027 |
| B(S)-2O-O6 | 3.0% | ε∥ [1 kHz, 20° C.]: | 3.7 |
| CC-3-V | 24.0% | ε⊥ [1 kHz, 20° C.]: | 8.8 |
| CC-3-V1 | 10.0% | Δε [1 kHz, 20° C.]: | −5.2 |
| CC-3-5 | 5.0% | γ₁ [mPa s, 20° C.]: | 159 |
| CCY-3-O1 | 6.0% | K₁ [pN, 20° C.]: | 20.5 |
| CCY-3-O2 | 7.0% | K₃ [pN, 20° C.]: | 19.3 |
| CCY-5-O2 | 1.5% | V₀ [V, 20° C.]: | 2.03 |
| CLOY-3-O2 | 4.0% | | |
| CLY-3-O2 | 7.0% | | |
| CLY-3-O3 | 6.0% | | |
| CLY-4-O2 | 5.0% | | |
| CLY-5-O2 | 5.0% | | |
| COB(S)-2-O4 | 5.0% | | |
| CPY-3-O2 | 0.5% | | |
| Y-4O-O4 | 4.0% | | |
| Σ | 100.0% | | |

Mixture H34

| | | | |
|---|---|---|---|
| CC-3-V1 | 12.0% | cl. p. [° C.]: | 127.1 |
| CC-3-5 | 12.5% | Δn [589 nm, 20° C.]: | 0.0873 |
| CCOC-3-3 | 4.0% | ε∥ [1 kHz, 20° C.]: | 2.9 |
| CCOC-4-3 | 2.0% | ε⊥ [1 kHz, 20° C.]: | 5.5 |
| CCP-3-1 | 16.0% | Δε [1 kHz, 20° C.]: | −2.5 |
| CCY-3-O2 | 10.0% | γ₁ [mPa s, 20° C.]: | 281 |
| CCY-5-O2 | 5.0% | K₁ [pN, 20° C.]: | 26.7 |
| CCZC-3-3 | 4.0% | K₃ [pN, 20° C.]: | 28.7 |
| CCZC-3-5 | 4.0% | V₀ [V, 20° C.]: | 3.56 |
| CLOY-3-O2 | 21.5% | | |
| CLP-V-1 | 5.0% | | |
| CP-3-O2 | 4.0% | | |
| Σ | 100.0% | | |

Mixture H35

| | | | |
|---|---|---|---|
| CC-3-V1 | 12.0% | cl. p. [° C.]: | 131.3 |
| CC-3-5 | 12.5% | | |
| CCOC-3-3 | 4.0% | | |
| CCZC-3-3 | 4.0% | | |
| CCP-3-1 | 16.0% | | |
| CCZPC-3-5 | 3.5% | | |
| CCY-3-O2 | 10.0% | | |
| CCY-5-O2 | 5.0% | | |
| CLOY-3-O2 | 26.0% | | |
| CLY-3-O2 | 5.0% | | |
| CP-3-O2 | 2.0% | | |
| Σ | 100.0% | | |

Mixture H36

| | | | |
|---|---|---|---|
| B(S)-2O-O5 | 5.0% | cl. p. [° C.]: | 114 |
| CC-3-V | 5.7% | Δn [589 nm, 20° C.]: | 0.0952 |
| CC-3-V1 | 12.0% | ε∥ [1 kHz, 20° C.]: | 3.3 |
| CC-3-O3 | 5.0% | ε⊥ [1 kHz, 20° C.]: | 7.0 |
| CC-3-5 | 12.0% | Δε [1 kHz, 20° C.]: | −3.7 |
| CCP-3-1 | 15.0% | γ₁ [mPa s, 20° C.]: | 213 |
| CCY-3-O2 | 9.0% | K₁ [pN, 20° C.]: | 25.6 |
| CCY-5-O2 | 4.1% | K₃ [pN, 20° C.]: | 26.2 |
| CLOY-3-O2 | 14.0% | V₀ [V, 20° C.]: | 2.80 |
| CLY-3-O2 | 10.0% | | |
| CLY-4-O2 | 5.0% | | |
| LY-3-O2 | 2.0% | | |
| Y-4O-O4 | 1.2% | | |
| Σ | 100.0% | | |

Mixture H37

| | | | |
|---|---|---|---|
| CC-3-2V1 | 4.0% | cl. p. [° C.]: | 115 |
| CC-3-V | 24.0% | Δn [589 nm, 20° C.]: | 0.0917 |
| CC-3-V1 | 8.0% | ε∥ [1 kHz, 20° C.]: | 5.7 |
| CCP-V-1 | 15.0% | ε⊥ [1 kHz, 20° C.]: | 3.1 |
| CCP-V2-1 | 8.0% | Δε [1 kHz, 20° C.]: | 2.6 |
| CCZPC-3-5 | 3.0% | γ₁ [mPa s, 20° C.]: | 121 |
| CCQU-3-F | 3.0% | K₁ [pN, 20° C.]: | 17.4 |
| CCVC-3-V | 6.0% | K₃ [pN, 20° C.]: | 21.8 |
| CCY-3-1 | 3.0% | V₀ [V, 20° C.]: | 2.76 |
| CDUQU-3-F | 5.0% | | |
| CLOY-3-O2 | 2.5% | | |
| CLP-V-1 | 6.0% | | |
| CY-3-O2 | 1.0% | | |
| DGUQU-4-F | 4.0% | | |
| CP-3-O2 | 5.0% | | |
| PGP-1-2V | 2.5% | | |
| Σ | 100.0% | | |

Mixture H38

| | | | |
|---|---|---|---|
| B(S)-2O-O4 | 3.0% | cl. p. [° C.]: | 101.8 |
| B(S)-2O-O5 | 3.0% | Δn [589 nm, 20° C.]: | 0.0952 |
| B(S)-2O-O6 | 3.0% | ε∥ [1 kHz, 20° C.]: | 3.5 |
| CC-3-V | 13.0% | ε⊥ [1 kHz, 20° C.]: | 8.6 |
| CC-3-V1 | 8.0% | Δε [1 kHz, 20° C.]: | −5.1 |
| CC-3-O3 | 5.0% | K₁ [pN, 20° C.]: | 22.3 |
| CC-3-5 | 12.0% | K₃ [pN, 20° C.]: | 22.6 |
| CCP-3-1 | 1.0% | V₀ [V, 20° C.]: | 2.23 |
| CCY-3-O1 | 1.2% | | |
| CCY-3-O2 | 11.0% | | |
| CCY-3-O3 | 1.0% | | |
| CCY-5-O2 | 6.8% | | |
| CCZC-3-5 | 0.8% | | |
| CLOY-3-O2 | 15.0% | | |
| CLY-3-O2 | 8.2% | | |
| CLY-4-O2 | 2.0% | | |
| CLY-5-O2 | 3.0% | | |
| Y-4O-O4 | 3.0% | | |
| Σ | 100.0% | | |

The medium H38 contains 400 ppm of the compound ST-3b-1.

Mixture H39

| | | | |
|---|---|---|---|
| B(S)-2O-O4 | 1.5% | cl. p. [° C.]: | 109.6 |
| B(S)-2O-O5 | 2.5% | Δn [589 nm, 20° C.]: | 0.0985 |
| B(S)-2O-O6 | 3.0% | ε∥ [1 kHz, 20° C.]: | 3.5 |
| CC-3-V1 | 8.0% | ε⊥ [1 kHz, 20° C.]: | 8.4 |
| CC-4-V1 | 12.0% | Δε [1 kHz, 20° C.]: | −4.9 |
| CC-3-5 | 12.0% | K₁ [pN, 20° C.]: | 24.1 |
| CCP-V2-1 | 7.5% | K₃ [pN, 20° C.]: | 24.4 |
| CCPC-33 | 2.5% | V₀ [V, 20° C.]: | 2.36 |
| CCY-3-O2 | 10.0% | | |
| CCY-5-O2 | 5.0% | | |
| CLOY-3-O2 | 15.5% | | |
| CLY-3-O2 | 9.0% | | |

| | |
|---|---|
| CLY-3-O3 | 0.5% |
| CLY-5-O2 | 5.0% |
| Y-4O-O4 | 6.0% |
| Σ | 100.0% |

Mixture H40

| | | | |
|---|---|---|---|
| CC-3-V1 | 11.0% | Δn [589 nm, 20° C.]: | 0.0793 |
| CC-3-5 | 14.0% | ε∥ [1 kHz, 20° C.]: | 3.2 |
| CCOC-3-3 | 5.0% | ε⊥ [1 kHz, 20° C.]: | 7.2 |
| CCOC-4-3 | 3.0% | Δε [1 kHz, 20° C.]: | −4.0 |
| CCP-3-1 | 6.0% | K₁ [pN, 20° C.]: | 24.1 |
| CCY-3-O2 | 12.5% | K₃ [pN, 20° C.]: | 27.4 |
| CLOY-3-O2 | 15.5% | V₀ [V, 20° C.]: | 2.77 |
| CLY-3-O2 | 9.0% | | |
| CP-3-O2 | 2.0% | | |
| Y-4O-O4 | 3.0% | | |
| BCN-35 | 15.0% | | |
| CC-3-V | 4.0% | | |
| Σ | 100.0% | | |

Mixture H41

| | | | |
|---|---|---|---|
| CC-3-V | 20.0% | cl. p. [° C.]: | 83.9 |
| CCOC-4-3 | 4.0% | Δn [589 nm, 20° C.]: | 0.0781 |
| CCZPC-3-3 | 3.5% | ε∥ [1 kHz, 20° C.]: | 4.3 |
| CCY-3-O1 | 7.0% | ε⊥ [1 kHz, 20° C.]: | 9.3 |
| CCY-3-O3 | 4.0% | Δε [1 kHz, 20° C.]: | −5.1 |
| CCY-4-O2 | 8.0% | | |
| CCY-5-O2 | 7.0% | | |
| CCZC-3-3 | 2.5% | | |
| CCZC-4-3 | 2.0% | | |
| CCZC-4-5 | 3.0% | | |
| CLOY-3-O2 | 21.0% | | |
| Y-4O-O4 | 15.0% | | |
| Σ | 100.0% | | |

Mixture H42

| | | | |
|---|---|---|---|
| B(S)-2O-O4 | 4.0% | cl. p. [° C.]: | |
| B(S)-2O-O5 | 4.0% | Δn [589 nm, 20° C.]: | |
| B(S)-2O-O6 | 0.5% | ε∥ [1 kHz, 20° C.]: | |
| CC-3-V | 4.5% | ε⊥ [1 kHz, 20° C.]: | |
| CC-3-V1 | 12.0% | Δε [1 kHz, 20° C.]: | |
| CC-4-V1 | 10.0% | γ₁ [mPa s, 20° C.]: | |
| CCG-V-F | 2.0% | γ₁ [mPa s, 20° C.]: | |
| CC-3-5 | 12.0% | K₁ [pN, 20° C.]: | |
| CCP-3-1 | 11.0% | K₃ [pN, 20° C.]: | |
| CCY-3-O2 | 8.0% | V₀ [V, 20° C.]: | |
| CLOY-3-O2 | 12.5% | LTS bulk [h, −20° C.]: | |
| CLY-3-O2 | 10.0% | LTS bulk [h, −30° C.]: | |
| CLY-4-O2 | 5.0% | LTS bulk [h, −10° C.]: | |
| CLY-5-O2 | 4.5% | | |
| Σ | 100.0% | | |

Mixture H43

| | | | |
|---|---|---|---|
| B(S)-2O-O4 | 5.0% | cl. p. [° C.]: | 104.5 |
| CC-3-V1 | 12.0% | Δn [589 nm, 20° C.]: | 0.0941 |
| CC-4-V1 | 10.0% | ε∥ [1 kHz, 20° C.]: | 3.5 |
| CC-3-5 | 10.0% | ε⊥ [1 kHz, 20° C.]: | 8.4 |
| CCP-3-1 | 4.0% | Δε [1 kHz, 20° C.]: | −4.9 |
| CCY-3-O2 | 11.0% | γ₁ [mPa s, 20° C.]: | 224 |
| CCY-5-O2 | 8.0% | K₁ [pN, 20° C.]: | 22.5 |
| CCZC-3-3 | 4.0% | K₃ [pN, 20° C.]: | 24.3 |
| CLOY-3-O2 | 16.5% | V₀ [V, 20° C.]: | 2.35 |
| CLY-3-O2 | 10.0% | | |
| CY-3-O2 | 4.0% | | |
| CP-3-O2 | 1.0% | | |
| Y-4O-O4 | 4.5% | | |
| Σ | 100.0% | | |

Mixture H44

| | | | |
|---|---|---|---|
| B(S)-2O-O4 | 3.0% | Δn [589 nm, 20° C.]: | 0.0890 |
| B(S)-2O-O5 | 4.0% | ε∥ [1 kHz, 20° C.]: | 3.5 |
| B(S)-2O-O6 | 4.0% | ε⊥ [1 kHz, 20° C.]: | 7.1 |
| B-2O-O5 | 1.0% | Δε [1 kHz, 20° C.]: | −3.6 |
| CC-3-V | 25.0% | K₁ [pN, 20° C.]: | 17.6 |
| CC-3-V1 | 8.0% | K₃ [pN, 20° C.]: | 16.7 |
| CC-4-V1 | 8.0% | V₀ [V, 20° C.]: | 2.27 |
| CC-3-5 | 12.0% | | |
| CCY-3-O2 | 10.0% | | |
| CLOY-3-O2 | 4.5% | | |
| CLY-3-O2 | 10.0% | | |
| CLY-3-O3 | 5.0% | | |
| Y-4O-O4 | 5.5% | | |
| Σ | 100.0% | | |

Mixture H45

| | | | |
|---|---|---|---|
| CC-3-O1 | 15.0% | Δn [589 nm, 20° C.]: | 0.0784 |
| CCOC-4-3 | 4.0% | ε∥ [1 kHz, 20° C.]: | 4.4 |
| CCY-3-O1 | 7.0% | ε⊥ [1 kHz, 20° C.]: | 10.3 |
| CCY-3-O2 | 2.0% | Δε [1 kHz, 20° C.]: | −5.9 |
| CCY-3-O3 | 7.0% | K₁ [pN, 20° C.]: | 14.1 |
| CCY-4-O2 | 8.0% | K₃ [pN, 20° C.]: | 14.9 |
| CCY-5-O2 | 8.0% | V₀ [V, 20° C.]: | 1.68 |
| CCZC-3-3 | 2.5% | LTS bulk [h, −20° C.]: | 1000 |
| CCZC-3-5 | 2.0% | | |
| CCZC-4-3 | 3.0% | | |
| CCZC-4-5 | 3.0% | | |
| CLOY-3-O2 | 15.0% | | |
| CY-5-O2 | 14.5% | | |
| Y-4O-O4 | 9.0% | | |
| Σ | 100.0% | | |

Mixture H46

| | | | |
|---|---|---|---|
| CC-3-O1 | 17.5% | Δn [589 nm, 20° C.]: | 0.0770 |
| CCOC-4-3 | 4.0% | ε∥ [1 kHz, 20° C.]: | 4.3 |
| CCPC-33 | 3.5% | ε⊥ [1 kHz, 20° C.]: | 9.7 |
| CCY-3-O1 | 7.0% | Δε [1 kHz, 20° C.]: | −5.4 |
| CCY-3-O3 | 4.0% | K₁ [pN, 20° C.]: | 14.1 |
| CCY-4-O2 | 8.0% | K₃ [pN, 20° C.]: | 15.1 |
| CCY-5-O2 | 7.0% | V₀ [V, 20° C.]: | 1.77 |
| CCZC-3-3 | 2.5% | LTS bulk [h, −20° C.]: | 1000 |
| CCZC-3-5 | 2.0% | | |
| CCZC-4-3 | 3.0% | | |
| CCZC-4-5 | 3.0% | | |
| CLOY-3-O2 | 15.0% | | |
| CY-5-O2 | 14.5% | | |
| Y-4O-O4 | 9.0% | | |
| Σ | 100.0% | | |

Mixture H47

| | | | |
|---|---|---|---|
| B(S)-2O-O6 | 3.5% | cl. p. [° C.]: | 124.9 |
| B(S)-2O-O5 | 3.0% | Δn [589 nm, 20° C.]: | 0.1001 |
| CC-3-V | 15.0% | ε∥ [1 kHz, 20° C.]: | 3.2 |
| CC-3-V1 | 8.0% | ε⊥ [1 kHz, 20° C.]: | 6.9 |

| | | | |
|---|---|---|---|
| CC-4-V1 | 4.0% | Δε [1 kHz, 20° C.]: | −3.7 |
| CC-3-4 | 3.5% | γ₁ [mPa s, 20° C.]: | 199 |
| CC-3-5 | 5.0% | K₁ [pN, 20° C.]: | 26.0 |
| CCP-3-1 | 5.0% | K₃ [pN, 20° C.]: | 23.5 |
| CCP-V2-1 | 5.5% | V₀ [V, 20° C.]: | 2.67 |
| CCY-3-O1 | 5.5% | | |
| CCY-3-O2 | 7.0% | | |
| CCY-5-O2 | 6.0% | | |
| CLY-3-O2 | 7.0% | | |
| CLY-3-O3 | 6.0% | | |
| CLY-4-O2 | 5.0% | | |
| CLY-5-O2 | 5.0% | | |
| COB(S)-2-O4 | 3.5% | | |
| CCOC-3-3 | 1.0% | | |
| CLOY-3-O2 | 1.5% | | |
| Σ | 100.0% | | |

Mixture H48

| | | | |
|---|---|---|---|
| B(S)-2O-O5 | 4.0% | cl. p. [° C.]: | 84.2 |
| BCN-35 | 20.0% | Δn [589 nm, 20° C.]: | 0.0751 |
| CC-3-O1 | 20.0% | ε∥ [1 kHz, 20° C.]: | 4.8 |
| CCOC-4-3 | 4.0% | ε⊥ [1 kHz, 20° C.]: | 12.1 |
| CCY-3-O1 | 7.0% | Δε [1 kHz, 20° C.]: | −7.3 |
| CCY-3-O3 | 5.0% | K₁ [pN, 20° C.]: | 14.6 |
| CCY-4-O2 | 8.5% | K₃ [pN, 20° C.]: | 16.6 |
| CLOY-3-O2 | 20.0% | V₀ [V, 20° C.]: | 1.59 |
| Y-4O-O4 | 11.5% | | |
| Σ | 100.0% | | |

Mixture H49

| | | | |
|---|---|---|---|
| B(S)-2O-O4 | 1.0% | cl. p. [° C.]: | 116.3 |
| CC-3-V | 3.5% | Δn [589 nm, 20° C.]: | 0.0898 |
| CC-3-V1 | 12.0% | ε∥ [1 kHz, 20° C.]: | 3.1 |
| CC-4-V1 | 10.0% | ε⊥ [1 kHz, 20° C.]: | 6.3 |
| CC-3-5 | 12.5% | Δε [1 kHz, 20° C.]: | −3.2 |
| CCP-3-1 | 10.0% | γ₁ [mPa s, 20° C.]: | 242 |
| CCY-3-O2 | 10.0% | K₁ [pN, 20° C.]: | 26.0 |
| CLOY-3-O2 | 25.0% | K₃ [pN, 20° C.]: | 28.5 |
| CLY-3-O2 | 10.0% | V₀ [V, 20° C.]: | 3.14 |
| CCP-3-2V | 6.0% | | |
| Σ | 100.0% | | |

Mixture H50

| | | | |
|---|---|---|---|
| ACC-2-3 | 5.0% | cl. p. [° C.]: | 117.4 |
| B(S)-2O-O4 | 2.5% | Δn [589 nm, 20° C.]: | 0.0903 |
| CC-3-V | 3.5% | ε∥ [1 kHz, 20° C.]: | 3.1 |
| CC-3-V1 | 12.0% | ε⊥ [1 kHz, 20° C.]: | 6.6 |
| CC-4-V1 | 10.0% | Δε [1 kHz, 20° C.]: | −3.5 |
| CC-3-5 | 12.0% | γ₁ [mPa s, 20° C.]: | 239 |
| CCP-3-1 | 11.75% | K₁ [pN, 20° C.]: | 28.0 |
| CCY-3-O2 | 10.0% | K₃ [pN, 20° C.]: | 28.3 |
| CLOY-3-O2 | 23.25% | V₀ [V, 20° C.]: | 3.01 |
| CLY-3-O2 | 10.0% | | |
| Σ | 100.0% | | |

Mixture H51

| | | | |
|---|---|---|---|
| B(S)-2O-O4 | 2.5% | cl. p. [° C.]: | 116.7 |
| CC-3-V | 3.25% | Δn [589 nm, 20° C.]: | 0.0899 |
| CC-3-V1 | 12.0% | ε∥ [1 kHz, 20° C.]: | 3.3 |
| CC-4-V1 | 10.0% | ε⊥ [1 kHz, 20° C.]: | 6.6 |
| CC-3-5 | 12.5% | Δε [1 kHz, 20° C.]: | −3.3 |
| CCL-3-2 | 6.0% | γ₁ [mPa s, 20° C.]: | 232 |
| CCP-3-1 | 9.75% | | |
| CCY-3-O2 | 11.0% | | |
| CLOY-3-O2 | 23.0% | | |
| CLY-3-O2 | 10.0% | | |
| Σ | 100.0% | | |

Mixture H52

| | | | |
|---|---|---|---|
| B(S)-2O-O4 | 4.0% | cl. p. [° C.]: | 120.4 |
| B(S)-2O-O5 | 2.0% | Δn [589 nm, 20° C.]: | 0.0967 |
| B(S)-2O-O6 | 2.0% | ε∥ [1 kHz, 20° C.]: | 3.1 |
| CC-3-V | 4.0% | ε⊥ [1 kHz, 20° C.]: | 6.7 |
| CC-3-V1 | 11.0% | Δε [1 kHz, 20° C.]: | −3.6 |
| CC-4-V1 | 9.75% | γ₁ [mPa s, 20° C.]: | 224 |
| CC-3-5 | 11.0% | K₁ [pN, 20° C.]: | 27.8 |
| CCL-3-2 | 3.0% | K₃ [pN, 20° C.]: | 26.5 |
| CCP-3-1 | 4.0% | V₀ [V, 20° C.]: | 2.87 |
| CCP-V2-1 | 9.0% | | |
| CCY-3-O2 | 8.75% | | |
| CCZC-3-5 | 3.0% | | |
| CLOY-3-O2 | 15.0% | | |
| CLY-3-O2 | 9.0% | | |
| CLY-5-O2 | 4.5% | | |
| Σ | 100.0% | | |

Mixture H53

| | | | |
|---|---|---|---|
| B(S)-2O-O4 | 4.0% | cl. p. [° C.]: | 107 |
| CC-3-V | 11.5% | Δn [589 nm, 20° C.]: | 0.0841 |
| CC-3-V1 | 14.0% | ε∥ [1 kHz, 20° C.]: | 3.0 |
| CC-4-V1 | 12.0% | ε⊥ [1 kHz, 20° C.]: | 5.4 |
| CCC-3-V | 5.0% | Δε [1 kHz, 20° C.]: | −2.5 |
| CC-3-O3 | 8.0% | γ₁ [mPa s, 20° C.]: | 140 |
| CC-3-5 | 5.0% | K₁ [pN, 20° C.]: | 23.5 |
| CCP-3-1 | 6.75% | K₃ [pN, 20° C.]: | 24.1 |
| CCY-3-O2 | 10.0% | V₀ [V, 20° C.]: | 3.31 |
| CLOY-3-O2 | 13.75% | | |
| CLY-3-O2 | 9.0% | | |
| CP-3-O2 | 1.0% | | |
| Σ | 100.0% | | |

Mixture H54

| | | | |
|---|---|---|---|
| B(S)-2O-O4 | 3.75% | cl. p. [° C.]: | 121 |
| CC-3-V1 | 9.0% | Δn [589 nm, 20° C.]: | 0.0948 |
| CC-4-V1 | 9.0% | ε∥ [1 kHz, 20° C.]: | 3.1 |
| CC-V-V1 | 5.5% | ε⊥ [1 kHz, 20° C.]: | 6.5 |
| CC-3-O3 | 4.0% | Δε [1 kHz, 20° C.]: | −3.4 |
| CC-3-5 | 11.5% | γ₁ [mPa s, 20° C.]: | 218 |
| CCP-3-1 | 12.0% | K₁ [pN, 20° C.]: | 27.1 |
| CCY-3-O2 | 10.0% | K₃ [pN, 20° C.]: | 27.2 |
| CCY-5-O2 | 1.5% | V₀ [V, 20° C.]: | 2.98 |
| CLOY-3-O2 | 12.5% | | |
| CLY-3-O2 | 9.0% | | |
| CLY-3-O3 | 3.75% | | |
| CLY-4-O2 | 4.0% | | |
| CLY-5-O2 | 4.5% | | |
| Σ | 100.0% | | |

Mixture H55

| | | | |
|---|---|---|---|
| B(S)-2O-O4 | 2.5% | cl. p. [° C.]: | 119 |
| CC-1V-V1 | 5.0% | Δn [589 nm, 20° C.]: | 0.0939 |
| CC-3-V | 8.0% | ε∥ [1 kHz, 20° C.]: | 3.1 |
| CC-3-V1 | 8.75% | ε⊥ [1 kHz, 20° C.]: | 6.7 |
| CC-4-V1 | 1.75% | Δε [1 kHz, 20° C.]: | −3.6 |

161

-continued

| | | | |
|---|---|---|---|
| CC-3-O3 | 4.0% | γ₁ [mPa s, 20° C.]: | 227 |
| CC-3-5 | 11.5% | $K_1$ [pN, 20° C.]: | 26.2 |
| CCP-3-1 | 9.0% | $K_3$ [pN, 20° C.]: | 27.9 |
| CCY-3-O2 | 10.0% | $V_0$ [V, 20° C.]: | 2.95 |
| CCY-5-O2 | 1.5% | | |
| CLOY-3-O2 | 15.0% | | |
| CLY-3-O2 | 9.0% | | |
| CLY-3-O3 | 4.0% | | |
| CLY-4-O2 | 5.0% | | |
| CLY-5-O2 | 5.0% | | |
| Σ | 100.0% | | |

Mixture H56

| | | | |
|---|---|---|---|
| CC-3-O3 | 8.9% | Cl. p. [° C.]: | 103.7 |
| CC-2-3 | 8.7% | Δn [589 nm, 20° C.]: | 0.0816 |
| CCY-3-O2 | 9.0% | $\varepsilon_{\parallel}$ [1 kHz, 20° C.]: | 3.3 |
| CC-3-5 | 12.0% | $\varepsilon_{\perp}$ [1 kHz, 20° C.]: | 7.2 |
| CCY-5-O2 | 9.0% | Δε [1 kHz, 20° C.]: | −4.0 |
| CC-3-V | 1.2% | γ₁ [mPa s, 20° C.]: | 205 |
| CCY-3-O1 | 8.0% | $K_1$ [pN, 20° C.]: | 22.4 |
| CC-3-V1 | 8.0% | $K_3$ [pN, 20° C.]: | 23.1 |
| CLY-3-O2 | 9.0% | $V_0$ [V, 20° C.]: | 2.54 |
| CCY-3-O3 | 5.0% | | |
| CC-3-2V1 | 2.8% | | |
| Y-4O-O4 | 2.3% | | |
| CLOY-3-O2 | 15.1% | | |
| CY-1-O2 | 1.0% | | |
| Σ | 100.0% | | |

Mixture H57

| | | | |
|---|---|---|---|
| B(S)-2O-O5 | 3.0% | Cl. p. [° C.]: | 98.1 |
| CC-3-V1 | 10.0% | Δn [589 nm, 20° C.]: | 0.0839 |
| CC-4-V1 | 8.5% | $\varepsilon_{\parallel}$ [1 kHz, 20° C.]: | 3.4 |
| CC-3-O3 | 8.0% | $\varepsilon_{\perp}$ [1 kHz, 20° C.]: | 7.5 |
| CC-3-5 | 5.0% | Δε [1 kHz, 20° C.]: | −4.1 |
| CCY-3-O2 | 8.0% | γ₁ [mPa s, 20° C.]: | 186 |
| CCY-5-O2 | 3.0% | $K_1$ [pN, 20° C.]: | 22.9 |
| CCZC-3-3 | 3.5% | $K_3$ [pN, 20° C.]: | 23.6 |
| CLOY-3-O2 | 15.0% | $V_0$ [V, 20° C.]: | 2.54 |
| CLY-3-O2 | 9.0% | LTS bulk [h, −20° C.]: | 456 |
| CLY-5-O2 | 5.0% | | |
| CWC-3-3 | 15.0% | | |
| Y-4O-O4 | 7.0% | | |
| Σ | 100.0% | | |

Mixture H58

| | | | |
|---|---|---|---|
| CC-3-V1 | 10.0% | Cl. p. [° C.]: | 103.4 |
| CC-4-V1 | 16.0% | Δn [589 nm, 20° C.]: | 0.0841 |
| CC-3-O3 | 8.0% | $\varepsilon_{\parallel}$ [1 kHz, 20° C.]: | 3.4 |
| CC-3-5 | 6.0% | $\varepsilon_{\perp}$ [1 kHz, 20° C.]: | 7.4 |
| CCY-3-O2 | 8.0% | Δε [1 kHz, 20° C.]: | −4.0 |
| CCY-5-O2 | 3.0% | γ₁ [mPa s, 20° C.]: | 191 |
| CCZC-3-3 | 4.0% | $K_1$ [pN, 20° C.]: | 22.1 |
| CCZC-3-5 | 2.5% | $K_3$ [pN, 20° C.]: | 22.3 |
| CLOY-3-O2 | 15.0% | $V_0$ [V, 20° C.]: | 2.49 |
| CLY-3-O2 | 9.0% | | |
| CLY-4-O2 | 2.5% | | |
| CLY-5-O2 | 5.0% | | |
| CCY-V-O2 | 5.0% | | |
| Y-4O-O4 | 6.0% | | |
| Σ | 100.0% | | |

162

Mixture H59

| | | | |
|---|---|---|---|
| CC-3-V1 | 10.0% | Cl. p. [° C.]: | 103.1 |
| CC-4-V1 | 16.0% | Δn [589 nm, 20° C.]: | 0.0844 |
| CC-3-O3 | 8.0% | $\varepsilon_{\parallel}$ [1 kHz, 20° C.]: | 3.3 |
| CC-3-5 | 5.0% | $\varepsilon_{\perp}$ [1 kHz, 20° C.]: | 7.2 |
| CCY-3-O2 | 8.0% | Δε [1 kHz, 20° C.]: | −3.9 |
| CCY-V-O1V | 3.0% | γ₁ [mPa s, 20° C.]: | 194 |
| CCZC-3-3 | 4.0% | $K_1$ [pN, 20° C.]: | 21.7 |
| CCZC-3-5 | 4.0% | $K_3$ [pN, 20° C.]: | 21.8 |
| CLOY-3-O2 | 15.0% | $V_0$ [V, 20° C.]: | 2.50 |
| CLY-3-O2 | 9.0% | LTS bulk [h, −20° C.]: | 1000 |
| CLY-3-O3 | 1.0% | | |
| CLY-4-O2 | 5.0% | | |
| CLY-5-O2 | 3.5% | | |
| CY-5-O2 | 4.5% | | |
| Y-4O-O4 | 4.0% | | |
| Σ | 100.0% | | |

Mixture H60

| | | | |
|---|---|---|---|
| B(S)-2O-O4 | 4.0% | Cl. p. [° C.]: | 117.6 |
| B(S)-2O-O5 | 3.0% | Δn [589 nm, 20° C.]: | 0.1019 |
| B(S)-2O-O6 | 1.5% | $\varepsilon_{\parallel}$ [1 kHz, 20° C.]: | 3.1 |
| CC-3-V1 | 10.0% | $\varepsilon_{\perp}$ [1 kHz, 20° C.]: | 6.8 |
| CC-4-V1 | 15.5% | Δε [1 kHz, 20° C.]: | −3.7 |
| CC-3-5 | 12.0% | γ₁ [mPa s, 20° C.]: | 211 |
| CCP-3-1 | 8.0% | $K_1$ [pN, 20° C.]: | 29.5 |
| CCP-3-3 | 2.25% | $K_3$ [pN, 20° C.]: | 30.0 |
| CCP-V2-1 | 5.5% | $V_0$ [V, 20° C.]: | 3.01 |
| CCY-3-O2 | 9.0% | | |
| CLOY-3-O2 | 12.0% | | |
| CLY-3-O2 | 9.0% | | |
| CLY-5-O2 | 3.25% | | |
| LPOY-3-O2 | 5.0% | | |
| Σ | 100.0% | | |

Mixture H61

| | | | |
|---|---|---|---|
| CC-3-V1 | 10.0% | Cl. p. [° C.]: | 100.5 |
| CC-4-V1 | 16.0% | Δn [589 nm, 20° C.]: | 0.0849 |
| CC-3-O3 | 8.0% | $\varepsilon_{\parallel}$ [1 kHz, 20° C.]: | 3.4 |
| CC-3-5 | 5.0% | $\varepsilon_{\perp}$ [1 kHz, 20° C.]: | 7.4 |
| CCY-3-O2 | 8.0% | Δε [1 kHz, 20° C.]: | −4.0 |
| CCY-5-O2 | 2.5% | γ₁ [mPa s, 20° C.]: | 180 |
| CCZC-3-3 | 4.0% | $K_1$ [pN, 20° C.]: | 21.2 |
| CCZC-3-5 | 4.0% | $K_3$ [pN, 20° C.]: | 20.6 |
| CLOY-V-O2 | 15.0% | $V_0$ [V, 20° C.]: | 2.40 |
| CLY-3-O2 | 9.0% | | |
| CLY-3-O3 | 1.0% | | |
| CLY-4-O2 | 5.0% | | |
| CLY-5-O2 | 5.0% | | |
| CY-5-O2 | 2.0% | | |
| Y-4O-O4 | 5.5% | | |
| Σ | 100.0% | | |

Mixture H62

| | | | |
|---|---|---|---|
| B(S)-2O-O4 | 4.0% | Cl. p. [° C.]: | 119.5 |
| B(S)-2O-O5 | 3.0% | Δn [589 nm, 20° C.]: | 0.0934 |
| CC-3-V | 4.0% | $\varepsilon_{\parallel}$ [1 kHz, 20° C.]: | 3.1 |
| CC-3-V1 | 10.0% | $\varepsilon_{\perp}$ [1 kHz, 20° C.]: | 6.7 |
| CC-4-V1 | 10.0% | Δε [1 kHz, 20° C.]: | −3.6 |
| CC-3-4 | 2.0% | γ₁ [mPa s, 20° C.]: | 231 |
| CC-3-5 | 9.0% | $K_1$ [pN, 20° C.]: | 27.2 |
| CCP-3-1 | 3.5% | $K_3$ [pN, 20° C.]: | 26.2 |
| CCP-V2-1 | 5.5% | $V_0$ [V, 20° C.]: | 2.86 |
| CCY-3-O2 | 9.0% | LTS bulk [h, −20° C.]: | 1000 |
| CCZC-3-3 | 2.0% | | |
| CCZC-3-5 | 4.0% | | |

| | | | |
|---|---|---|---|
| CLOY-3-O2 | 15.0% | | |
| CLY-3-O2 | 9.0% | | |
| CLY-5-O2 | 5.0% | | |
| CWC-3-3 | 5.0% | | |
| Σ | 100.0% | | |

Mixture H63

| | | | |
|---|---|---|---|
| B(S)-2O-O4 | 4.0% | Cl. p. [° C.]: | 120 |
| B(S)-2O-O5 | 3.0% | Δn [589 nm, 20° C.]: | 0.1029 |
| B(S)-2O-O6 | 4.0% | $\varepsilon_\parallel$ [1 kHz, 20° C.]: | 3.1 |
| CC-3-V1 | 10.0% | $\varepsilon_\perp$ [1 kHz, 20° C.]: | 6.7 |
| CC-4-V1 | 15.0% | Δε [1 kHz, 20° C.]: | −3.6 |
| CC-3-5 | 10.5% | $\gamma_1$ [mPa s, 20° C.]: | 222 |
| CCP-3-1 | 8.0% | $K_1$ [pN, 20° C.]: | 28.4 |
| CCP-3-3 | 2.5% | $K_3$ [pN, 20° C.]: | 27.8 |
| CCP-V2-1 | 10.0% | $V_0$ [V, 20° C.]: | 2.94 |
| CWCY-3-O2 | 5.0% | | |
| CLOY-3-O2 | 15.0% | | |
| CLY-3-O2 | 7.0% | | |
| CLY-5-O2 | 5.0% | | |
| CPY-3-O2 | 1.0% | | |
| Σ | 100.0% | | |

Mixture H64

| | | | |
|---|---|---|---|
| CC-3-V1 | 10.0% | Cl. p. [° C.]: | 105 |
| CC-4-V1 | 16.0% | Δn [589 nm, 20° C.]: | 0.0838 |
| CC-3-O3 | 8.0% | $\varepsilon_\parallel$ [1 kHz, 20° C.]: | 3.3 |
| CC-3-5 | 5.0% | $\varepsilon_\perp$ [1 kHz, 20° C.]: | 7.3 |
| CWCY-3-O2 | 8.0% | Δε [1 kHz, 20° C.]: | −4.0 |
| CCY-5-O2 | 2.5% | $\gamma_1$ [mPa s, 20° C.]: | 207 |
| CCZC-3-3 | 4.0% | $K_1$ [pN, 20° C.]: | 22.8 |
| CCZC-3-5 | 4.0% | $K_3$ [pN, 20° C.]: | 22.8 |
| CLOY-3-O2 | 15.0% | $V_0$ [V, 20° C.]: | 2.54 |
| CLY-3-O2 | 9.0% | | |
| CLY-3-O3 | 1.0% | | |
| CLY-4-O2 | 5.0% | | |
| CLY-5-O2 | 5.0% | | |
| CY-5-O2 | 2.0% | | |
| Y-4O-O4 | 5.5% | | |
| Σ | 100.0% | | |

Mixture H65

| | | | |
|---|---|---|---|
| CC-3-V1 | 10.0% | Cl. p. [° C.]: | 102.8 |
| CC-4-V1 | 10.5% | Δn [589 nm, 20° C.]: | 0.0860 |
| CC-3-O3 | 8.0% | $\varepsilon_\parallel$ [1 kHz, 20° C.]: | 3.4 |
| CC-3-5 | 5.0% | $\varepsilon_\perp$ [1 kHz, 20° C.]: | 7.3 |
| CCS-3-2 | 10.0% | Δε [1 kHz, 20° C.]: | −3.9 |
| CCY-3-O2 | 8.0% | $\gamma_1$ [mPa s, 20° C.]: | 187 |
| CCY-5-O2 | 2.5% | $K_1$ [pN, 20° C.]: | 23.1 |
| CCZC-3-3 | 2.0% | $K_3$ [pN, 20° C.]: | 21.9 |
| CCZC-3-5 | 2.25% | $V_0$ [V, 20° C.]: | 2.49 |
| CLOY-3-O2 | 15.0% | | |
| CLY-3-O2 | 9.0% | | |
| CLY-3-O3 | 3.0% | | |
| CLY-4-O2 | 3.0% | | |
| CLY-5-O2 | 5.0% | | |
| Y-4O-O4 | 6.75% | | |
| Σ | 100.0% | | |

Mixture H66

| | | | |
|---|---|---|---|
| CC-4-V1 | 16.0% | Cl. p. [° C.]: | 100.1 |
| CC-3-O3 | 8.0% | Δn [589 nm, 20° C.]: | 0.0821 |
| CC-3-5 | 5.0% | $\varepsilon_\parallel$ [1 kHz, 20° C.]: | 3.4 |
| CCY-3-O2 | 8.0% | $\varepsilon_\perp$ [1 kHz, 20° C.]: | 7.5 |
| CCY-5-O2 | 2.5% | Δε [1 kHz, 20° C.]: | −4.1 |
| CCZC-3-3 | 4.0% | $\gamma_1$ [mPa s, 20° C.]: | 235 |
| CCZC-3-5 | 4.0% | $K_1$ [pN, 20° C.]: | 21.5 |
| CLOC-3-2 | 10.0% | $K_3$ [pN, 20° C.]: | 19.9 |
| CLOY-3-O2 | 15.0% | $V_0$ [V, 20° C.]: | 2.32 |
| CLY-3-O2 | 9.0% | | |
| CLY-3-O3 | 1.0% | | |
| CLY-4-O2 | 5.0% | | |
| CLY-5-O2 | 5.0% | | |
| CY-5-O2 | 2.0% | | |
| Y-4O-O4 | 5.5% | | |
| Σ | 100.0% | | |

Mixture H67

| | | | |
|---|---|---|---|
| B(S)-2O-O4 | 4.0% | Cl. p. [° C.]: | 119.5 |
| B(S)-2O-O5 | 3.0% | Δn [589 nm, 20° C.]: | 0.1118 |
| B(S)-2O-O6 | 4.0% | $\varepsilon_\parallel$ [1 kHz, 20° C.]: | 3.2 |
| CC-3-V1 | 10.0% | $\varepsilon_\perp$ [1 kHz, 20° C.]: | 6.8 |
| CC-4-V1 | 15.0% | Δε [1 kHz, 20° C.]: | −3.6 |
| CC-3-5 | 10.5% | $\gamma_1$ [mPa s, 20° C.]: | 218 |
| CCP-3-1 | 8.0% | $K_1$ [pN, 20° C.]: | 27.5 |
| CCP-3-3 | 1.5% | $K_3$ [pN, 20° C.]: | 27.1 |
| CCP-V2-1 | 10.0% | $V_0$ [V, 20° C.]: | 2.89 |
| CLOY-3-O2 | 14.0% | | |
| CLY-3-O2 | 7.0% | | |
| CLY-5-O2 | 5.0% | | |
| CWCY-V-O4 | 8.0% | | |
| Σ | 100.0% | | |

Mixture H68

| | | | |
|---|---|---|---|
| CP-3-O2 | 20.2% | Cl. p. [° C.]: | 73.7 |
| CCY-3-O2 | 9.0% | Δn [589 nm, 20° C.]: | 0.1640 |
| CCP-3-1 | 4.3% | $\varepsilon_\parallel$ [1 kHz, 20° C.]: | 5.8 |
| PGIGI-3-F | 5.4% | $\varepsilon_\perp$ [1 kHz, 20° C.]: | 2.8 |
| CCY-5-O2 | 7.4% | Δε [1 kHz, 20° C.]: | 3.1 |
| CPTP-3-2 | 10.0% | $\gamma_1$ [mPa s, 20° C.]: | 57 |
| CPY-3-O2 | 9.0% | $K_1$ [pN, 20° C.]: | 15.5 |
| PP-1-2V1 | 6.0% | $K_3$ [pN, 20° C.]: | 12.9 |
| CLP-V-1 | 5.0% | $V_0$ [V, 20° C.]: | 2.39 |
| B(S)-2O-O5 | 4.0% | | |
| B(S)-2O-O4 | 3.0% | | |
| B(S)-2O-O6 | 1.7% | | |
| CLOY-3-O2 | 15.0% | | |
| Σ | 100.0% | | |

Mixture H69

| | | | |
|---|---|---|---|
| CP-3-O2 | 20.2% | Cl. p. [° C.]: | 73 |
| CCY-3-O2 | 9.0% | Δn [589 nm, 20° C.]: | 0.1638 |
| CCP-3-1 | 4.3% | $\varepsilon_\parallel$ [1 kHz, 20° C.]: | 5.8 |
| PGIGI-3-F | 5.4% | $\varepsilon_\perp$ [1 kHz, 20° C.]: | 2.8 |
| CCY-5-O2 | 7.4% | Δε [1 kHz, 20° C.]: | 3.1 |
| CPTP-3-2 | 10.0% | $\gamma_1$ [mPa s, 20° C.]: | 56 |
| CPY-3-O2 | 9.0% | | |
| PP-1-2V | 6.0% | | |
| CLP-V-1 | 5.0% | | |
| B(S)-2O-O5 | 4.0% | | |
| B(S)-2O-O4 | 3.0% | | |
| B(S)-2O-O6 | 1.7% | | |
| CLOY-3-O2 | 15.0% | | |
| Σ | 100.0% | | |

Mixture H70

| Component | % | Property | Value |
|---|---|---|---|
| B(S)-2O-O4 | 4.0% | Cl. p. [° C.]: | 120.1 |
| B(S)-2O-O5 | 3.0% | Δn [589 nm, 20° C.]: | 0.1008 |
| B(S)-2O-O6 | 4.0% | $\varepsilon_\parallel$ [1 kHz, 20° C.]: | 3.1 |
| CC-3-V1 | 10.0% | $\varepsilon_\perp$ [1 kHz, 20° C.]: | 6.6 |
| CC-4-V1 | 15.75% | Δε [1 kHz, 20° C.]: | −3.5 |
| CC-3-5 | 11.0% | $\gamma_1$ [mPa s, 20° C.]: | 221 |
| CCP-3-1 | 8.0% | $K_1$ [pN, 20° C.]: | 28.2 |
| CCP-3-3 | 3.0% | $K_3$ [pN, 20° C.]: | 26.9 |
| CCP-V2-1 | 6.75% | $V_0$ [V, 20° C.]: | 2.92 |
| CCQPC-2-3 | 3.0% | LTS bulk [h, −20° C.]: | 432 |
| CCY-3-O2 | 6.0% | | |
| CLOY-3-O2 | 15.0% | | |
| CLY-3-O2 | 7.0% | | |
| CLY-5-O2 | 3.5% | | |
| Σ | 100.0% | | |

Mixture H71

| Component | % | Property | Value |
|---|---|---|---|
| B(S)-2O-O4 | 4.0% | Cl. p. [° C.]: | 116.5 |
| B(S)-2O-O5 | 2.5% | Δn [589 nm, 20° C.]: | 0.1012 |
| B(S)-2O-O6 | 4.0% | $\varepsilon_\parallel$ [1 kHz, 20° C.]: | 3.1 |
| CC-3-V1 | 11.0% | $\varepsilon_\perp$ [1 kHz, 20° C.]: | 6.8 |
| CC-4-V1 | 15.0% | Δε [1 kHz, 20° C.]: | −3.6 |
| CC-3-5 | 11.0% | $\gamma_1$ [mPa s, 20° C.]: | 221 |
| CCP-3-1 | 8.0% | $K_1$ [pN, 20° C.]: | 29.1 |
| CCY-3-O2 | 6.0% | $K_3$ [pN, 20° C.]: | 28.3 |
| CLOY-3-O2 | 15.0% | $V_0$ [V, 20° C.]: | 2.95 |
| CLY-3-O2 | 7.0% | | |
| CLY-5-O2 | 5.0% | | |
| CPY-3-O2 | 1.5% | | |
| CCEP-3-1 | 10.0% | | |
| Σ | 100.0% | | |

Mixture H72

| Component | % | Property | Value |
|---|---|---|---|
| B(S)-2O-O4 | 4.0% | Cl. p. [° C.]: | 114.6 |
| B(S)-2O-O5 | 3.5% | Δn [589 nm, 20° C.]: | 0.1011 |
| CC-3-V1 | 10.0% | $\varepsilon_\parallel$ [1 kHz, 20° C.]: | 3.1 |
| CC-4-V1 | 13.75% | $\varepsilon_\perp$ [1 kHz, 20° C.]: | 6.6 |
| CC-3-5 | 11.0% | Δε [1 kHz, 20° C.]: | −3.5 |
| CCP-3-1 | 8.0% | $\gamma_1$ [mPa s, 20° C.]: | 214 |
| CCP-3-3 | 3.0% | $K_1$ [pN, 20° C.]: | 26.8 |
| CCY-3-O2 | 6.0% | $K_3$ [pN, 20° C.]: | 27.7 |
| CEC-1V-V1 | 8.0% | $V_0$ [V, 20° C.]: | 2.98 |
| CLOY-3-O2 | 15.0% | | |
| CLY-3-O2 | 7.0% | | |
| CLY-5-O2 | 5.0% | | |
| CPY-3-O2 | 5.75% | | |
| Σ | 100.0% | | |

Mixture H73

| Component | % | Property | Value |
|---|---|---|---|
| B(S)-2O-O4 | 4.0% | Cl. p. [° C.]: | 75 |
| B(S)-2O-O5 | 4.0% | Δn [589 nm, 20° C.]: | 0.1023 |
| B(S)-2O-O6 | 3.5% | $\varepsilon_\parallel$ [1 kHz, 20° C.]: | 3.6 |
| CC-3-V | 46.0% | $\varepsilon_\perp$ [1 kHz, 20° C.]: | 7.0 |
| CC-3-V1 | 2.75% | Δε [1 kHz, 20° C.]: | −3.5 |
| CLOY-3-O2 | 1.0% | $\gamma_1$ [mPa s, 20° C.]: | 80 |
| CLY-3-O3 | 6.0% | $K_1$ [pN, 20° C.]: | 13.8 |
| CLY-4-O2 | 2.5% | $K_3$ [pN, 20° C.]: | 13.9 |
| CPY-2-O2 | 9.0% | $V_0$ [V, 20° C.]: | 2.12 |
| CPY-3-O2 | 9.0% | | |
| CY-3-O4 | 8.5% | | |
| PGIY-2-O4 | 3.75% | | |
| Σ | 100.0% | | |

Mixture H74

| Component | % | Property | Value |
|---|---|---|---|
| B(S)-2O-O4 | 3.0% | Cl. p. [° C.]: | 118.9 |
| B(S)-2O-O5 | 4.0% | Δn [589 nm, 20° C.]: | 0.1048 |
| B(S)-2O-O6 | 3.0% | $\varepsilon_\parallel$ [1 kHz, 20° C.]: | 3.2 |
| CC-3-V1 | 10.0% | $\varepsilon_\perp$ [1 kHz, 20° C.]: | 7.0 |
| CC-4-V1 | 11.5% | Δε [1 kHz, 20° C.]: | −3.9 |
| CC-3-5 | 11.0% | $\gamma_1$ [mPa s, 20° C.]: | 211 |
| CCP-3-1 | 8.0% | $K_1$ [pN, 20° C.]: | 28.9 |
| CCP-3-3 | 3.0% | $K_3$ [pN, 20° C.]: | 29.0 |
| CCP-V2-1 | 8.5% | $V_0$ [V, 20° C.]: | 2.90 |
| CCY-3-O2 | 9.0% | | |
| CLOY-3-O2 | 12.5% | | |
| CLY-3-O2 | 7.0% | | |
| CLY-5-O2 | 5.0% | | |
| B(S)-4O-O5 | 2.5% | | |
| CP-3-O2 | 2.0% | | |
| Σ | 100.0% | | |

Mixture H75

| Component | % | Property | Value |
|---|---|---|---|
| B(S)-2O-O5 | 3.0% | cl. p. [° C.]: | 99.2 |
| CC-3-V | 21.0% | Δn [589 nm, 20° C.]: | 0.0906 |
| CC-3-V1 | 8.0% | $\varepsilon_\parallel$ [1 kHz, 20° C.]: | 3.3 |
| CC-4-V1 | 8.0% | $\varepsilon_\perp$ [1 kHz, 20° C.]: | 7.3 |
| CC-3-4 | 1.5% | Δε [1 kHz, 20° C.]: | −4.0 |
| CC-3-5 | 8.0% | $\gamma_1$ [mPa s, 20° C.]: | 152 |
| CCY-3-O2 | 9.0% | $K_1$ [pN, 20° C.]: | 20.5 |
| CLOY-3-O2 | 12.0% | $K_3$ [pN, 20° C.]: | 20.8 |
| CLY-3-O2 | 9.0% | $V_0$ [V, 20° C.]: | 2.41 |
| CLY-3-O3 | 6.0% | LTS bulk [h, −20° C.]: | 1000 |
| CLY-5-O2 | 5.0% | | |
| COB(S)-2-O4 | 5.0% | | |
| CVCOY-3-O2 | 1.75% | | |
| Y-4O-O4 | 2.75% | | |
| Σ | 100.0% | | |

Mixture H76

| Component | % | Property | Value |
|---|---|---|---|
| CC-3-V | 34.5% | cl. p. [° C.]: | 87.7 |
| CC-3-V1 | 7.0% | Δn [589 nm, 20° C.]: | 0.0931 |
| CCY-3-O2 | 8.0% | $\varepsilon_\parallel$ [1 kHz, 20° C.]: | 3.5 |
| CLOY-3-O2 | 6.5% | $\varepsilon_\perp$ [1 kHz, 20° C.]: | 6.6 |
| CLY-3-O2 | 9.0% | Δε [1 kHz, 20° C.]: | −3.1 |
| CLY-3-O3 | 6.0% | $\gamma_1$ [mPa s, 20° C.]: | 113 |
| CLY-4-O2 | 5.0% | $K_1$ [pN, 20° C.]: | 16.0 |
| CLY-5-O2 | 5.0% | $K_3$ [pN, 20° C.]: | 18.5 |
| CY-3-O2 | 12.0% | $V_0$ [V, 20° C.]: | 2.59 |
| PYP-2-3 | 5.5% | | |
| CCU-2-F | 1.5% | | |
| Σ | 100.0% | | |

Mixture H77

| Component | % | Property | Value |
|---|---|---|---|
| CC-3-V | 12.0% | cl. p. [° C.]: | 96 |
| CC-3-V1 | 8.0% | Δn [589 nm, 20° C.]: | 0.0836 |
| CC-4-V1 | 8.0% | $\varepsilon_\parallel$ [1 kHz, 20° C.]: | 3.4 |
| CCC-3-V | 5.0% | $\varepsilon_\perp$ [1 kHz, 20° C.]: | 7.3 |
| CC-3-4 | 4.0% | Δε [1 kHz, 20° C.]: | −3.9 |
| CC-3-5 | 8.0% | $\gamma_1$ [mPa s, 20° C.]: | 147 |
| CCP-3-1 | 0.75% | $K_1$ [pN, 20° C.]: | 20.5 |
| CCY-3-O2 | 9.0% | $K_3$ [pN, 20° C.]: | 20.6 |
| CCY-5-O2 | 2.0% | $V_0$ [V, 20° C.]: | 2.44 |
| CLOY-3-O2 | 15.0% | LTS bulk [h, −20° C.]: | 1000 |
| CLY-3-O2 | 9.0% | | |
| CLY-3-O3 | 5.0% | | |

-continued

| | |
|---|---|
| CLY-5-O2 | 5.0% |
| COB(S)-2-O4 | 1.0% |
| Y-4O-O4 | 8.25% |
| Σ | 100.0% |

Mixture H78

| | | | |
|---|---|---|---|
| B(S)-2O-O5 | 3.0% | cl. p. [° C.]: | 96.2 |
| CC-3-V | 17.5% | Δn [589 nm, 20° C.]: | 0.0937 |
| CC-3-V1 | 8.0% | $\varepsilon_\parallel$ [1 kHz, 20° C.]: | 3.3 |
| CC-4-V1 | 12.0% | $\varepsilon_\perp$ [1 kHz, 20° C.]: | 7.2 |
| CC-3-4 | 4.0% | Δε [1 kHz, 20° C.]: | −3.9 |
| CC-3-5 | 8.0% | $\gamma_1$ [mPa s, 20° C.]: | 149 |
| CCY-3-O2 | 9.0% | $K_1$ [pN, 20° C.]: | 21.4 |
| CCY-5-O2 | 2.5% | $K_3$ [pN, 20° C.]: | 21.2 |
| CLOY-3-O2 | 15.0% | $V_0$ [V, 20° C.]: | 2.45 |
| CLY-3-O2 | 9.0% | | |
| CLY-5-O2 | 5.0% | | |
| B(S)-2O-OiPr | 6.5% | | |
| Y-4O-O4 | 0.5% | | |
| Σ | 100.0% | | |

Mixture H79

| | | | |
|---|---|---|---|
| B(S)-2O-O4 | 3.0% | cl. p. [° C.]: | 98.5 |
| B(S)-2O-O5 | 3.0% | Δn [589 nm, 20° C.]: | 0.0917 |
| B(S)-2O-O6 | 4.0% | $\varepsilon_\parallel$ [1 kHz, 20° C.]: | 3.4 |
| CC-3-V | 7.0% | $\varepsilon_\perp$ [1 kHz, 20° C.]: | 7.8 |
| CC-3-V1 | 6.0% | Δε [1 kHz, 20° C.]: | −4.4 |
| CC-4-V1 | 7.0% | $\gamma_1$ [mPa s, 20° C.]: | 156 |
| CC-2-3 | 4.5% | $K_1$ [pN, 20° C.]: | 22.3 |
| CC-3-O3 | 7.0% | $K_3$ [pN, 20° C.]: | 19.9 |
| CC-3-4 | 5.0% | $V_0$ [V, 20° C.]: | 2.25 |
| CC-3-5 | 8.0% | | |
| CCY-3-1 | 2.0% | | |
| CCY-3-O1 | 3.0% | | |
| CCY-3-O2 | 6.0% | | |
| CCY-5-O2 | 8.0% | | |
| CLOY-3-O2 | 4.0% | | |
| CLY-3-O2 | 9.0% | | |
| CLY-3-O3 | 3.0% | | |
| CLY-5-O2 | 3.5% | | |
| CNI(F)-5-O2 | 7.0% | | |
| Σ | 100.0% | | |

Mixture H80

| | | | |
|---|---|---|---|
| B(S)-2O-O4 | 4.0% | cl. p. [° C.]: | 99 |
| B(S)-2O-O5 | 2.5% | Δn [589 nm, 20° C.]: | 0.0938 |
| B(S)-2O-O6 | 4.0% | $\varepsilon_\parallel$ [1 kHz, 20° C.]: | 3.4 |
| CC-3-V | 27.5% | $\varepsilon_\perp$ [1 kHz, 20° C.]: | 7.5 |
| CC-3-V1 | 8.0% | Δε [1 kHz, 20° C.]: | −4.1 |
| CC-3-O3 | 2.0% | $\gamma_1$ [mPa s, 20° C.]: | 155 |
| CC-3-5 | 8.0% | $K_1$ [pN, 20° C.]: | 21.1 |
| CCP-3-1 | 2.0% | $K_3$ [pN, 20° C.]: | 22.4 |
| CCY-3-O2 | 11.0% | $V_0$ [V, 20° C.]: | 2.46 |
| CCY-5-O2 | 2.0% | | |
| CLOY-3-O2 | 14.0% | | |
| CLY-3-O2 | 9.0% | | |
| CLY-5-O2 | 5.0% | | |
| DCY-3-O2 | 1.0% | | |
| Σ | 100.0% | | |

Mixture H81

| | | | |
|---|---|---|---|
| B(S)-2O-O4 | 4.0% | cl. p. [° C.]: | 97.9 |
| B(S)-2O-O5 | 2.0% | Δn [589 nm, 20° C.]: | 0.0935 |
| B(S)-2O-O6 | 4.0% | $\varepsilon_\parallel$ [1 kHz, 20° C.]: | 3.3 |
| CC-3-V | 27.0% | $\varepsilon_\perp$ [1 kHz, 20° C.]: | 7.5 |
| CC-3-V1 | 8.0% | Δε [1 kHz, 20° C.]: | −4.2 |
| CC-3-5 | 10.5% | $\gamma_1$ [mPa s, 20° C.]: | 155 |
| CCP-3-1 | 2.0% | $K_1$ [pN, 20° C.]: | 21.3 |
| CCY-3-O2 | 11.0% | $K_3$ [pN, 20° C.]: | 22.4 |
| CCY-5-O2 | 1.5% | | |
| CLOY-3-O2 | 15.0% | | |
| CLY-3-O2 | 9.0% | | |
| CLY-5-O2 | 5.0% | | |
| LOY-3-O2 | 1.0% | | |
| Σ | 100.0% | | |

Mixture H82

| | | | |
|---|---|---|---|
| B(S)-2O-O5 | 3.0% | cl. p. [° C.]: | 98.5 |
| CC-3-V | 22.0% | Δn [589 nm, 20° C.]: | 0.0902 |
| CC-3-V1 | 8.0% | $\varepsilon_\parallel$ [1 kHz, 20° C.]: | 3.3 |
| CC-3-O3 | 4.0% | $\varepsilon_\perp$ [1 kHz, 20° C.]: | 7.3 |
| CC-3-4 | 4.5% | Δε [1 kHz, 20° C.]: | −4.0 |
| CC-3-5 | 8.0% | $\gamma_1$ [mPa s, 20° C.]: | 154 |
| CCY-3-O1 | 3.0% | $K_1$ [pN, 20° C.]: | 20.9 |
| CCY-3-O2 | 9.0% | $K_3$ [pN, 20° C.]: | 21.0 |
| CLOY-3-O2 | 12.0% | $V_0$ [V, 20° C.]: | 2.41 |
| CLY-3-O2 | 9.0% | LTS bulk [h, −20° C.]: | 1000 |
| CLY-3-O3 | 4.0% | | |
| CLY-5-O2 | 4.0% | | |
| COB(S)-2-O4 | 5.0% | | |
| CPY-3-O2 | 1.5% | | |
| LOY-3-O2 | 3.0% | | |
| Σ | 100.0% | | |

Mixture H83

| | | | |
|---|---|---|---|
| B(S)-2O-O5 | 3.0% | cl. p. [° C.]: | 100.5 |
| CC-3-V | 28.0% | Δn [589 nm, 20° C.]: | 0.0914 |
| CC-3-V1 | 8.0% | $\varepsilon_\parallel$ [1 kHz, 20° C.]: | 3.3 |
| CC-4-V1 | 10.0% | $\varepsilon_\perp$ [1 kHz, 20° C.]: | 7.2 |
| CCP-3-1 | 2.0% | Δε [1 kHz, 20° C.]: | −3.8 |
| CCY-3-O2 | 9.0% | $\gamma_1$ [mPa s, 20° C.]: | 144 |
| CLOY-3-O2 | 12.0% | $K_1$ [pN, 20° C.]: | 19.9 |
| CLY-3-O2 | 8.0% | $K_3$ [pN, 20° C.]: | 21.1 |
| CLY-3-O3 | 5.0% | $V_0$ [V, 20° C.]: | 2.47 |
| CLY-5-O2 | 5.0% | LTS bulk [h, −20° C.]: | 912 |
| COB(S)-2-O4 | 5.0% | | |
| CCNI(F)-3-O4 | 3.5% | | |
| Y-4O-O4 | 1.5% | | |
| Σ | 100.0% | | |

Mixture H84

| | | | |
|---|---|---|---|
| B(S)-2O-O5 | 3.0% | cl. p. [° C.]: | 100.1 |
| CC-3-V | 25.0% | Δn [589 nm, 20° C.]: | 0.0912 |
| CC-3-V1 | 8.0% | $\varepsilon_\parallel$ [1 kHz, 20° C.]: | 3.3 |
| CC-4-V1 | 10.0% | $\varepsilon_\perp$ [1 kHz, 20° C.]: | 7.2 |
| CC-3-5 | 3.0% | Δε [1 kHz, 20° C.]: | −3.9 |
| CCP-3-1 | 1.0% | $\gamma_1$ [mPa s, 20° C.]: | 148 |
| CCY-3-O2 | 9.0% | $K_1$ [pN, 20° C.]: | 19.9 |
| CLOY-3-O2 | 12.0% | $K_3$ [pN, 20° C.]: | 21.0 |
| CLY-3-O2 | 8.0% | $V_0$ [V, 20° C.]: | 2.45 |
| CLY-3-O3 | 5.0% | LTS bulk [h, −20° C.]: | 1000 |

-continued

| | |
|---|---|
| CLY-5-O2 | 5.0% |
| COB(S)-2-O4 | 5.0% |
| CCZY-3-O2 | 3.5% |
| Y-4O-O4 | 2.5% |
| Σ | 100.0% |

Mixture H85

| | | | |
|---|---|---|---|
| B(S)-2O-O5 | 3.0% | cl. p. [° C.]: | 94.4 |
| B(S)-2O-O6 | 2.0% | Δn [589 nm, 20° C.]: | 0.0899 |
| CC-3-V | 30.0% | ε∥ [1 kHz, 20° C.]: | 3.3 |
| CC-3-V1 | 8.0% | ε⊥ [1 kHz, 20° C.]: | 7.2 |
| CC-3-5 | 8.0% | Δε [1 kHz, 20° C.]: | −3.9 |
| CCY-3-O2 | 9.0% | γ₁ [mPa s, 20° C.]: | 141 |
| CLOY-3-O2 | 15.0% | K₁ [pN, 20° C.]: | 19.9 |
| CLY-3-O2 | 9.0% | K₃ [pN, 20° C.]: | 21.2 |
| CLY-3-O3 | 3.0% | V₀ [V, 20° C.]: | 2.47 |
| CLY-4-O2 | 5.0% | LTS bulk [h, −20° C.]: | 672 |
| CLY-5-O2 | 5.0% | | |
| PY-1-O2 | 1.5% | | |
| Y-4O-O4 | 1.5% | | |
| Σ | 100.0% | | |

Mixture H86

| | | | |
|---|---|---|---|
| B(S)-2O-O4 | 4.0% | Cl. p. [° C.]: | 76 |
| B(S)-2O-O5 | 4.0% | Δn [589 nm, 20° C.]: | 0.1014 |
| B(S)-(c5-3en)1O-O4 | 3.5% | ε∥ [1 kHz, 20° C.]: | 3.6 |
| CC-3-V | 46.0% | ε⊥ [1 kHz, 20° C.]: | 7.0 |
| CC-3-V1 | 2.75% | Δε [1 kHz, 20° C.]: | −3.5 |
| CLOY-3-O2 | 1.0% | γ₁ [mPa s, 20° C.]: | 82 |
| CLY-3-O3 | 6.0% | | |
| CLY-4-O2 | 2.5% | | |
| CPY-2-O2 | 9.0% | | |
| CPY-3-O2 | 9.0% | | |
| CY-3-O4 | 8.5% | | |
| PGIY-2-O4 | 3.75% | | |
| Σ | 100.0% | | |

Mixture H87

| | | | |
|---|---|---|---|
| B(S)-2O-O4 | 4.0% | Cl. p. [°C.]: | 77 |
| B(S)-2O-O5 | 4.0% | Δn [589 nm, 20° C.]: | 0.1031 |
| B(S)-2O-O6 | 3.5% | ε∥ [1 kHz, 20° C.]: | 3.2 |
| CC-3-V | 46.0% | ε⊥ [1 kHz, 20° C.]: | 6.7 |
| CC-3-V1 | 2.75% | Δε [1 kHz, 20° C.]: | −3.5 |
| CLOY-3-O2 | 1.0% | γ₁ [mPa s, 20° C.]: | 81 |
| CLY-3-O3 | 6.0% | | |
| CLY-4-O2 | 2.5% | | |
| CPY-2-O2 | 9.0% | | |
| CPY-3-O2 | 9.0% | | |
| CY-3-O4 | 8.5% | | |
| PPY-3-O2 | 2.0% | | |
| PGIY-2-O4 | 1.75% | | |
| Σ | 100.0% | | |

Mixture H88

| | | | |
|---|---|---|---|
| B(S)-2O-O4 | 4.0% | Cl. p. [° C.]: | 76 |
| B(S)-2O-O5 | 4.0% | Δn [589 nm, 20° C.]: | 0.1025 |
| B(S)-2O-O6 | 3.5% | ε∥ [1 kHz, 20° C.]: | 3.5 |
| CC-3-V | 46.0% | ε⊥ [1 kHz, 20° C.]: | 7.1 |
| CC-3-V1 | 2.75% | Δε [1 kHz, 20° C.]: | −3.6 |
| CLOY-3-O2 | 1.0% | γ₁ [mPa s, 20° C.]: | 78 |
| CLY-3-O3 | 6.0% | | |
| CLY-4-O2 | 2.5% | | |

-continued

| | |
|---|---|
| CPY-2-O2 | 9.0% |
| CPY-3-O2 | 9.0% |
| CY-3-O4 | 8.5% |
| PPY-3-O2 | 2.0% |
| PEPY-3-O2 | 1.75% |
| Σ | 100.0% |

The invention claimed is:
1. A liquid crystal medium comprising
a) one or more compounds selected from formulae I-1, I-2, and I-3

I-1
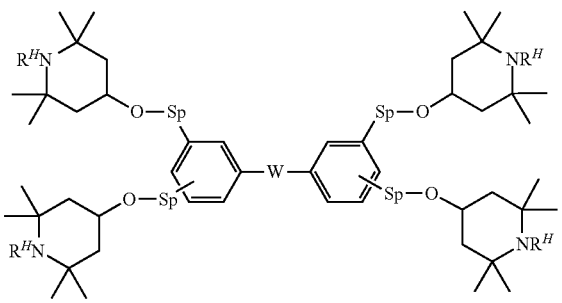

I-2
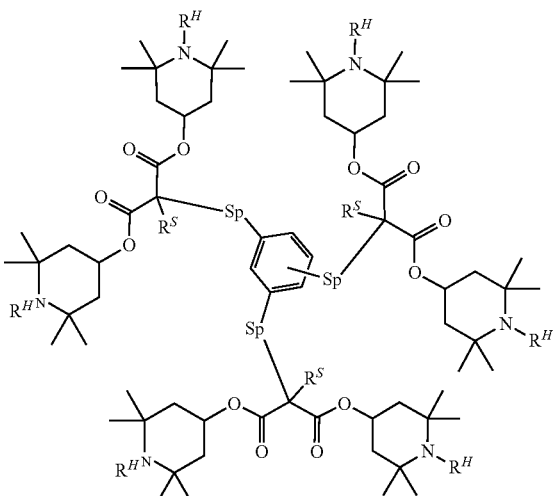

I-3
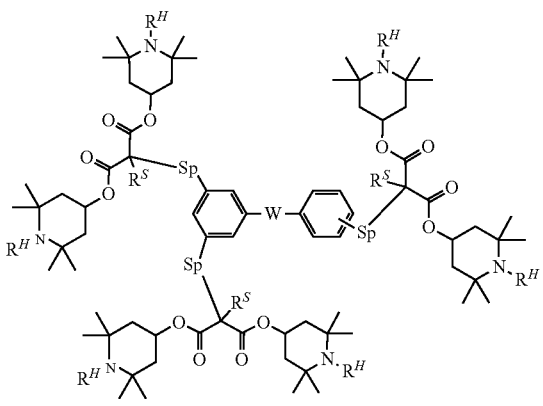

in which
$R^H$ denotes H, O•, CH₃, OH or OR$^S$,
Sp on each occurrence, identically or differently, denotes a spacer group, and
W denotes linear, optionally unsaturated, alkylene having 1 to 12 C atoms or branched, optionally unsaturated, alkylene having 2 to 12 C atoms, in which one or more non-adjacent-CH₂-groups may each be replaced with —O—, wherein the total concentration of the one or more compounds of formulae I-1, I-2, and I-3 is in the range of from 1000 ppm to 5000 ppm;

b) one or more compounds selected from the group of compounds of formulae IIA, IIB, and IIC

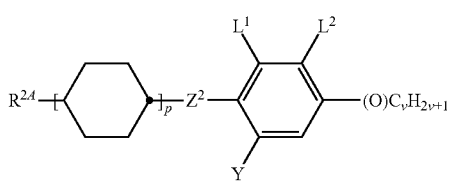

IIA

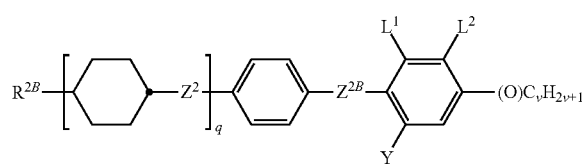

IIB

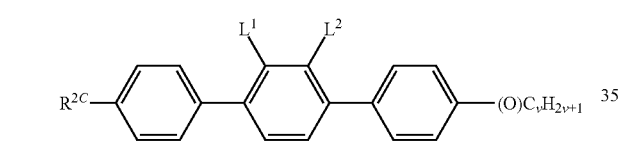

IIC in which
$R^{2A}$, $R^{2B}$, and $R^{2C}$ each, independently of one another, denote H, or an alkyl having 1 to 15 C atoms or alkenyl radical having 2 to 15 C atoms which is unsubstituted, monosubstituted by CN or CF₃ or at least monosubstituted by halogen, where one or more CH₂ groups in these radicals may each be replaced by —O—, —S—,

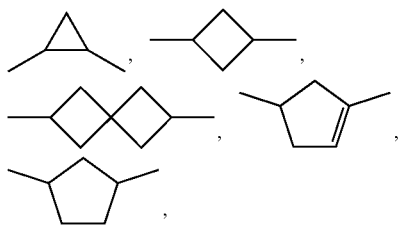

—C≡C—, —CF₂O—, —OCF₂—, —OC—O—, or —O—CO— in such a way that O atoms are not linked directly to one another;
$L^1$ and $L^2$ each, independently of one another, denote F, Cl, CF₃ or CHF₂;
Y denotes H, F, Cl, CF₃, CHF₂, or CH₃;
$Z^2$ and $Z^{2B}$ each, independently of one another, denote a single bond, —CH₂CH₂—, —CH=CH—, —CF₂O—, —OCF₂—, —CH₂O—, —OCH₂—, —COO—, —OCO—, —C₂F₄—, —CF=CF—, or —CH=CHCH₂O—;
(O) denotes O or a single bond;
p denotes 0, 1 or 2;
q denotes 0 or 1; and
v denotes 1, 2, 3, 4, 5, or 6;

c) one or more compounds selected from formula IID

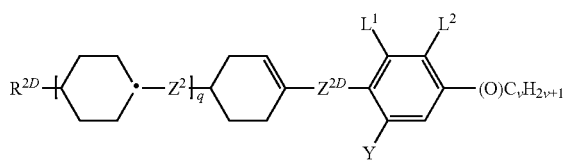

IID in which
$R^{2D}$ denotes H, or an alkyl having 1 to 15 C atoms or alkenyl radical having 2 to 15 C atoms which is unsubstituted, monosubstituted by CN or CF₃ or at least monosubstituted by halogen, where one or more CH₂ groups in these radicals may each be replaced by —O—, —S—,

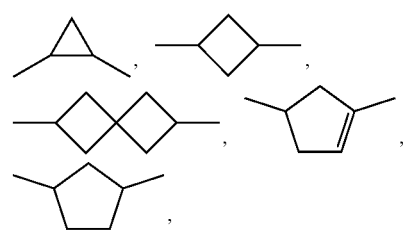

—C≡C—, —CF₂O—, —OCF₂—, —OC—O—, or —O—CO— in such a way that O atoms are not linked directly to one another;
$L^1$ and $L^2$ each, independently of one another, denote F, Cl, CF₃ or CHF₂;
Y denotes H, F, Cl, CF₃, CHF₂, or CH₃;
$Z^2$ denotes a single bond, —CH₂CH₂—, —CH=CH—, —CF₂O—, —OCF₂—, —CH₂O—, —OCH₂—, —COO—, —OCO—, —C₂F₄—, —CF=CF—, or —CH=CHCH₂O—;
$Z^D$ is a single bond;
(O) denotes O or a single bond;
q denotes 0 or 1; and
v denotes 1, 2, 3, 4, 5, or 6; and d) one or more compounds selected from formula IID-10, and/or one or more compounds of formula CL:

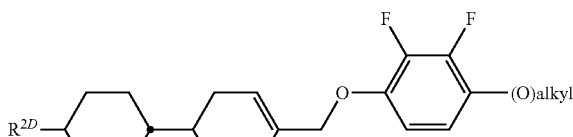

IID-10

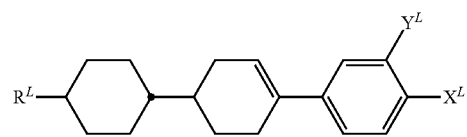

CL in which
R$^{2D}$ and (O) have the meanings defined for formula IID, and alkyl denotes n-alkyl having 1 to 5 C atoms,
R$^L$ denotes H, a straight chain alkyl or alkoxy radical having 1 to 15 C atoms, a branched alkyl or alkoxy radical having 2 to 15 C atoms, a straight chain alkenyl radical having 2 to 15 C atoms, or a branched alkenyl radical having 3 to 15 C atoms, where one or more CH$_2$ groups in these radicals may each be replaced, independently of one another, by

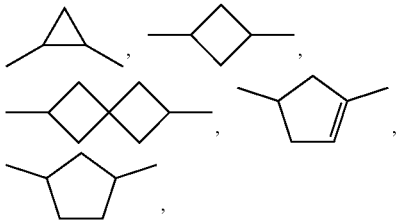

—C≡C—, —CF$_2$O—, —OCF$_2$—, —CH=CH—, —O—, —CO—O—, or —O—CO— in such a way that O atoms are not linked directly to one another, and in which, in addition, one or more H atoms may each be replaced by halogen,
X$^L$ denotes F, Cl, CN, CHF$_2$, CF$_3$, OCF$_3$, or, identically or differently, has one of the meanings of R$^L$, and
YL denotes H, F, Cl or CH$_3$.

2. The liquid crystal medium according to claim 1, wherein the medium further comprises one or more compounds of the formula ST-3

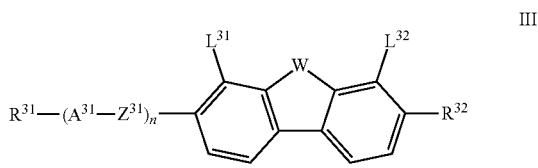

ST-3 in which
R$^{ST}$ denotes H, or an alkyl or alkoxy radical having 1 to 15 C atoms, where, in addition, one or more CH$_2$ groups in these radicals may each be replaced, independently of one another by —C≡C—, —CF$_2$O—, —OCF$_2$—, —CH=CH—,

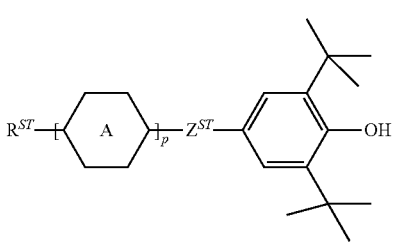

—O—, —CO—O—, or —O—CO— in such a way that O atoms are not linked directly to one another, and in which one or more H atoms may each be replaced by halogen,

on each occurrence, identically or differently, denotes

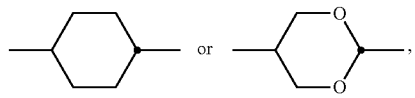

Z$^{ST}$ denotes —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—, —CH$_2$O—, —C$_2$F$_4$—, —CH$_2$CF$_2$—, —CF$_2$CH$_2$—, —CF=CF—, —CH=CF—, —CF=CH—, —CH=CH—, —C≡C—, or a single bond, and
p denotes 0, 1 or 2.

3. The liquid crystal medium according to claim 1, wherein the medium further comprises one or more compounds of formula III

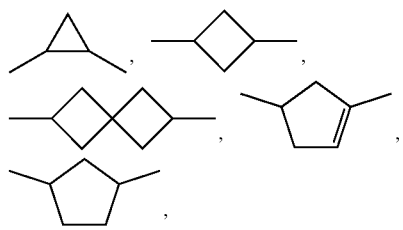

III in which
R$^{31}$ and R$^{32}$ each, independently of one another, denote H, an alkyl or alkoxy radical having 1 to 15 C atoms, where one or more CH$_2$ groups in these radicals may each be replaced, independently of one another, by

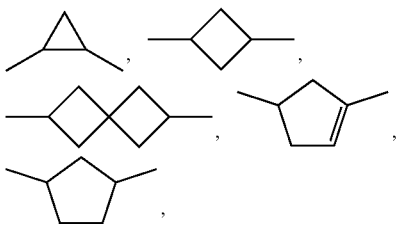

—C≡C—, —CF$_2$O—, —OCF$_2$—, —CH=CH—, by —O—, —CO—O—, or —O—CO— in such a way that O atoms are not linked directly to one another, and in which one or more H atoms may each be replaced by halogen,
A$^{31}$ on each occurrence, independently of one another, denotes
a) 1,4-cyclohexenylene or 1,4-cyclohexylene radical, in which one or two non-adjacent CH$_2$ groups may each be replaced by —O— or —S—,
b) a 1,4-phenylene radical, in which one or two CH groups may each be replaced by N, or
c) a radical from the group spiro[3.3]heptane-2,6-diyl, 1,4-bicyclo [2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) may be mono- or polysubstituted by halogen atoms, $Z^{31}$ on each occurrence independently of one another denotes —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH-CH$_2$O—, —C$_2$F$_4$—, —CH$_2$CF$_2$—, —CF$_2$CH$_2$—, —CF=CF—, —CH=CF—, —CF=CH—, —CH=CH—, —C≡C—, or a single bond, n denotes 0, 1 or 2, $L^{31}$ and $L^{32}$ each, independently of one another, denote F, Cl, CF$_3$, or CHF$_2$, and W denotes O or S.

4. The liquid crystal medium according to claim 1, wherein the medium further comprises one or more compounds of formula IV

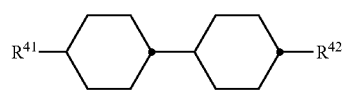

IV in which $R^{41}$ denotes an unsubstituted alkyl radical having 1 to 7 C atoms or an unsubstituted alkenyl radical having 2 to 7 C atoms, and $R^{42}$ denotes an unsubstituted alkyl radical having 1 to 7 C atoms or an unsubstituted alkoxy radical having 1 to 6 C atoms, or an unsubstituted alkenyl radical having 2 to 7 C atoms.

5. The liquid crystal medium according to claim 1, wherein the medium further comprises one or more compounds selected from the group of compounds of formulae IV-3-3 to IV-3-5:

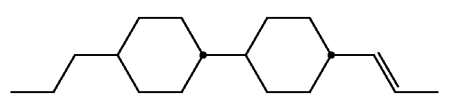

IV-3-3

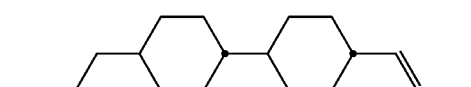

IV-3-4

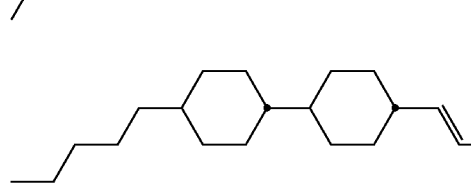

IV-3-5

6. The liquid crystal medium according to claim 1, wherein the medium further comprises one or more compounds selected from the compounds of formulae IV-1-1 to IV-1-5

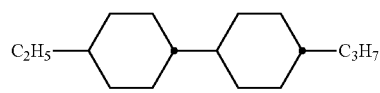

IV-1-1

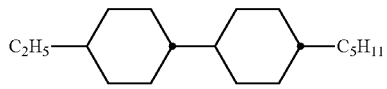

IV-1-2

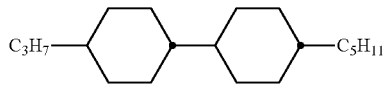

IV-1-3

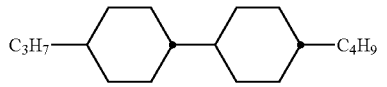

IV-1-4

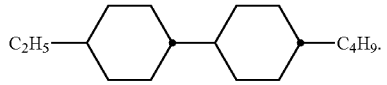

IV-1-5

7. The medium according to claim 1, wherein the medium comprises one or more compounds of formula CL, and wherein said one or more compounds of formula CL are selected from the group of compounds of formulae CL-3-1 to CL-3-12

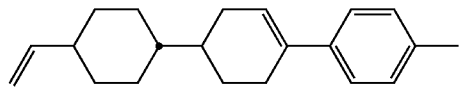

CL-3-1

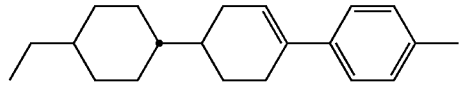

CL-3-2

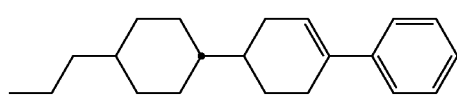

CL-3-3

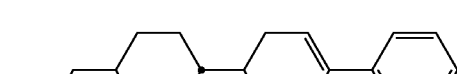

CL-3-4

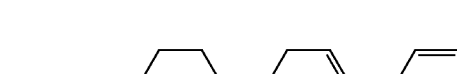

CL-3-5

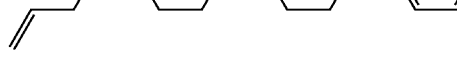

CL-3-6

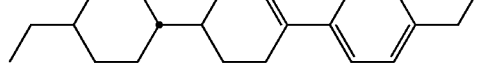

CL-3-7

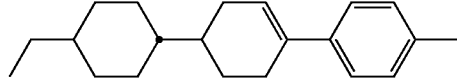

CL-3-8

-continued

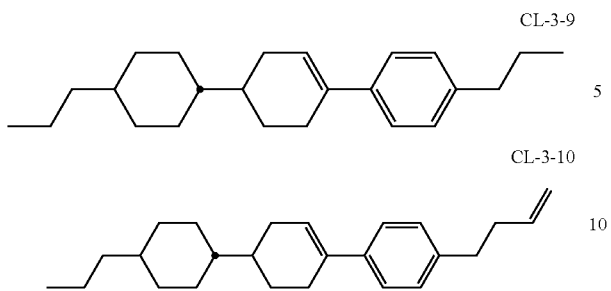

CL-3-9

CL-3-10

-continued

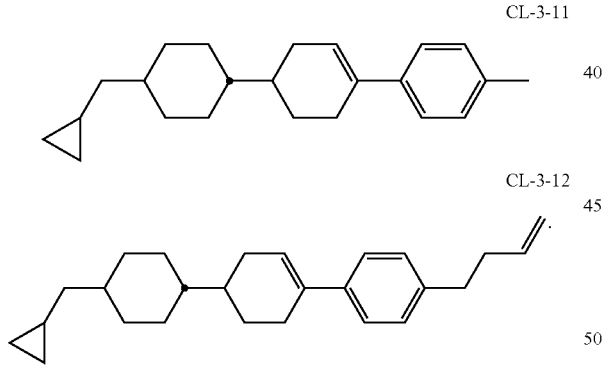

CL-3-11

CL-3-12

8. The medium according to claim 1, wherein the medium has a birefringence in the range of from 0.085 to 0.110.

9. A liquid crystal display comprising the liquid crystal medium as defined in claim 1.

10. The liquid crystal display of claim 9, wherein the display is a VA, IPS or FFS type display.

11. A method of generating an electro-optical effect comprising using the liquid crystal medium according to claim 1 in a VA, IPS, FFS, PS-VA, PS-IPS or PS-FFS display.

12. A process of preparing a liquid crystal medium according to claim 1, comprising:

mixing (a) one or more compounds selected from formulae 1-1, 1-2, and 1-3 with (b) one or more compounds selected from the group of compounds of formulae IIA, IIB and/or IIC, (c) one or more compounds of the formula IID, (d) one or more compounds of formula IID-10 and/or one or more compounds of formula CL, as defined in claim 1, and optionally (e) a polymerizable compound or further liquid crystal compounds or additives.

13. The liquid crystal medium according to claim 1, wherein said one or more compounds of formulae I-1, I-2, and I-3 are selected from the compounds of the formula I-1-1:

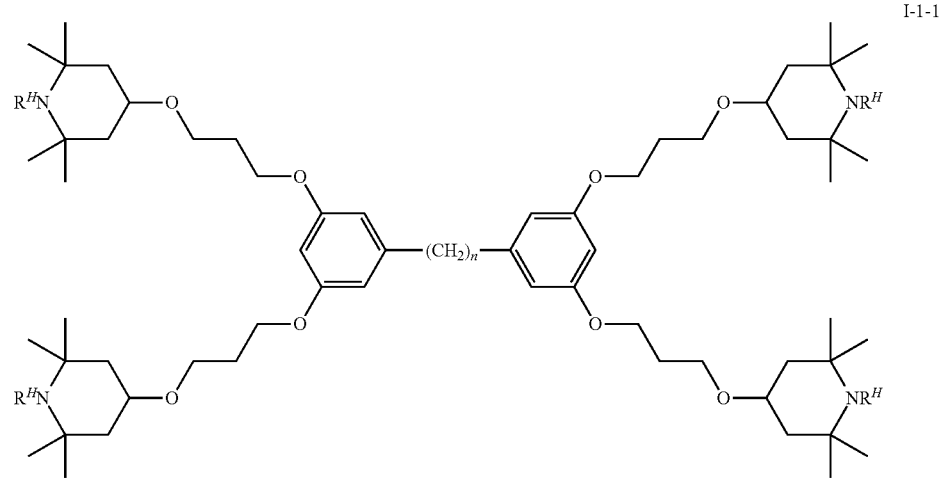

I-1-1 wherein n is an integer from 0 to 12.

14. The liquid crystal medium according to claim 1, wherein said one or more compounds of formulae I-1, I-2, and I-3 are selected from the compounds of the formula I-2-1:

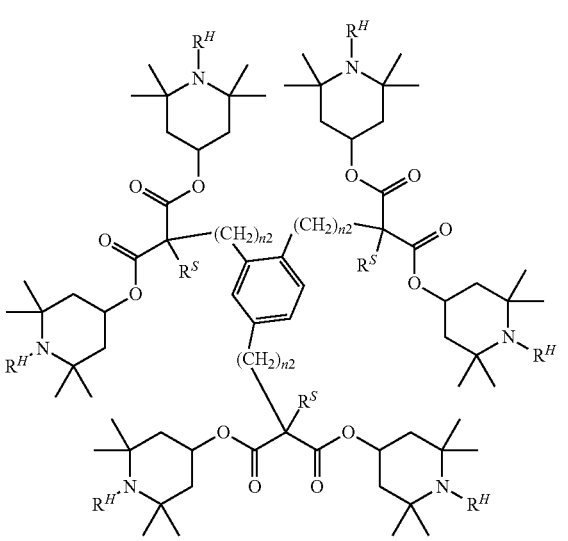

I-2-1 wherein n2, on each occurrence, identically or differently, is an integer from 1 to 12, and $R^S$ on each occurrence, identically or differently, is alkyl having 1 to 6 C atoms.

15. The liquid crystal medium according to claim 1, wherein said one or more compounds of formulae I-1, I-2, and I-3 are selected from the compounds of the formula I-3-1:

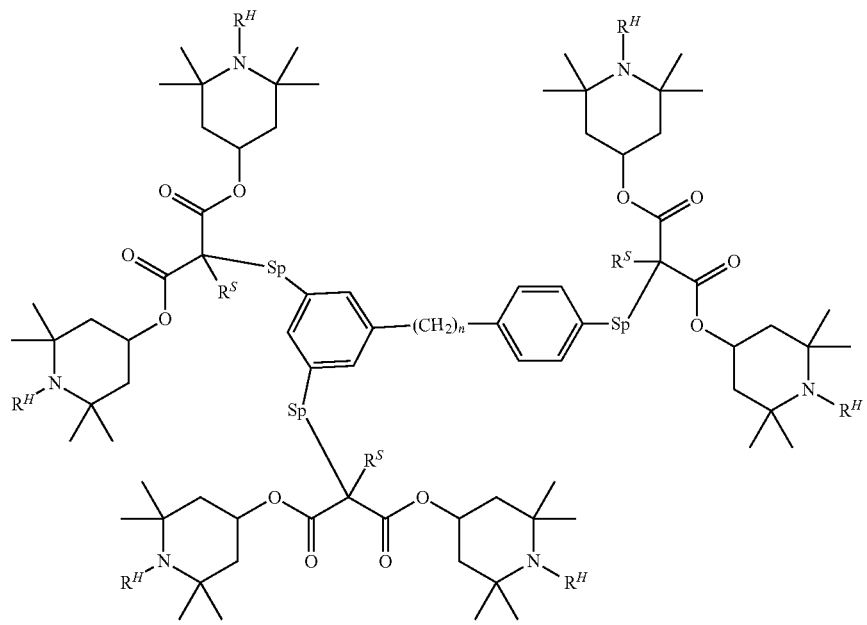

I-3-1 wherein n is an integer from 0 to 12.

16. The liquid crystal medium according to claim 4, wherein said one or more compounds of formula IV are selected from formulae compounds of the formulae IV-1 to IV-4

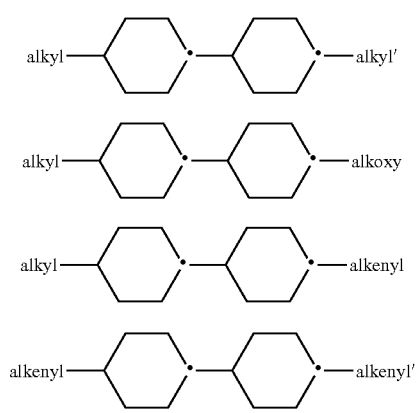

IV-1

IV-2

IV-3

IV-4 wherein
alkyl and alkyl', independently of one another, denote alkyl having 1 to 7 C atoms,
alkenyl denotes an alkenyl radical having 2 to 5 C atoms,
alkenyl' denotes an alkenyl radical having 2 to 5 C atoms, and
alkoxy denotes alkoxy having 1 to 5 C atoms.

17. The liquid crystal medium according to claim 1, further comprising a one or more polymerizable compounds of formula P $$P\text{-Sp-}A^1\text{-}(Z^1\text{-}A^2)_z\text{-}R \qquad P$$

wherein:
P is a polymerizable group,
Sp is a spacer group or a single bond,
$A^1$, $A^2$ are each, identically or differently, an aromatic, heteroaromatic, alicyclic or heterocyclic group having 4 to 25 ring atoms, which may also contain fused rings, and which is unsubstituted, or mono- or polysubstituted by L,
$Z^1$ is —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —CH=CF—, —CF=CH—, —C≡C—, —CH=CH—CO—O—, —O—CO—CH=CH—, —CH$_2$—CH$_2$—CO—O—, —O—CO—CH$_2$—CH$_2$—, —CR$^0$R$^{00}$—, or a single bond,
$R^0$, $R^{00}$ are each, identically or differently, H or alkyl having 1 to 12 C atoms,
R is H, L, or P-Sp-,
L is F, Cl, —CN, P-Sp-, a straight chain alkyl having 1 to 25 C atoms, wherein one or more non-adjacent CH$_2$-groups are each optionally replaced by —O—, —S—, —CO—, —CO—O—, —O—CO—, or —O—CO—O— in such a manner that O- and/or S-atoms are not directly connected with each other, and wherein one or more H atoms are each optionally replaced by P-Sp-, F or Cl, or a branched or cyclic alkyl having 3 to 25 C atoms, wherein one or more non-adjacent CH$_2$-groups are each optionally replaced by —O—, —S—, —CO—, —CO—O—, —O—CO—, or —O—CO—O— in such a manner that O- and/or S-atoms are not directly connected with each other, and wherein one or more H atoms are each optionally replaced by P-Sp-, For Cl, Z is 0, 1, 2 or 3, and n1 is 1, 2, 3 or 4.

* * * * *